(12) United States Patent
Hashimoto et al.

(10) Patent No.: US 11,979,629 B1
(45) Date of Patent: *May 7, 2024

(54) BROADCAST RECEIVER AND BROADCAST RECEIVING SYSTEM

(71) Applicant: MAXELL, LTD., Kyoto (JP)

(72) Inventors: Yasunobu Hashimoto, Kyoto (JP);
Motoyuki Suzuki, Kyoto (JP);
Kazuhiko Yoshizawa, Kyoto (JP);
Nobuo Masuoka, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/977,330

(22) Filed: Oct. 31, 2022

Related U.S. Application Data

(63) Continuation of application No. 17/357,158, filed on Jun. 24, 2021, now Pat. No. 11,516,527, which is a
(Continued)

(30) Foreign Application Priority Data

Nov. 13, 2013 (JP) ................................. 2013-234540
May 12, 2014 (JP) ................................. 2014-099040
(Continued)

(51) Int. Cl.
*H04N 21/414* (2011.01)
*G06F 21/62* (2013.01)
(Continued)

(52) U.S. Cl.
CPC ..... *H04N 21/41407* (2013.01); *G06F 21/629* (2013.01); *H04H 60/14* (2013.01);
(Continued)

(58) Field of Classification Search
None
See application file for complete search history.

(56) References Cited

U.S. PATENT DOCUMENTS 6,240,555 B1    5/2001    Shoff et al.
6,469,753 B1    10/2002   Klosterman et al.
(Continued)

FOREIGN PATENT DOCUMENTS

CN      101296371 A    10/2008
CN      102422297 A     4/2012
(Continued)

OTHER PUBLICATIONS

Non-Final Office Action issued in related U.S. Appl. No. 15/036,593, dated Nov. 9, 2017.
(Continued)

*Primary Examiner* — Omar S Parra
(74) *Attorney, Agent, or Firm* — Rimon P.C.

(57) ABSTRACT

The present invention provides a digital broadcast receiver capable of executing functions having higher added values. The broadcast receiver receives a broadcast wave of a digital broadcast service, controls an operation including activation and end of an application that is in cooperation with a broadcast program based on application-related information, and selects control relating to reactivation of the application based on a user's operation. If activation of the application is requested after the end of the application, the broadcast receiver controls the reactivation or non-reactivation of the application in accordance with the selection of control by the user.

5 Claims, 45 Drawing Sheets

Related U.S. Application Data continuation of application No. 16/843,558, filed on Apr. 8, 2020, now Pat. No. 11,076,193, which is a continuation of application No. 15/878,954, filed on Jan. 24, 2018, now Pat. No. 10,659,833, which is a continuation of application No. 15/036,606, filed as application No. PCT/JP2014/079993 on Nov. 12, 2014, now Pat. No. 10,129,580.

(30) Foreign Application Priority Data

May 12, 2014 (JP) .................. 2014-099048
May 12, 2014 (JP) .................. 2014-099091

(51) Int. Cl.

| | |
|---|---|
| H04H 60/14 | (2008.01) |
| H04H 60/72 | (2008.01) |
| H04N 21/236 | (2011.01) |
| H04N 21/431 | (2011.01) |
| H04N 21/434 | (2011.01) |
| H04N 21/435 | (2011.01) |
| H04N 21/472 | (2011.01) |
| H04N 21/478 | (2011.01) |
| H04N 21/488 | (2011.01) |
| H04N 21/6433 | (2011.01) |
| H04N 21/6543 | (2011.01) |
| H04N 21/8543 | (2011.01) |

(52) U.S. Cl.
CPC ...... *H04H 60/72* (2013.01); *H04N 21/23617* (2013.01); *H04N 21/4312* (2013.01); *H04N 21/4345* (2013.01); *H04N 21/4348* (2013.01); *H04N 21/435* (2013.01); *H04N 21/472* (2013.01); *H04N 21/478* (2013.01); *H04N 21/488* (2013.01); *H04N 21/6433* (2013.01); *H04N 21/6543* (2013.01); *H04N 21/8543* (2013.01); *G06F 2221/2141* (2013.01)

(56) References Cited

U.S. PATENT DOCUMENTS

| | | | |
|---|---|---|---|
| 6,631,523 | B1 | 10/2003 | Matthews, III et al. |
| 6,807,677 | B1 | 10/2004 | Lee |
| 8,752,120 | B2 | 6/2014 | Maruyama |
| 8,949,884 | B2 | 2/2015 | Okubo et al. |
| 9,264,772 | B2 | 2/2016 | Kitazato et al. |
| 9,402,097 | B2 | 7/2016 | Kitahara et al. |
| 9,591,351 | B2 | 3/2017 | Dewa et al. |
| 10,009,131 | B2 | 6/2018 | Kitazato et al. |
| 2001/0005236 | A1 | 6/2001 | Nakada et al. |
| 2002/0010932 | A1 | 1/2002 | Nguyen et al. |
| 2005/0105528 | A1 | 5/2005 | Kobayashi |
| 2006/0036703 | A1 | 2/2006 | Fulmer et al. |
| 2006/0126839 | A1 | 6/2006 | Koike et al. |
| 2006/0143652 | A1 | 6/2006 | Chung |
| 2008/0077965 | A1 | 3/2008 | Kamimaki et al. |
| 2008/0244671 | A1 | 10/2008 | Moon et al. |
| 2008/0250454 | A1 | 10/2008 | Nishina et al. |
| 2012/0058726 | A1 | 3/2012 | Kato |
| 2012/0084802 | A1 | 4/2012 | Kitazato |
| 2013/0271660 | A1 | 10/2013 | Sudo |
| 2014/0150015 | A1 | 5/2014 | Matsumura et al. |
| 2014/0165112 | A1 | 6/2014 | Freeman et al. |
| 2014/0181843 | A1 | 6/2014 | Yang |
| 2014/0214967 | A1 | 7/2014 | Baba et al. |
| 2014/0237529 | A1 | 8/2014 | Kitahara et al. |
| 2015/0281805 | A1 | 10/2015 | Kitazato |
| 2016/0165303 | A1* | 6/2016 | Kang ............ H04N 21/4112 725/80 |
| 2017/0034567 | A1 | 2/2017 | Kitahara et al. |
| 2017/0272803 | A1 | 9/2017 | Dewa et al. |

FOREIGN PATENT DOCUMENTS

| | | | |
|---|---|---|---|
| CN | 103220573 | A | 7/2013 |
| JP | 2001-186486 | A | 7/2001 |
| JP | 2002-320158 | A | 10/2002 |
| JP | 2004-104415 | A | 4/2004 |
| JP | 2004-159318 | A | 6/2004 |
| JP | 2005-215756 | A | 8/2005 |
| JP | 2008-252394 | A | 10/2008 |
| JP | 2008-283709 | A | 11/2008 |
| JP | 2010-166335 | A | 7/2010 |
| JP | 2011-071880 | A | 4/2011 |
| JP | 2011-097563 | A | 5/2011 |
| JP | 2012-080248 | A | 4/2012 |
| JP | 2012-134676 | A | 7/2012 |
| JP | 2012-243062 | A | 12/2012 |
| JP | 2012-244386 | A | 12/2012 |
| JP | 2012-257221 | A | 12/2012 |
| JP | 2012-257241 | A | 12/2012 |
| JP | 2013-009330 | A | 1/2013 |
| JP | 2013-009361 | A | 1/2013 |
| JP | 2013-031046 | A | 2/2013 |
| JP | 2013-066160 | A | 4/2013 |
| JP | 2013-098863 | A | 5/2013 |
| WO | 2012/133064 | A1 | 10/2012 |
| WO | 2012/157738 | A1 | 11/2012 |
| WO | 2013/065279 | A1 | 5/2013 |
| WO | 2014/057833 | A1 | 4/2014 |
| WO | 2013/061526 | A1 | 4/2015 |

OTHER PUBLICATIONS

Notice of Reasons for Refusal issued in corresponding JP Application No. 2020-139073, dated Feb. 22, 2022 w/Machine English Translation.
U.S. PTO Notice of Allowance issued in related parent U.S. Appl. No. 17/357,158 dated Jul. 27, 2022.
Office Action issued in Japanese Application No. 2017-066766 dated Feb. 6, 2018 (with English translation).
Supplemental Notice of Allowability issued in U.S. Appl. No. 15/036,606 dated Nov. 22, 2017.
Office Action issued in related U.S. Appl. No. 15/036,605 dated Jul. 26, 2017.
Office Action in Japanese Application No. 2013-234541 dated Nov. 22, 2016 (with English translation).
Final Office Action issued in related U.S. Appl. No. 15/036,605 dated Feb. 2, 2018.
Search Report issued in corresponding International Application No. PCT/JP2014/079993, dated Feb. 24, 2015.
U.S. PTO Non-Final Office Action issued in related parent U.S. Appl. No. 15/878,954 dated May 17, 2018.
U.S. PTO Final Office Action issued in related parent U.S. Appl. No. 15/878,954 dated Feb. 7, 2019.
U.S. PTO Non-Final Office Action issued in related parent U.S. Appl. No. 15/878,954 dated Sep. 17, 2019.
U.S. PTO Notice of Allowance issued in related parent U.S. Appl. No. 15/878,954 dated Jan. 14, 2020.
Japanese Notification of Reasons for Refusal issued in corresponding Japanese Patent Application No. 2019-095964, dated Mar. 10, 2020, with English translation.
Search Report issued in corresponding International Application No. PCT/JP2014/079990, dated Feb. 24, 2015.
English translation of International Preliminary Report on Patentability PCT/JP2014/079990 dated May 17, 2016.
Reviews for Blue-Ray Disc Recorder Models Worth "Buying", AV Review, vol. 29, No. 4, Kosei WADA, Ongen Publishing Co., Ltd., Apr. 25, 2012, pp. 31 and 36. (Discussed in IPRP which issued in Int'l Appl. No. PCT/JP2014/079990 dated May 17, 2016).
ARIB STD-B24, First Volume, ver. 5.3, Association of Radio Industries and Businesses, Jul. 29, 2009, p. 64. (Discussed in IPRP which issued in Int'l Appl. No. PCT/JP2014/079990 dated May 17, 2016).
Search Report issued in corresponding International Application No. PCT/JP2014/079991, dated Feb. 24, 2015.

(56) References Cited

OTHER PUBLICATIONS

English translation of International Preliminary Report on Patentability PCT/JP2014/079991 dated May 17, 2016.
U.S. PTO Non-Final Office Action issued in related parent U.S. Appl. No. 16/843,558, dated Oct. 19, 2020.
U.S. PTO Notice of Allowance issued in related parent U.S. Appl. No. 16/843,558, dated Mar. 3, 2021.
U.S. Appl. No. 16/843,558, filed Apr. 8, 2020.
English translation of International Preliminary Report on Patentability PCT/JP2014/079993 dated May 17, 2016.
Hisakazu Katoh, "The Deployment of Hybridcast", NHK Science and Technical Research Laboratories R&D Report, Sep. 15, 2012, No. 135, pp. 22 and 23.
Japanese Notice of Reasons for Refusal issued in corresponding Japanese Patent Application No. 2019-002453, dated Oct. 15, 2019, with English translation.
Final Office Action issued in related U.S. Appl. No. 15/036,593, dated Jun. 15, 2018.
Non-Final Office Action issued in related U.S. Appl. No. 15/036,605, dated Jul. 5, 2018.
Notice of Allowance issued in related U.S. Appl. No. 15/036,606, dated Jul. 30, 2018.
Non-Final Office Action issued in related U.S. Appl. No. 15/036,606, dated Jun. 8, 2018.
Notice of Allowance issued in related U.S. Appl. No. 15/036,606, dated Nov. 2, 2017.
Notification of Reasons for Refusal issued in Japanese Patent Application No. 2017-066766 dated Jul. 17, 2018, with English translation.
Notification of Reasons for Refusal issued in Japanese Patent Application No. 2017-066884 dated Jul. 17, 2018, with English translation.
Japanese Notice of Reasons for Refusal issued in corresponding Japanese Patent Application No. 2019-109835, dated Nov. 17, 2020, with English translation.
Non-Final Office Action issued in copending U.S. Appl. No. 15/036,605.
Data Coding and Transmission Specification for Digital Broadcasting, ARIB Standard, ARIB STD-B24 5.8 edition (third volume), Japan, General incorporated association: Association of Radio Industries and Businesses, Jul. 3, 2013, pp. 82-98, and its English language translation.
Notice of Reasons for Refusal issued in corresponding JP Patent Application No. 2020-139073, dated Jun. 8, 2021 w/English Translation.
Notice of Reasons for Refusal issued in corresponding JP Application No. 2022-097280, dated Jun. 6, 2023 w/Machine English Translation.
Notice of Reasons for Refusal issued in corresponding JP Application No. 2022-121844, dated Jul. 25, 2023 w/Machine English Translation.
Fujisawa, Hiroshi, "Evolution of Television Broadcasting," ITE Transactions on Media Technology and Applications, 67(5), 355-360. May 1, 2013, W/ English Translation.
Office Action issued in corresponding Chinese Patent Application No. 201480062255.9, dated Apr. 1, 2017.
Notice of Reasons for Refusal issued in corresponding JP Application No. 2022-132866, dated Aug. 1, 2023 w/ Machine English Translation.
Data Coding and Transmission Specification for Digital Broadcasting, ARIB STD-B24, Version 5.7 (Fascicle 3), ARIB, Mar. 19, 2013, pp. 1, 82-85, 175, with English Translation.
Japanese Notice of Reasons for Refusal issued in corresponding Japanese Patent Application No. 2019-043360, dated Jan. 14, 2020, with English translation.
Office Action issued in corresponding Chinese Patent Application No. 201480062254.4, dated Nov. 30, 2016.
Office Action issued in corresponding Chinese Patent Application No. 201480062284.5, dated Dec. 2, 2016.
Office Action issued in corresponding Japanese Patent Application No. 2013-234540, dated Nov. 22, 2016.

* cited by examiner

FIG. 6

| APPLICATION CONTROL INFORMATION (AIT) | CONTENTS |
|---|---|
| APPLICATION TYPE | DESCRIPTION METHOD OF APPLICATION. |
| APPLICATION IDENTIFIER | IDENTIFICATION INFORMATION CONSTITUTED BY ORGANIZATION IDENTIFICATION FOR IDENTIFYING PROVIDER AND APPLICATION IDENTIFICATION ASSIGNED TO EACH OF PROVIDERS TO IDENTIFY APPLICATION UNIT. |
| APPLICATION CONTROL CODE | INFORMATION FOR PRESCRIBING OPERATION CONTROL TO TARGET APPLICATION.<br>ONE OF FOLLOWING FOUR ITEMS IS DESCRIBED.<br>(1) AUTOMATIC ACTIVATION (2) OPERABLE<br>(3) END (4) PRE-FETCH |
| APPLICATION PROFILE | VALUE FOR INDICATING FUNCTION OF RECEIVER REQUIRED BY APPLICATION.<br>INDICATED BY COMBINATION OF FUNCTIONS POSSESSED BY RECEIVER AS OPTION.<br>REFERRED TO IN ORDER TO JUDGE WHETHER OR NOT APPLICATION CAN BE UTILIZED. |
| APPLICATION ACQUISITION SOURCE INFORMATION | INFORMATION FOR IDENTIFYING ACQUISITION SOURCE OF APPLICATION.<br>APPLICABLE TO BOTH OF CASES IN WHICH APPLICATION IS PLACED ON COMMUNICATION NETWORK AND IN WHICH APPLICATION IS TRANSMITTED BY BROADCAST. |
| APPLICATION BOUNDARY AND ACCESS PRIVILEGE SETTING | OPERABLE RANGE AS BROADCAST MANAGED APPLICATION IS INDICATED AS SET OF ONE OR MORE REGIONS (URL). MOREOVER, ACCESS LIMITATION TO BROADCAST RESOURCE FOR EACH REGION IS SET FOR EACH FUNCTIONAL UNIT. |
| ACTIVATION PRIORITY | PRIORITY RELATING TO AUTOMATIC ACTIVATION BETWEEN DATA BROADCAST AND ANOTHER BROADCAST MANAGED APPLICATION. |
| CACHE CONTROL INFORMATION | INFORMATION FOR CACHE CONTROL IN THE CASE OF HOLDING APPLICATION RESOURCE IN PREPARATION FOR REUSE OF APPLICATION. |
| SERVER ACCESS DISPERSION PARAMETER | PARAMETER SET FOR DISPERSING ACCESSES TO REDUCE LOAD TO SERVER IN WHICH ACCESSES ARE CONCENTRATED IN ACQUIRING APPLICATIONS AND THE LIKE. |
| OTHER INFORMATION | |

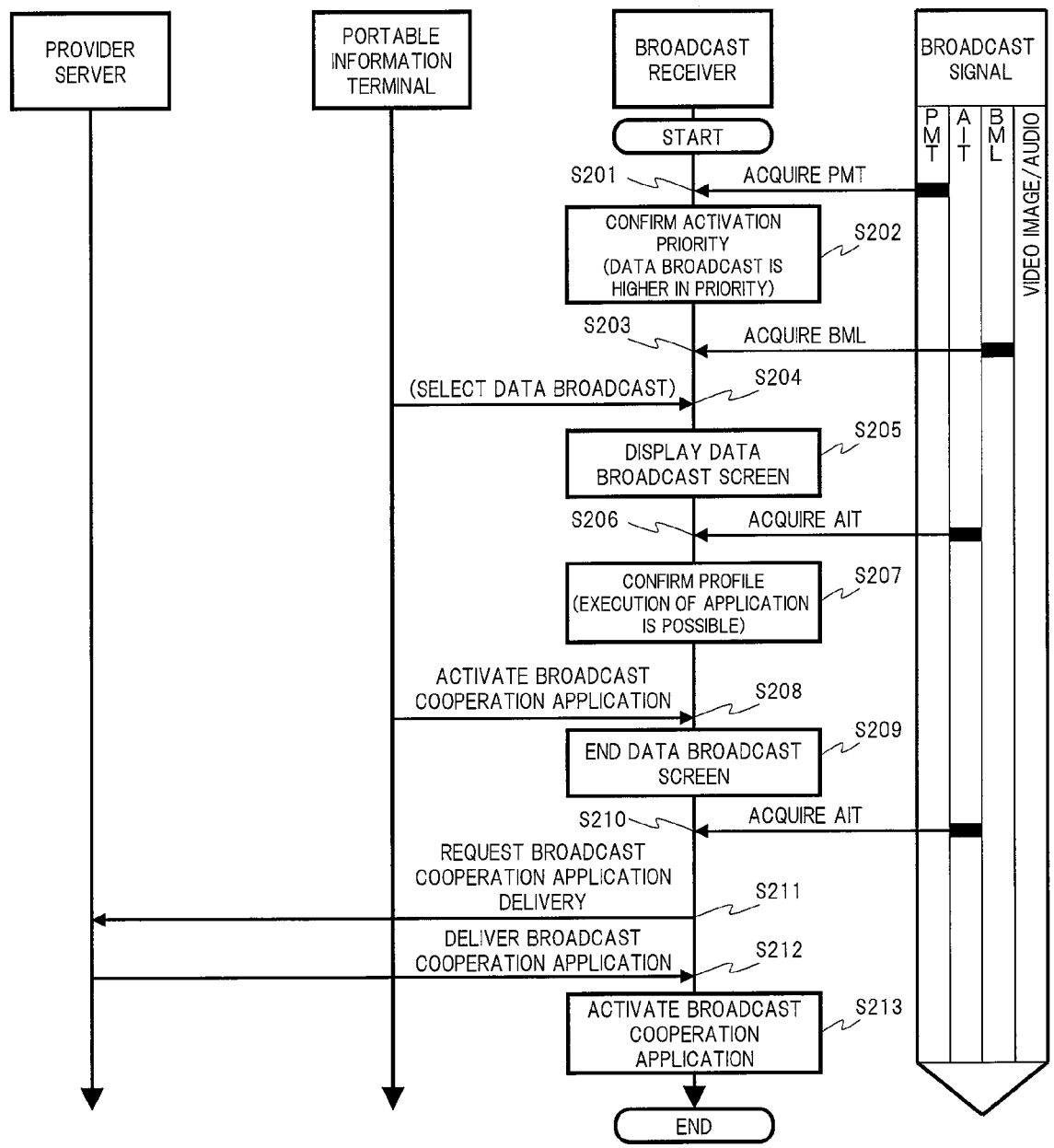

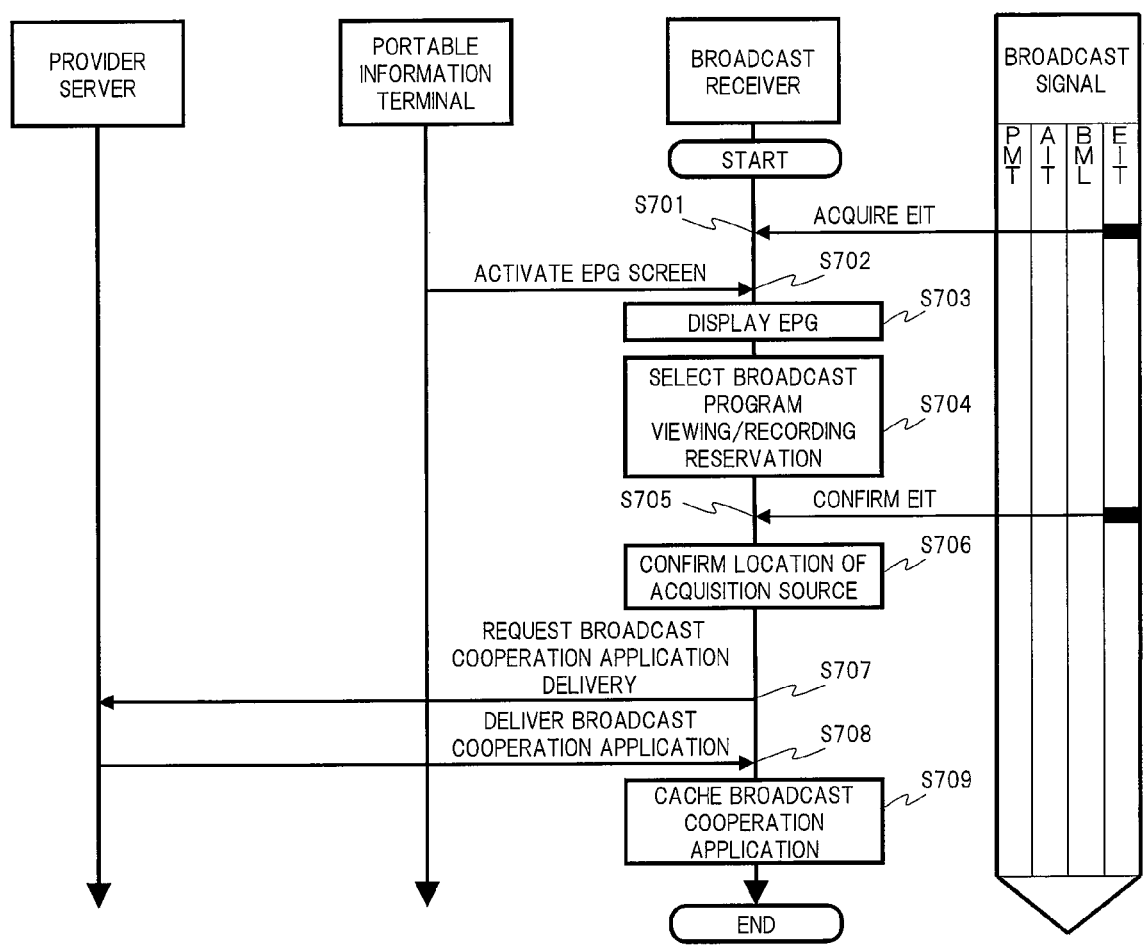

FIG. 19E

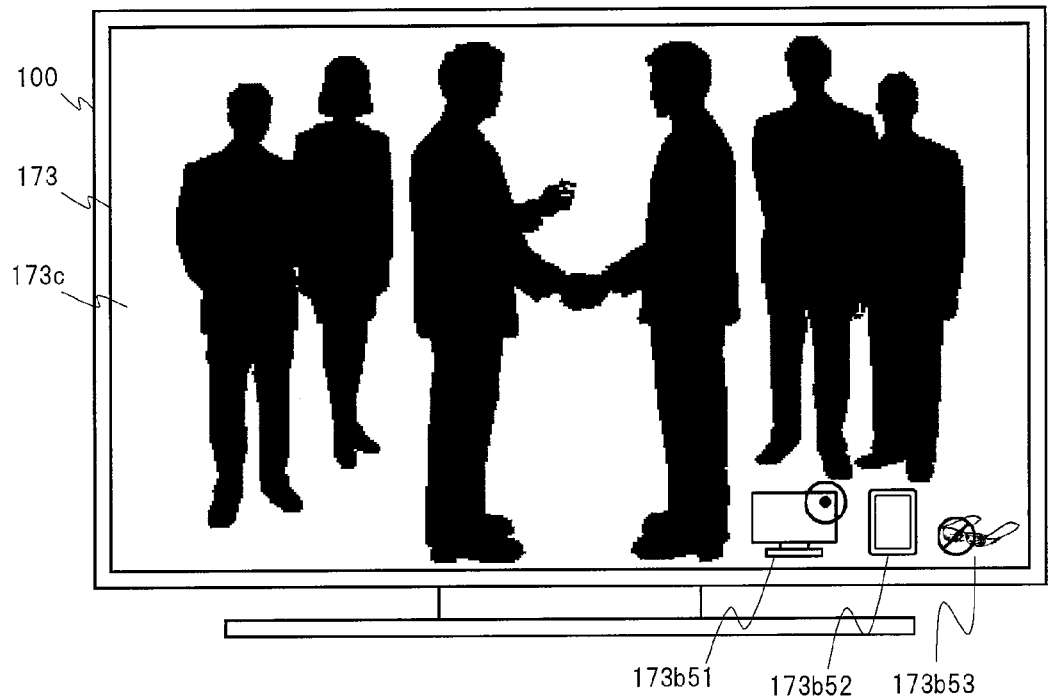

FIG. 19F

PROGRAM: ○○○○
BROADCAST COOPERATION APPLICATION LIST

|  | USAGE STATUS | APPLICATION A | APPLICATION B | APPLICATION C |
|---|---|---|---|---|
| RECEIVER A | RECEIVING | OPERABLE | OPERABLE | OPERABLE |
| RECEIVER B-1 | RECEIVING ANOTHER PROGRAM | NOT OPERABLE | OPERABLE | OPERABLE |
| RECEIVER B-2 | EMPTY | NOT OPERABLE | OPERABLE | OPERABLE |
| RECEIVER C-1 | EMPTY | OPERABLE | NOT OPERABLE | NOT OPERABLE |
| RECEIVER C-2 | RESERVATION FOR ANOTHER PROGRAM PRESENT | OPERABLE | NOT OPERABLE | NOT OPERABLE |

BROADCAST RECEIVER AND BROADCAST RECEIVING SYSTEM

CROSS-REFERENCE TO RELATED APPLICATIONS

This application is a Continuation of U.S. patent application Ser. No. 17/357,158, filed Jun. 24, 2021, which is a Continuation of U.S. patent application Ser. No. 16/843,558, filed Apr. 8, 2020, now U.S. Pat. No. 11,076,193, issued on Jul. 27, 2021, which is a Continuation of U.S. patent application Ser. No. 15/878,954, filed on Jan. 24, 2018, now U.S. Pat. No. 10,659,833, issued on May 19, 2020, which is a Continuation of U.S. patent application Ser. No. 15/036,606, filed on Aug. 5, 2016, now U.S. Pat. No. 10,129,580, issued on Nov. 13, 2018, which is the U.S. National Phase of PCT/JP2014/079993 filed on Nov. 12, 2014, which claims priority to Japanese Patent Application No. 2013-234540 filed on Nov. 13, 2013, Japanese Patent Application No. 2014-099040 filed on May 12, 2014, Japanese Patent Application No. 2014-099048 filed on May 12, 2014, and Japanese Patent Application No. 2014-099091 filed on May 12, 2014. The subject matter of each is incorporated herein by reference in their entirety.

TECHNICAL FIELD

The present invention relates to a broadcast receiver and a broadcast receiving system.

BACKGROUND ART

One of extension functions for a digital broadcast service is a data broadcast in which digital data is transmitted by a broadcast wave and various information such as a weather forecast, news, recommended programs, and the like are displayed. A large number of television receiver capable of receiving data broadcast are commercially available, and many techniques relating to receiving data broadcast including the following Patent Document 1 have also been published.

RELATED ART DOCUMENTS

Patent Documents

Patent Document 1: Japanese Patent Application Laid-Open No. 2001-186486

SUMMARY OF THE INVENTION

Problems to be Solved by the Invention

Characteristics of data broadcast include that a television receiver capable of receiving a digital broadcast service can receive a data broadcast as a single unit and acquire/display various pieces of information. Meanwhile, since data broadcast has limited amount of data that can be transmitted because of limitation of an electric wave band, it is difficult to obtain a high-definition screen display and highly functional effects, and for this reason, there is a problem that it is difficult to execute useful functions having high added values in existing digital broadcast receivers.

The object of the present invention is to provide a digital broadcast receiver capable of executing functions having higher added values.

Means for Solving the Problems

As means for solving the above-mentioned problems, techniques disclosed in claims are used.

For example, a technique described in claim 1 is used.

Effects of the Invention

By using the technique of the present invention, it is possible to provide a digital broadcast receiver capable of executing functions having higher added values.

BRIEF DESCRIPTIONS OF THE DRAWINGS

FIG. 6 is a diagram showing a data configuration of application control information in accordance with the first embodiment;

FIG. 7B is a diagram showing an operation sequence at the time of activation of an application in the broadcast receiver in accordance with the first embodiment;

FIG. 17 is a diagram showing an operation sequence at the time of acquiring the broadcast cooperation application in the broadcast receiver in accordance with the first embodiment;

FIG. 19E is a screen display view showing a broadcast receiver in accordance with the fifth embodiment;

FIG. 19F is a screen display view showing a broadcast cooperation application launcher in a portable information terminal in accordance with the fifth embodiment;

DETAILED DESCRIPTION OF PREFERRED EMBODIMENTS

Figure 1:
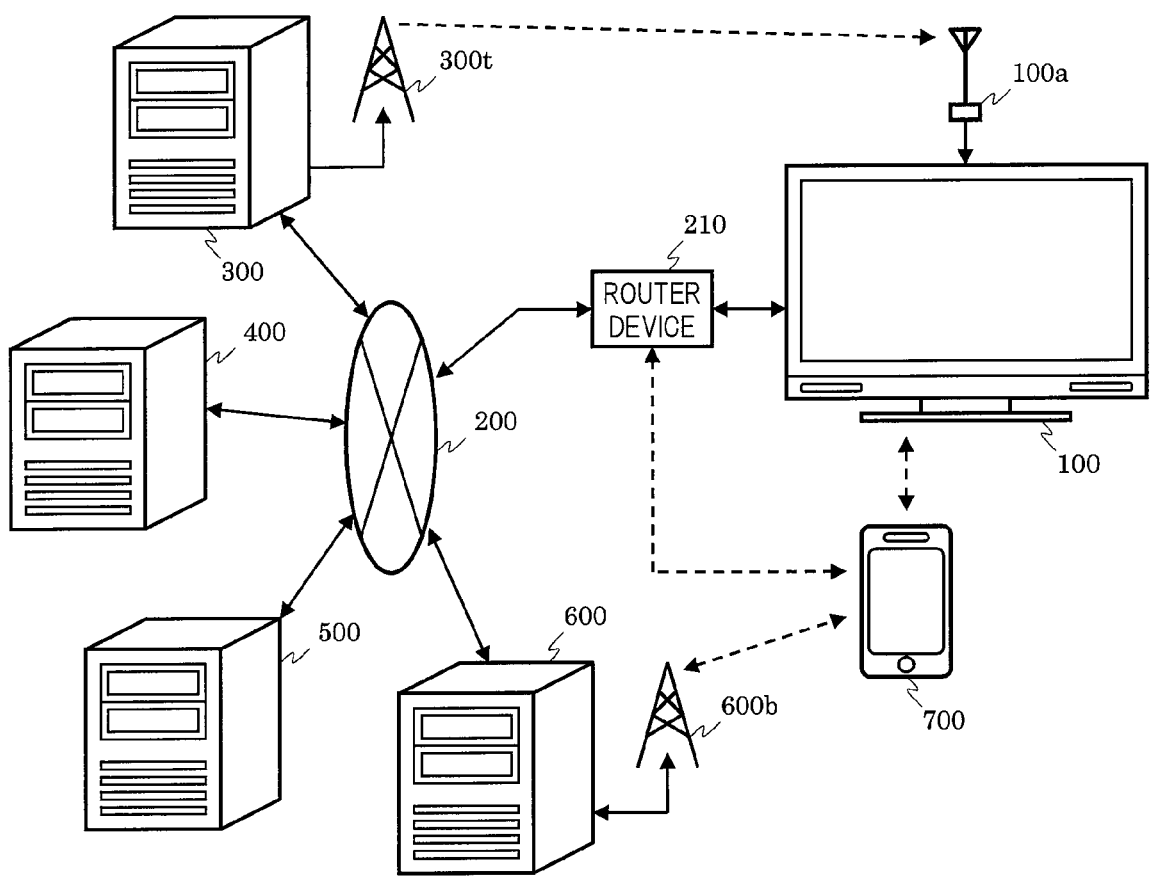
FIG. 1 is a diagram showing a system configuration of a communication system in accordance with a first embodiment.

Hereinafter, example embodiments of the present invention will be described with reference to the accompanying drawings.

First Embodiment

First, one example of a digital broadcast service that can be received by a broadcast receiver of the present embodiment will be described.

In one example of a BS/terrestrial digital broadcast that can be received by the broadcast receiver of the present embodiment, a plurality of transport streams (Transport Stream: TS) can be multiplexed on one transponder (frequency channel) and transmitted. The TS is a continuous TS packet having a predetermined length formed by dividing a data row such as video/audio elementary stream (Elementary Stream: ES), or program specific information (Program Specific Information: PSI)/service information (Service Information: SI), to which a TS header is added.

The PSI is a specific information table for identifying to which program each ES contained in the TS belongs and which is prescribed by MPEG (Moving Picture Experts Group)-2 System standard. The PSI is constituted by a PAT (Program Association Table), a PMT (Program Map Table), a CAT (Conditional Access Table), or the like. The PAT prescribes a list of programs included in the TS by a PID (Packet Identifier) of the PMT. The PMT prescribes a PID of the constituent element of each program, or the like. The CAT includes information relating to a limited receiving process.

Moreover, the SI is data formed by expanding the PSI and to which program information or the like is added, and the SI is provided with information relating to an electronic program guide (Electronic Program Guide: EPG) prescribed by Association of Wireless Industries and Businesses (Association of Wireless Industries and Businesses: ARIB) using the ARIB STD-B10. The SI is constituted by a BIT (Broadcaster Information Table), an SDT (Service Description Table), an EIT (Event Information Table), a TOT (Time Offset Table), or the like. The BIT includes broadcast station identifying information, group information, SI transmission information of a broadcast station, and the like. The SDT includes information such as a network ID for identifying a network, a TS ID for identifying a TS, a service ID (so-called channel number) for identifying individual services (so-called channel) within a network, or the like. The EIT includes a service ID for identifying individual services within the network, and information relating to events such as names, broadcast date and time, broadcast content of each event (so-called program), or the like. The TOT includes information relating to the current date and time.

Moreover, the TS includes PCR (Program Clock Reference) information forming the standard of a reproduction timing in a decoder, a BML document that is sub-set based on a BML (Broadcast Markup Language) specification prescribed by ARIB STD-B24, or the like.

In the broadcast receiver of the present embodiment, the TS constituted by the video/audio ES, various information, and the like, are received and decoded, so that a broadcast program, a data broadcast screen produced by using the EPG and BML, or the like can be provided to the user.

Moreover, the broadcast receiver of the present embodiment can utilize a broadcast communication cooperation system in which acquisition of added content through a broadband network, a computing process in a server device, a presentation process in cooperation with a portable terminal device, and the like are combined with the digital broadcast service, by making a digital broadcast service cooperate with a function of utilizing a broadband network. In order to achieve the above-mentioned broadcast communication cooperation system, it is assumed that the broadcast receiver of the present embodiment can execute an application described in HTML (Hyper Text Markup Language) or the like. Moreover, in the broadcast communication cooperation system to which the present broadcast receiver is applied, extended PSI/SI information required when application control information (Application Information Table: AIT) and an application in the extended BML specification and the broadcast communication cooperation system are transmitted by a broadcast wave is used. Note that the AIT corresponds to information for providing or notifying various information such as an acquisition source of the application, required for activating the application, and control information for controlling the activation/end or the like of an application.

The above description is based on the digital broadcast service in Japan; however, the broadcast receiver of the present embodiment including a broadcast communication cooperation system utilized by the broadcast receiver of the present embodiment is not intended to a limited application only in Japan.

Next, a detailed configuration example of the present embodiment will be described.

[System Configuration]

FIG. 1 is a diagram showing a system configuration as one example of a communication system of the present embodiment for achieving a broadcast communication cooperation system. The communication system of the present embodiment is constituted by a broadcast receiver 100 and an antenna 100a, a broadband network such as the Internet 200 and a router device 210, a wireless wave tower 300t of a broadcast station, a broadcast station server 300, a service provider server 400, other application servers 500, a mobile telephone communication server 600 and a base station 600b of a mobile telephone communication network, and a portable information terminal 700.

The broadcast receiver 100 is a television receiver having a function of utilizing the above-mentioned broadcast communication cooperation system in addition to an existing digital broadcast receiving function. The broadcast receiver 100 receives a broadcast wave transmitted from the wireless wave tower 300t via the antenna 100a. Moreover, the broadcast receiver 100 can be connected to the Internet 200 via the router device 210 and can transmit and receive data via communication with respective server devices on the Internet 200.

The router device 210 is connected to the Internet 200 via wireless communication or wire communication, also connected to the broadcast receiver 100 by wireless communication or wire communication, and further connected to the portable information terminal 700 by wireless communication. Thus, among the respective server devices on the Internet 200, the broadcast receiver 100, and the portable information terminal 700 can mutually transmit and receive data via the router device 210. Note that the communication between the broadcast receiver 100 and the portable information terminal 700 may be directly carried out through a method such as Bluetooth (registered trademark), NFC (Near Field Communication), or the like, without the router device 210.

The wireless wave tower 300t transmits a broadcast wave including a digital broadcast signal, AIT, control information relating to application presentation, and the like from a broadcast facility of a broadcast station. Note that the control information relating to the application presentation is control information relating to overlapping between the broadcast program and application on a television receiver and whether or not the application can be presented. Moreover, it is assumed that the broadcast station is provided with a broadcast station server 300. It is assumed that the broadcast server 300 stores broadcast programs (moving image content or the like) and metadata such as program titles, program ID's, the outlines, performers, and broadcast date and time of the respective broadcast programs and can provide the moving image content and each metadata to the service providers based on the contract. Note that the moving image content and the respective metadata may be provided to the service providers through an API (Application Programming Interface) provided in the broadcast station server 300.

The service provider server 400 is a server device prepared for providing services through use of the broadcast communication cooperation system by the service provider. The service provider server 400 carries out storing, managing, and delivering processes or the like on moving image content and metadata provided by the broadcast station server 300 and content and applications produced for the broadcast communication cooperation system. Moreover, the service provider server 400 also has functions of searching an application that can be provided and providing a list thereof in response to an inquiry from the television receiver. Note that storing, managing, and delivering processes of the moving image content and metadata, and storing, managing, and delivering processes of the applications may be carried out by different server devices. The above-mentioned broadcast station and service provider may be the same, or may be different providers. A plurality of service provider servers 400 may be prepared for each different service. Moreover, the functions of the service provider server 400 may be also possessed by the broadcast station server 300.

Another application server 500 is a known server device that carries out storing, managing, and delivering processes or the like on general applications, operation programs, content, and data other than those relating to the above-mentioned communication cooperation system.

The mobile telephone communication server 600 is connected to the Internet 200 and meanwhile, connected to the portable information terminal 700 via the base station 600b. The mobile telephone communication server 600 manages telephone communications (calls) and data transmission and reception of the portable information terminal 700 via the mobile telephone communication network and makes it possible to transmit and receive data via communications between the portable information terminal 700 and the respective server devices on the Internet 200. Note that the communications between the portable information terminal 700 and the broadcast receiver 100 may be carried out via the base station 600b and the mobile telephone communication server 600, as well as the Internet 200 and the router device 210.

[Hardware Configuration of Broadcast Receiver]

Figure 2A:
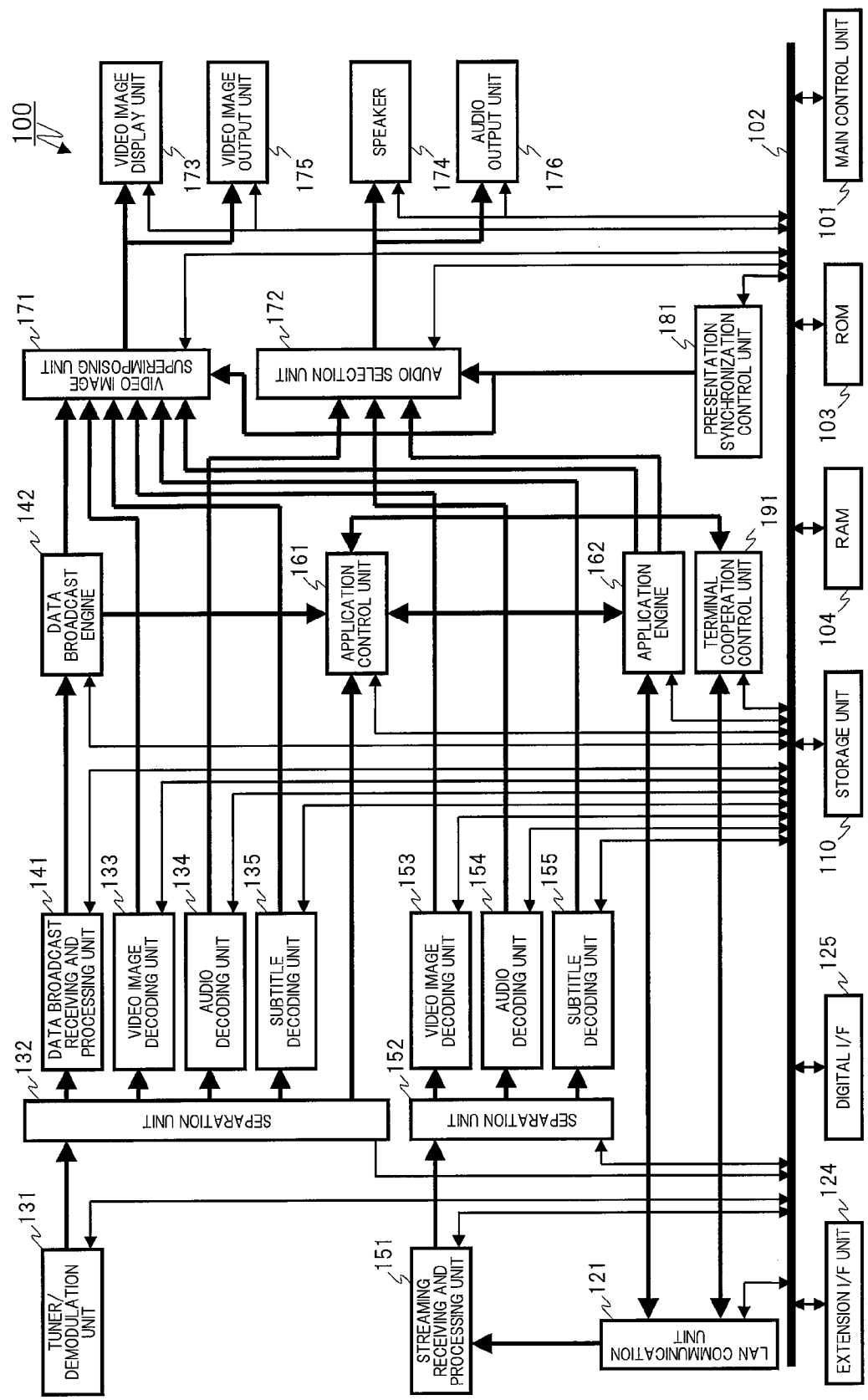
FIG. 2A is a block diagram showing a broadcast receiver in accordance with the first embodiment.

FIG. 2A is a block diagram showing one example of the internal configuration of the broadcast receiver 100. The broadcast receiver 100 is constituted by a main control unit 101, a system bus 102, a ROM 103, a RAM 104, a storage unit 110, a LAN communication unit 121, an extension interface unit 124, a digital interface unit 125, a tuner/demodulation unit 131, a first separation unit 132, a first video image decoding unit 133, a first audio decoding unit 134, a first subtitle decoding unit 135, a data broadcast receiving and processing unit 141, a data broadcast engine 142, a streaming receiving and processing unit 151, a second separation unit 152, a second video image decoding unit 153, a second audio decoding unit 154, a second subtitle decoding unit 155, an application control unit 161, an application engine 162, a video image superimposing unit 171, an audio selection unit 172, a video image display unit 173, a speaker 174, a video image output unit 175, an audio output unit 176, a presentation synchronization control unit 181, and a terminal cooperation control unit 191.

The main control unit 101 is a microprocessor unit for controlling the entire broadcast receiver 100 in accordance with a predetermined operation program. The system bus 102 is a data communication path for transmitting and receiving data between the main control unit 101 and the respective operation blocks in the broadcast receiver 100.

The ROM (Read Only Memory) 103 is a memory in which basic operation programs such as an operating system, and other operation programs are stored, and uses a rewritable ROM such as an EEPROM (Electrically Erasable Programmable ROM) or a flash ROM, for example. The RAM (Random Access Memory) 104 serves as a work area at the time of executing the basic operation programs or other operation programs. The ROM 103 and RAM 104 may be integrally formed with the main control unit 101. Moreover, the ROM 103 may not have an independent configuration shown in FIG. 2A but may use a part of a storage region in the storage unit 110.

The storage unit 110 stores operation programs and operation set values of the broadcast receiver 100 and personal information or the like of users of the broadcast receiver 100. Moreover, the storage unit 110 can store operation programs downloaded from the network and various kinds of data and the like formed by those operation programs. Furthermore, the storage unit 110 can store content such as moving images, still images, audio, or the like, acquired from a broadcast wave, or downloaded from the network. The entire or a part of the functions of the ROM 103 may be replaced by a part of the region of the storage unit 110. Moreover, the storage unit 110 needs to hold stored information even in a state where no power is supplied from the outside to the broadcast receiver 100. Accordingly, a device, for example, a semiconductor memory device such as a flash ROM or an SSD (Solid State Drive), or a magnetic disc drive such as an HDD (Hard Disc Drive), is used.

Note that the respective operation programs stored in the ROM 103 and the storage unit 110 can be updated or extended in their functions by downloading from the respective server devices on the Internet 200.

The LAN (Local Area Network) communication unit 121 is connected to the Internet 200 via the router device 210 to transmit and receive data to and from the respective server devices on the Internet 200. The connection with the router device 210 may be made in a wire connection or a wireless connection such as a Wi-Fi (registered trademark). It is assumed that the LAN communication unit 121 is provided with an encoding circuit, a decoding circuit, or the like. Moreover, the broadcast receiver 100 may be further provided with another communication unit such as a Bluetooth (registered trademark) communication unit, an NFC communication unit, or an infrared ray communication unit.

The tuner/demodulation unit 131 receives a broadcast wave from the wireless wave tower 300t via the antenna 100a and tunes (performs channel selection) to a channel for a service desired by the user based on control of the main control unit 101. Moreover, the tuner/demodulation unit 131 demodulates the received broadcast signal to acquire a TS. Note that, in the example shown in FIG. 2A, although a configuration with the single tuner/demodulation unit is exemplified, the broadcast receiver 100 may have a configuration in which a plurality of tuner/demodulation units are installed for the purpose of achieving simultaneous display of a plurality of screens, a recording of a program on a different channel, or the like. Moreover, based on the control of the main control unit 101, a control for limited accesses to the demodulated TS or the like may be carried out.

The first separation unit 132 to which the TS outputted from the tuner/demodulation unit 131 is inputted separates the data into respective data rows such as a video image data row, an audio data row, a subtitle data row, a program information data row, an AIT data row, or a BML data row to output the resulting data rows. These data rows may be prepared as an ES format, for example. The first video image decoding unit 133 decodes the video image data row inputted from the first separation unit 132 and outputs video image information. The first audio decoding unit 134 decodes the audio data row inputted from the first separation unit 132 and outputs audio information. The first subtitle decoding unit 135 decodes the subtitle data row inputted from the first separation unit 132 to output subtitle information.

The data broadcast receiving and processing unit 141 decodes the BML data row inputted from the first separation unit 132 to reproduce a BML document. The data broadcast engine 142 is a BML browser for executing a BML document and executes the BML document reproduced by the data broadcast receiving and processing unit 141 to output data broadcast screen information.

Based on control of the main control unit 101, the streaming receiving and processing unit 151 accesses moving image content or the like placed on the respective server devices on the Internet 200 via the LAN communication unit 121 to acquire a program stream (Program Stream: PS) such as the above-mentioned moving image content. Moreover, based on the control of the main control unit 101, control or the like of a DRM (Digital Rights Management) processing for the acquired PS may be carried out.

The second separation unit 152 to which the PS outputted from the streaming receiving and processing unit 151 is inputted separates the data into respective data rows such as a video image data row, an audio data row, or a subtitle data row to output the resulting data rows. These data rows may be prepared as an ES format, for example. Since a second video image decoding unit 153, a second audio decoding unit 154, and a second subtitle decoding unit 155 carry out the same processes as those of the first video image decoding unit 133, the first audio decoding unit 134, and the first subtitle decoding unit 135, respectively, the descriptions thereof will be omitted.

Note that the first separation unit 132 and the second separation unit 152, the first video image decoding unit 133 and the second video image decoding unit 153, the first audio decoding unit 134 and the second audio decoding unit 154, and the first subtitle decoding unit 135 and the second subtitle decoding unit 155 may be compatibly used, respectively.

Based on the AIT data row inputted from the first separation unit or an AIT file acquired from the respective server devices on the Internet 200, the application control unit 161 works on the application engine 162 with reference to an application produced for the broadcast communication cooperation system to carry out controlling and managing processes on a life cycle and an event on an application unit basis. Moreover, depending on the state of the application and the instruction of the AIT, the application control unit 161 appropriately carries out a control for the limitation of functions of the application. The application engine 162 is an HTML browser that acquires an application produced for the broadcast communication cooperation system to execute the application based on the control of the application control unit 161.

The video image superimposing unit 171 to which video image information outputted from the first video image decoding unit 133, subtitle information outputted from the first subtitle decoding unit 135, data broadcast screen information outputted from the data broadcast engine 142, video image information outputted from the second video image decoding unit 153, subtitle information outputted from the second subtitle decoding unit 155, and application execution screen information outputted from the application engine 162 are inputted carries out selection and/or superimposing process or the like. The video image superimposing unit 171 is provided with a video RAM omitted in the drawing, and based on video image information inputted to the video RAM, the video image display unit 173 or the like is driven. Moreover, based on control of the main control unit 101, the video image superimposing unit 171 carries out a scaling process, a superimposing process on EPG screen information formed based on the program information data row outputted from the first separation unit 132, or the like, if necessary.

The audio selection unit 172 to which the audio information outputted from the first audio decoding unit 134, the audio information outputted from the second audio decoding unit 154, and the application execution audio information outputted from the application engine 162 are inputted selects the audio information appropriately depending on control of the main control unit 101 to output the resulting data.

The video image display unit 173 is a display device such as a liquid crystal panel, for example, and provides video image information subjected to the selection and/or superimposing process in the video image superimposing unit 171 to the user of the broadcast receiver 100. The speaker 174 provides audio information outputted from the audio selection unit 172 to the user of the broadcast receiver 100. The video image output unit 175 is a video image output interface for outputting video image information subjected to the selection and/or superimposing process in the video image superimposing unit 171. The audio output unit 176 is an audio output interface for outputting audio information outputted from the audio selection unit 172. Note that, in a case in which the broadcast receiver 100 is a television receiver or the like as described above, the video image output unit 175 and the audio output unit 176 are not essential elements to the present invention.

The presentation synchronization control unit 181 carries out a control of presentation synchronization of the video image information, audio information, or the like obtained by decoding the TS acquired from a broadcast wave, video image information, audio information, or the like obtained by decoding the PS acquired from the respective server devices on the Internet 200, the application execution screen information, and application execution audio information outputted from the application engine 162, on the video image display unit 173 and the speaker 174, or on the video image output unit 175 and audio output unit 176, based on, for example, PCR information or the like.

Upon carrying out the cooperation with an external portable terminal device, the terminal cooperation control unit 191 carries out management and control such as the finding of a cooperation device (portable terminal device) and authentication thereof, connection between the broadcast receiver 100 and the cooperation device, the cooperation with the application, or the like.

The extension interface unit 124 is a group of interfaces for extending the functions of the broadcast receiver 100 and in the present embodiment, is constituted by an analog video image/audio interface, a USB (Universal Serial Bus) interface, a memory interface, and the like. The analog video image/audio interface carries out an input of an analog video image signal/audio signal from an external video image/audio output device, an output of the analog video image signal/audio signal to an external video image/audio input device, or the like. The USB interface is connected to a PC or the like to transmit and receive data. The USB may be connected to an HDD to record a broadcast program and content thereof. Moreover, the USB may be connected to a keyboard or another USB device. The memory interface is connected to a memory card or another memory medium to transmit and receive data.

The digital interface unit 125 is an interface through which encoded digital video image data and/or digital audio data is outputted or inputted. It is assumed that the digital interface unit 125 is supposed to be capable of outputting the TS acquired by the tuner/demodulation unit 131 and the PS acquired by the streaming receiving and processing unit 151 as they are. Moreover, the TS and PS inputted from the digital interface unit 125 may be controlled to be inputted to the first separation unit 132 and the second separation unit 152. Outputting digital content stored in the storage unit 110 or storing digital content to the storage unit 110 may be carried out via the digital interface unit 125. The digital interface unit 125 may be a DVI terminal, an HDMI terminal, or the like, and the output or input of data thereto or therefrom may be carried out by a format compatible with the DVI specification, HDMI specification, or the like. The input or output may be carried out by using a serial data format in compliance with the IEEE1394 specification or the like.

In addition to the television receiver, the broadcast receiver 100 may be an optical disc drive recorder such as a DVD (Digital Versatile Disc) recorder, a magnetic disc drive recorder such as an HDD recorder, or an STB (Set Top Box). A PC (Personal Computer), a tablet terminal, a game machine, or the like, provided with a digital broadcast receiving function and a broadcast communication cooperation function, may also be used. In a case in which the broadcast receiver 100 is the DVD recorder, the HDD recorder, the STB, or the like, the video image display unit 173 and the speaker 174 need not be installed. By connecting an external monitor and an external speaker to the video image output unit 175 and the audio output unit 176, the same operations as those of the broadcast receiver 100 of the present embodiment can be carried out.

[Software Configuration of Broadcast Receiver]

Figure 2B:
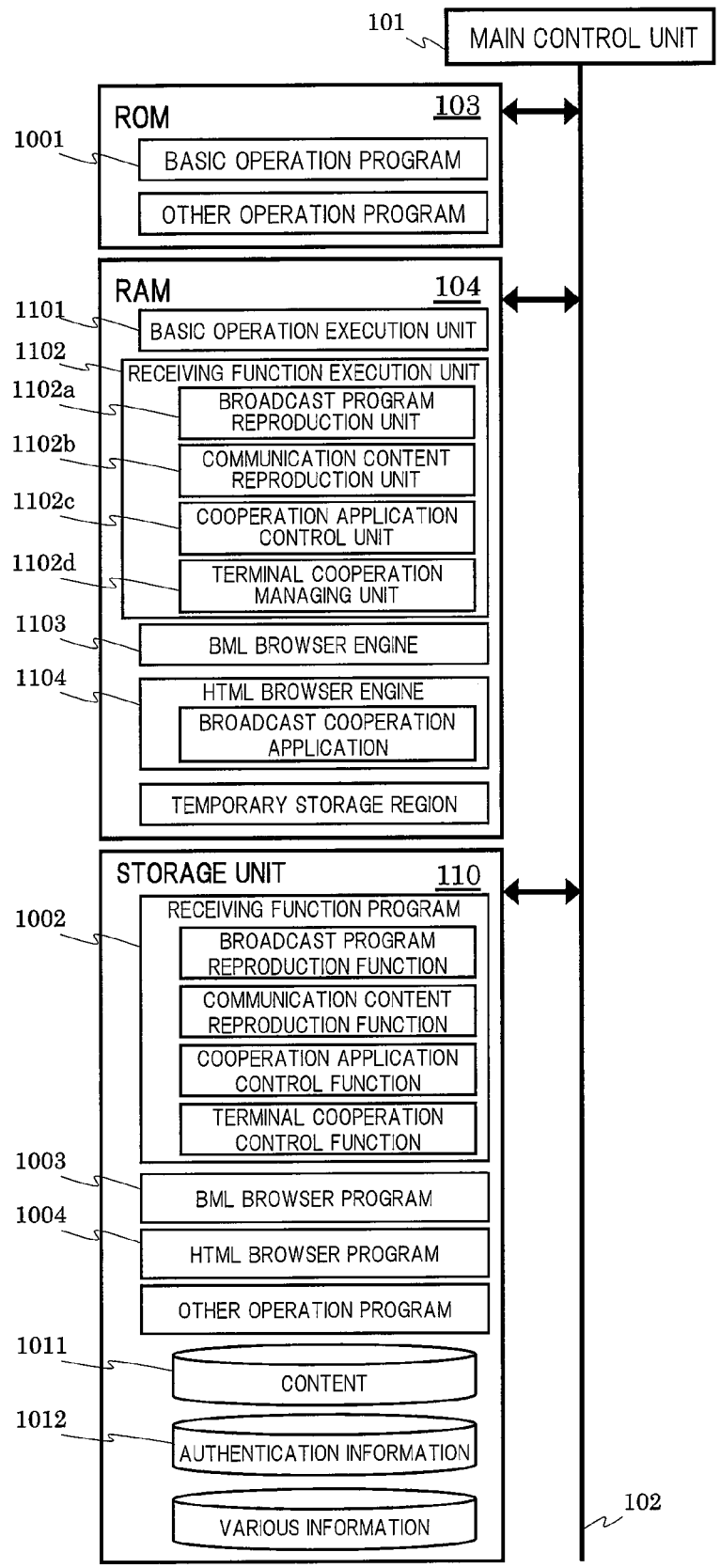
FIG. 2B is a diagram showing software configurations in the broadcast receiver in accordance with the first embodiment.

FIG. 2B is a block diagram showing software configurations in the broadcast receiver 100 of the present embodiment, showing software configurations in the ROM 103, the RAM 104, and the storage unit 110. In the present embodiment, a basic operation program 1001 and other operation programs are stored in the ROM 103, and a receiving function program 1002, a BML browser program 1003, an HTML browser program 1004, and other operation programs are stored in the storage unit 110. Moreover, the storage unit 110 is provided with a content storage region 1011 for storing content such as moving images, still images, or audio, an authentication information storage region 1012 for storing authentication information or the like to be used upon cooperation or the like with an external portable terminal device, and various information storage regions for storing other various information.

The basic operation program 1001 stored in the ROM 103 is developed on the RAM 104, and further, the main control unit 101 executes the developed basic operation program, thereby constituting a basic operation execution unit 1101. Moreover, the receiving function program 1002, the BML browser program 1003, and the HTML browser program 1004 which are stored in the storage unit 110, are each developed on the RAM 104, and further, the main control unit 101 executes the respective developed operation programs, thereby constituting a receiving function execution unit 1102, a BML browser engine 1103, and an HTML browser engine 1104, respectively. Furthermore, the RAM 104 is provided with a temporary storage region for temporarily storing data formed at the time of executing the respective operation programs, if necessary.

Note that, in the following, for simplicity of description, a process in which the main control unit 101 controls each of operation blocks by developing the basic operation program 1001 stored in the ROM 103 on the RAM 104 and executing the developed program is described on the assumption that the basic operation execution unit 1101 controls each of operation blocks. With respect to other operation programs, the same description will be given.

The receiving function execution unit 1102 controls each of the operation blocks in the broadcast receiver 100 to achieve a broadcast receiving function and a broadcast communication cooperation function. In particular, a broadcast program reproduction unit 1102a mainly controls the tuner/demodulation unit 131, the first separation unit 132, the first video image decoding unit 133, the first audio decoding unit 134, the first subtitle decoding unit 135, the data broadcast receiving and processing unit 141, and the data broadcast engine 142. Note that the data broadcast engine 142 may be replaced by the BML browser engine 1103 developed on the RAM 104. Moreover, a communication content reproduction unit 1102b mainly controls the streaming receiving and processing unit 151, the second separation unit 152, the second video image decoding unit 153, the second audio decoding unit 154, and the second subtitle decoding unit 155. A cooperation application control unit 1102c mainly controls the application control unit 161 and the application engine 162. Note that the application engine 162 may be replaced by the HTML browser engine 1104 developed on the RAM 104. A terminal cooperation managing unit 1102d mainly controls the terminal cooperation control unit 191.

The above-mentioned respective operation programs may be preliminarily stored in the ROM 103 and/or the storage unit 110 at the time of shipment of the product. These respective operation programs may be acquired from another application server 500 or the like on the Internet 200 via the LAN communication unit 121 after the shipment. Moreover, the above-mentioned operation programs stored in a memory card, an optical disc or the like may be acquired via the extension interface unit 124 or the like.

[Configuration of Broadcast Station Server]

Figure 3:
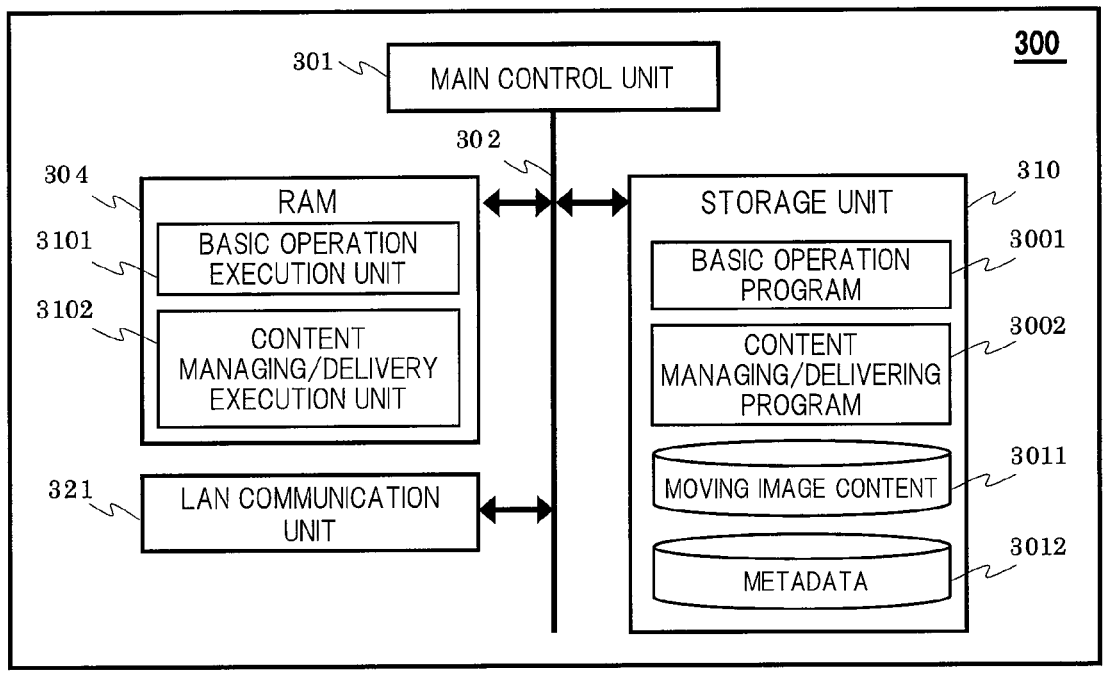
FIG. 3 is a block diagram showing a broadcast station server in accordance with the first embodiment.

FIG. 3 is a block diagram showing one example of an internal configuration of the broadcast station server 300. The broadcast station server 300 is constituted by a main control unit 301, a system bus 302, a RAM 304, a storage unit 310, and a LAN communication unit 321.

The main control unit 301 is a microprocessor unit for controlling the entire broadcast station server 300 in accordance with a predetermined operation program. The system bus 302 is a data communication path for transmitting and receiving data between the main control unit 301 and the respective operation blocks inside the broadcast station server 300. The RAM 304 forms a work area at the time of execution of the respective operation programs.

The storage unit 310 stores a basic operation program 3001 and a content managing/delivering program 3002 and is further provided with a moving image content storage region 3011 and a metadata storage region 3012. The moving image content storage region 3011 stores moving image content or the like of respective broadcast programs to be broadcast by the broadcast station. The metadata storage region 3012 stores metadata such as program titles, program ID's, outlines of the programs, performers, broadcasting date and time, or the like of the respective broadcast programs.

Moreover, the basic operation program 3001 and the content managing/delivering program 3002 which are stored in the storage unit 310 are respectively developed on the RAM 304, and further, the main control unit 301 executes the developed basic operation program and content managing/delivering program, thereby constituting a basic operation execution unit 3101 and a content managing/delivering execution unit 3102.

Note that, in the following, for simplicity of description, a process in which in which the main control unit 301 controls each of operation blocks by developing the basic operation program 3001 stored in the storage unit 310 on the RAM 304 and executing the developed program is described on the assumption that the basic operation execution unit 3101 controls each of operation blocks. With respect to other operation programs, the same description will be given.

The content managing/delivering execution unit 3102 manages moving image content and the like and respective metadata stored in the moving image content storage region 3011 and the metadata storage region 3012, and controls at the time of providing the moving image content and the like and the respective metadata to the service provider based on the contract. Furthermore, upon providing the moving image content and the like and the respective metadata to the service provider, the content managing/delivering execution unit 3102 also carries out an authentication process or the like of the service provider server 400 based on the contract, if necessary.

The LAN communication unit 321 is connected to the Internet 200 and communicates with the service provider server 400 or the like on the Internet 200. It is assumed that the LAN communication unit 321 is provided with an encoding circuit, a decoding circuit, and the like.

[Configuration of Service Provider Server]

Figure 4:
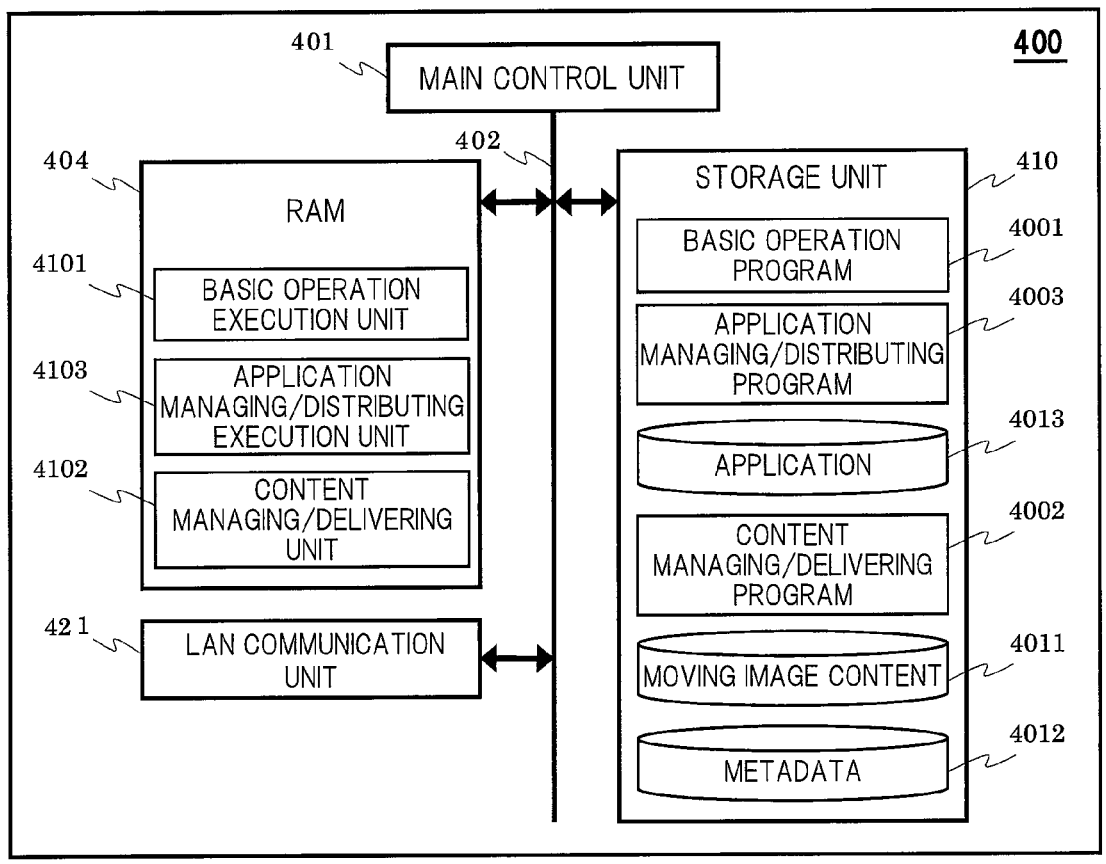
FIG. 4 is a block diagram showing a service provider server in accordance with the first embodiment.

FIG. 4 is a block diagram showing one example of an internal configuration of the service provider server 400. The service provider server 400 is constituted by a main control unit 401, a system bus 402, a RAM 404, a storage unit 410, and a LAN communication unit 421.

The main control unit 401 is a microprocessor unit for controlling the entire service provider server 400 in accordance with a predetermined operation program. The system bus 402 is a data communication path for transmitting and receiving data between the main control unit 401 and the respective operation blocks in the service provider server 400. The RAM 404 forms a work area at the time of execution of the respective operation programs.

The storage unit 410 stores a basic operation program 4001, a content managing/delivering program 4002, and an application managing/distributing program 4003 and is further provided with a moving image content storage region 4011, a metadata storage region 4012, and an application storage region 4013. The moving image content storage region 4011 and the metadata storage region 4012 store moving image content and the like and respective meta data provided by the broadcast station server 300, as well as content produced by the service provider and metadata or the like relating to the content. The application storage region 4013 stores applications required for achieving respective services of the broadcast communication cooperation system to be distributed in response to a request from each of the television receivers.

Moreover, the basic operation program 4001, the content managing/delivering program 4002 and the application managing/distributing program 4003, stored in the storage unit 410, are respectively developed on the RAM 404, and further, the main control unit 401 executes the developed basic operation program, content managing/delivering program, and application managing/distributing program, thereby constituting a basic operation execution unit 4101, a content managing/delivering execution unit 4102, and an application managing/distributing execution unit 4103.

Note that, in the following, for simplicity of description, a process in which in which the main control unit 401 controls each of operation blocks by developing the basic operation program 4001 stored in the storage unit 410 on the RAM 404 and executing the developed program is described on the assumption that the basic operation execution unit 4101 controls each of operation blocks. With respect to other operation programs, the same description will be given.

The content managing/delivering execution unit 4102 acquires moving image content and the like and respective metadata from the broadcast station server 300, manages moving image content and the like and respective metadata stored in the moving image content storage region 4011 and the metadata storage region 4012, and controls the delivery of the moving image content and the like and respective metadata to the respective television receivers. Moreover, the application managing/distributing execution unit 4103 manages the respective applications stored in the application storage region 4013 and controls at the time of distributing the respective applications in response to a request from each of the television receivers. Further, upon distributing the respective applications to each of the television receivers, the application managing/distributing execution unit 4103 also carries out an authentication process or the like on the respective television receivers, if necessary.

The LAN communication unit 421 is connected to the Internet 200 and communicates with the broadcast station server 300 on the Internet 200 as well as with the broadcast receiver 100 and the portable information terminal 700 via the router 210. It is assumed that the LAN communication unit 421 is provided with an encoding circuit, a decoding circuit, and the like.

[Hardware Configuration of Portable Information Terminal]

Figure 5A:
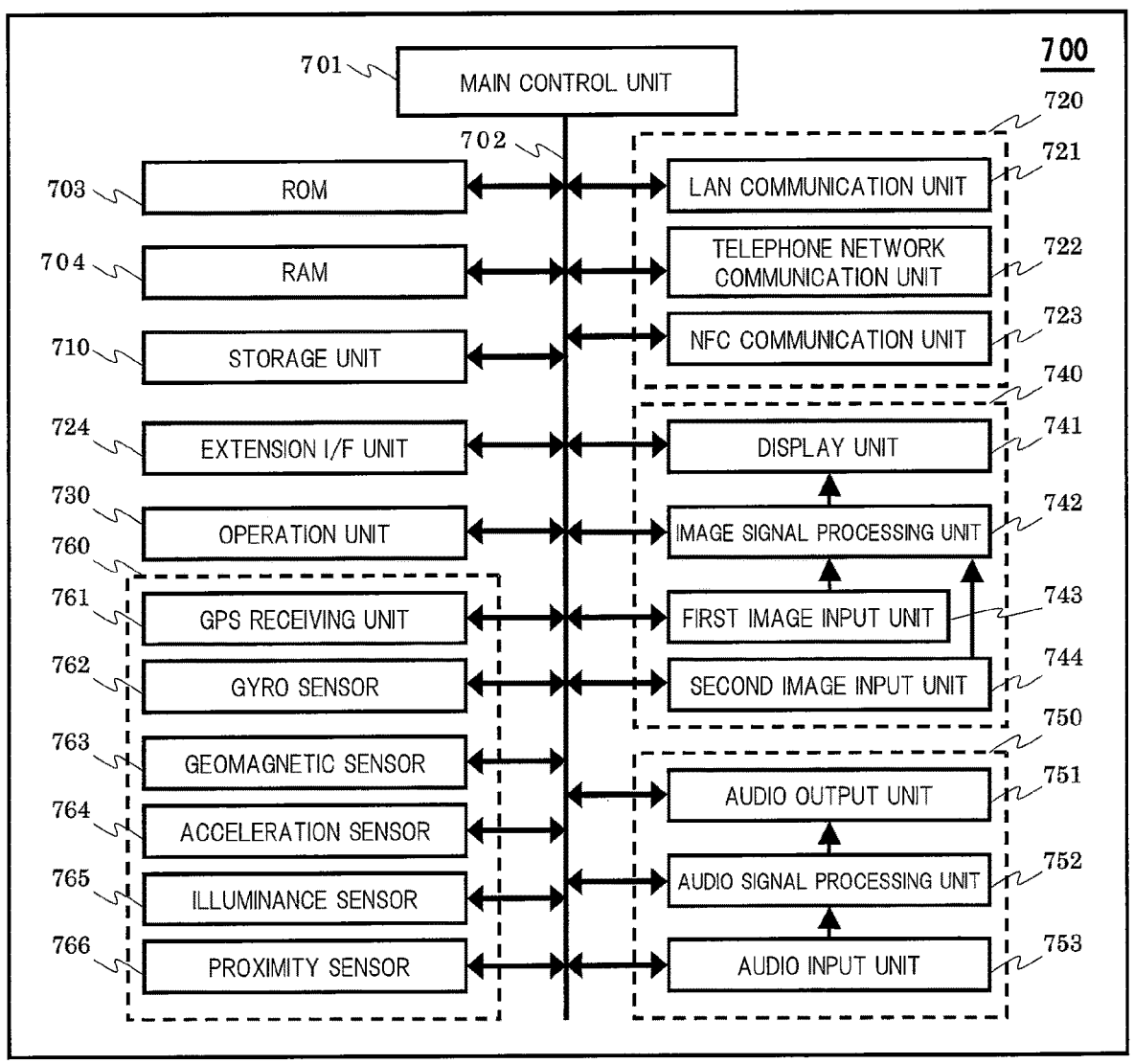
FIG. 5A is a block diagram showing a portable information terminal in accordance with the first embodiment.

FIG. 5A is a block diagram showing one example of the internal configuration of the portable information terminal 700. The portable information terminal 700 is constituted by a main control unit 701, a system bus 702, a ROM 703, a RAM 704, a storage unit 710, a communication processing unit 720, an extension interface unit 724, an operation unit 730, an image processing unit 740, an audio processing unit 750, and a sensor unit 760.

The main control unit 701 is a microprocessor unit for controlling the entire portable information terminal 700. The system bus 702 is a data communication path for transmitting and receiving data between the main control unit 701 and the respective operation blocks in the portable information terminal 700.

The ROM 703 is a memory in which basic operation programs such as an operating system and other operation programs are stored and employs a rewritable ROM such as an EEPROM or a flash ROM, for example. The RAM (Random Access Memory) 704 serves as a work area at the time of executing the basic operation programs or other operation programs. The ROM 703 and RAM 704 may be integrally formed with the main control unit 701. Moreover, the ROM 703 may not have an independent configuration shown in FIG. 5A but may use a part of a storage region in the storage unit 710.

The storage unit 710 stores operation programs and operation set values of the portable information terminal 700 and personal information or the like of users of the portable information terminal 700. Moreover, the storage unit 710 can store operation programs downloaded from the network and various kinds of data and the like formed by those operation programs. Furthermore, the storage unit 710 can store content such as moving images, still images, audio, or the like, downloaded from the network. The entire or a part of the functions of the ROM 703 may be replaced by a part of the region of the storage unit 710. Moreover, the storage unit 710 needs to hold stored information even in a state where no power is supplied from the outside to the portable information terminal 700. Accordingly, a device such as a flash ROM, an SSD, or an HDD, is used.

Note that the respective operation programs stored in the ROM 703 and the storage unit 710 can be updated or extended in their functions by downloading from the respective server devices on the Internet 200.

The communication processing unit 720 is constituted by a LAN communication unit 721, a mobile telephone network communication unit 722, and an NFC communication unit 723. The LAN communication unit 721 is connected to the Internet 200 via the router device 210 to transmit and receive data to and from the respective server devices on the Internet 200. The connection with the router device 210 is made in a wireless connection such as a Wi-Fi (registered trademark) or the like. The mobile telephone network communication unit 722 carries out telephone communications (calls) and data transmission and reception via wireless communication with the base station 600b of the mobile telephone network. The NFC communication unit 723 carries out a wireless communication at the time of being close to a corresponding reader/writer. It is assumed that the LAN communication unit 721, the mobile telephone network communication unit 722, and the NFC communication unit 723 are each provided with an encoding circuit, a decoding circuit, an antenna, or the like. Moreover, the communication processing unit 720 may be further provided with another communication unit such as a Bluetooth (registered trademark) communication unit, or an infrared ray communication unit.

The extension interface unit 724 is a group of interfaces for extending the functions of the portable information terminal 700 and in the present embodiment, is constituted by a video image/audio interface, a USB interface, a memory interface, and the like. The video image/audio interface carries out an input of a video image signal/audio signal from an external video image/audio output device, an output of the video image signal/audio signal into an external video image/audio input device, or the like. The USB interface is connected to a PC or the like to transmit and receive data. Moreover, the USB interface may be used for connection with a keyboard or another USB device. The memory interface is connected to a memory card or another memory medium to transmit and receive data.

The operation unit 730 is an instruction input unit for inputting an operation instruction to the portable information terminal 700 and in the present embodiment, constituted by a touch panel 730t disposed to be overlapped with a display unit 741 and operation keys 730k on which button switches are arranged. Only either one of these may be used. The portable information terminal 700 may be operated by using a keyboard or the like connected to an extended interface unit 724. The portable information terminal 700 may be operated by using a portable terminal device as a separated unit connected by a wire communication or a wireless communication. Moreover, the above-mentioned touch panel function may be also provided in the display unit 741.

The image processing unit 740 is constituted by the display unit 741, an image signal processing unit 742, a first image input unit 743, and a second image input unit 744. The display unit 741 is, for example, a display device such as a liquid crystal panel and provides image data processed in the image signal processing unit 742 to a user of the portable information terminal 700. The image signal processing unit 742 is provided with a video RAM omitted in the drawing, and the display unit 741 is driven based on image data inputted to the video RAM. Moreover, it is assumed that the image processing unit 742 is provided with functions for carrying out a format conversion, a superimposing process of a menu and other OSD (On Screen Display) signals, or the like, if necessary. The first image input unit 743 and the second image input unit 744 are camera units in which image data of an object and the periphery thereof is inputted by converting light inputted from a lens into an electric signal through use of an electronic device such as a CCD (Charge Coupled Device), a CMOS (Complementary Metal Oxide Semiconductor) sensor, or the like.

The audio processing unit 750 is constituted by an audio output unit 751, an audio signal processing unit 752, and an audio input unit 753. The audio output unit 751 is a speaker and provides an audio signal processed in the audio signal processing unit 752 to the user of the portable information terminal 700. The audio input unit 753 is a microphone and converts voice or the like of the user into audio data to be inputted.

The sensor unit 760 is a group of sensors for detecting the state of the portable information terminal 700 and in the present embodiment, is constituted by a GPS receiving unit 761, a gyro sensor 762, a geomagnetic sensor 763, an acceleration sensor 764, an illuminance sensor 765, and a proximity sensor 766. The group of sensors can detect the position, inclination, orientation, and movement of the portable information terminal 700, ambient brightness, proximity states of peripheral objects, and the like. Moreover, the portable information terminal 700 may be further provided with another sensor such as an atmospheric pressure sensor.

The portable information terminal 700 may be a mobile phone, a smart phone, a tablet terminal, or the like. The portable information terminal 700 may also be a PDA (Personal Digital Assistants) or a notebook-type PC. Moreover, the portable information terminal 700 may also be a digital still camera, a video camera capable of capturing moving images, a portable game machine, or the like, or another portable digital device.

Note that, although the configuration example of the portable information terminal 700 shown in FIG. 5A includes many elements such as the sensor unit 760 that are not essential to the present embodiment, even in the configuration in which these elements are not provided, the effects of the present embodiment are not impaired. Moreover, configurations not shown in the drawings such as a digital broadcast receiving function, an electronic money settlement function, or the like, may be further added thereto.

[Software Configuration of Portable Information Terminal]

Figure 5B:
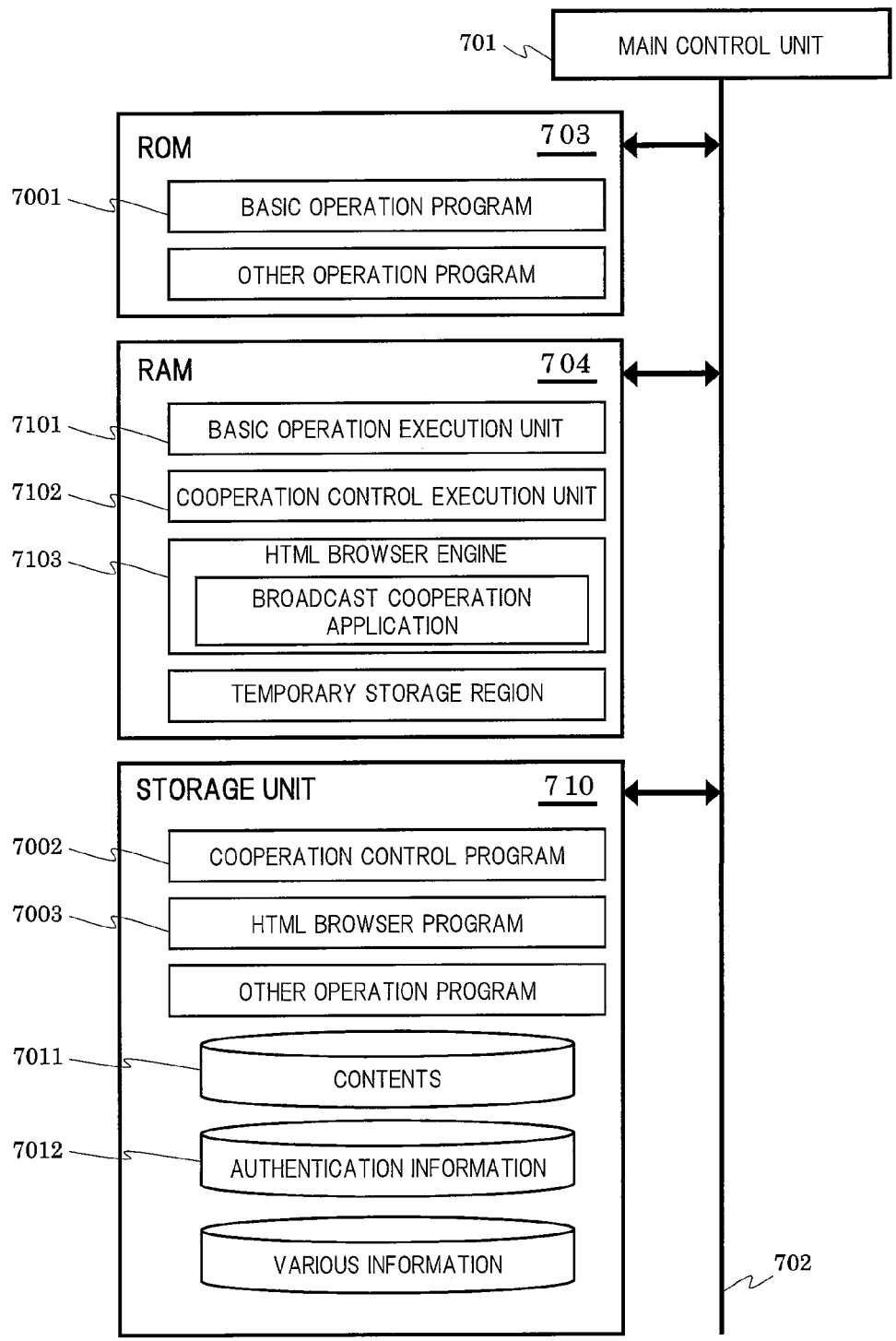
FIG. 5B is a diagram showing a software configuration of the portable information terminal in accordance with the first embodiment.

FIG. 5B is a diagram showing a software configuration of the portable information terminal 700 of the present embodiment and shows software configurations in the ROM 703, the RAM 704, and the storage unit 710. In the present embodiment, a basic operation program 7001 and other operation programs are stored in the ROM 703, and a cooperation control program 7002, an HTML browser program 7003, and other operation programs are stored in the storage unit 710. Moreover, the storage unit 710 is provided with a content storage region 7011 for storing content such as moving images, still images, audio, or the like, an authentication information storage region 7012 for storing authentication information to be used upon carrying out a cooperative operation or the like with a television receiver, and various information storage regions for storing other various information.

The basic operation program 7001 stored in the ROM 703 is developed on the RAM 704, and further, the main control unit 701 executes the developed basic operation program, thereby constituting a basic operation execution unit 7101. Moreover, the cooperation control program 7002 and the HTML browser program 7003 which are stored in the storage unit 710 are each developed on the RAM 704, and further, the main control unit 701 executes the respective developed operation programs, thereby constituting a cooperation control execution unit 7102 and an HTML browser engine 7103. Furthermore, the RAM 704 is provided with a temporary storage region for temporarily storing data formed at the time of executing the respective operation programs, if necessary.

Note that, in the following, for simplicity of description, a process in which the main control unit 701 controls each of operation blocks by developing the basic operation program 7001 stored in the ROM 703 on the RAM 704 and executing the developed program is described on the assumption that the basic operation execution unit 7101 controls each of operation blocks. With respect to other operation programs, the same description will be given.

The cooperation control execution unit 7102 carries out managements such as a device authentication and connection thereof, transmission and reception of respective data, or the like, required when the portable information terminal 700 carries out a cooperative operation with a television receiver. The HTML browser engine 7103 is an HTML browser for executing an application produced for a broadcast communication cooperation system on the portable information terminal 700.

The above-mentioned respective operation programs may be preliminarily stored in the ROM 703 and/or the storage unit 710 at the time of shipment of the product. These programs may be acquired from another application server 500 or the like on the Internet 200 via the LAN communication unit 721 or the mobile telephone network communication unit 722 after the shipment of the product. Moreover, the above-mentioned operation programs stored in a memory card, an optical disc, or the like may be acquired via the extension interface unit 724 or the like.

[Outline of Application Control Information (AIT)]

The application control information (AIT) of the present embodiment is an information intended to notify the presence of an application (hereinafter, referred to as "broadcast cooperation application," in some cases) that is in cooperation with a broadcast service relative to a television receiver or the like (in the present embodiment, broadcast receiver 100) in a broadcast communication cooperation function applicable to the broadcast receiver 100, and to instruct its control. Note that the broadcast cooperation application is divided into (1) a broadcast managed application that is operated only in a broadcast receiving status based on a control signal for activation/end or the like included in a broadcast signal and permits access to a broadcast resource based on the control signal, (2) an out-of-broadcast managed application that is used in an operation mode in which activation/end or the like is not controlled by a broadcast signal and permits access to the broadcast resource based on means such as an application authentication or the like, and (3) another general application that does not permit access to the broadcast resource.

With respect to the transmission method of AIT, either one of methods in which AIT of a section format or an XML (eXtensible Markup Language) format is transmitted by a broadcast wave through a data carousel (Data Carousel: DC) system or the like and in which an AIT file of the section format or the XML format is delivered from a server device on the Internet 200 by http (Hypertext Transfer Protocol), https (Hypertext Transfer Protocol Secure), or the like may be used. Other systems may be adopted.

FIG. 6 is a data configuration diagram showing one example of a data configuration of AIT. The AIT is mainly constituted by various pieces of information such as an application type 901, an application identifier 902, an application control code 903, an application profile 904, application acquisition source information 905, application boundary and access privilege setting 906, activation priority 907, cache information 908, server access dispersion parameter 909, or the like. Moreover, other information may be included.

The application type 901 prescribes the description method of the application. In the present embodiment, the description method of the application is HTML. The application identifier 902 is identification information constituted by an organization identification for identifying the provider and an application identification that is assigned to each of the providers, which is used for identifying the application unit. Note that the application unit refers to a set of an HTML document and its reference resource, with an HTML document that is present at a location specified by the application acquisition source information 905 being used as an entry document. The application control code 903 which prescribes an operation control for an object application has one of (1) automatic activation, (2) operable, (3) end, and (4)

pre-fetch described therein. The application profile 904 which is a value indicating a function of a television receiver that is requested by the application indicates functions provided in the television receiver as options in combination. With reference to this value, whether or not the application can be utilized is determined.

The application acquisition source information 905 is information for identifying the acquisition source of an application and corresponds to location information used for acquiring an HTML document that is first referred to at the time of activation of an application. Since two cases are assumed for acquiring the application, that is, a case in which the application is transmitted by broadcast and a case in which the application is placed on a server device on a communication network, the location information identified by the application acquisition source information 905 also includes prescriptions applicable to both cases of the broadcast acquisition and the communication acquisition. The application boundary and access privilege setting 906 is information indicating the operable range for the broadcast managed application as a set of one or more regions (URL: Uniform Resource Locator). Moreover, the access privilege to the broadcast resource for each of the regions is set for each functional unit. By the application boundary and access privilege setting 906, the range of document transition is specified to prevent transition to an unexpected document due to a chain of document transitions from the entry document at the time of application activation, an access to an inappropriate broadcast resource, or the like. Furthermore, an access privilege to a particular broadcast resource can be set by a region unit within the range of the document transition.

In a case in which a data broadcast by a broadcast service and a broadcast managed application by an HTML document are simultaneously present, the activation priority 907 prescribes which should be preferentially activated. It is assumed that specification of the data broadcast to be the first priority under no conditions on the PMT, specification of an activation priority order of a particular application type on the PMT, and specification of the activation priority of a target application by the activation priority 907 are possible. The cache information 908 is information for cache control in a case in which an application resource is held in preparation for reuse of the application. By this information, even after the end of an application, a cache operation of the application resource in which the reuse thereof is expected is carried out. The server access dispersion parameter 909 is a parameter set for dispersing accesses in order to reduce loads to a server on which accesses are concentrated as an acquisition source of applications or the like. In accordance with the setting of this parameter, the television receiver may be operated to stochastically delay the application of an application control code.

In the following, operations of the broadcast receiver 100 of the present embodiment will be described.

[Operation Sequence at the Time of Activation of Application]

First, the activation process of a broadcast cooperation application based on the AIT to be transmitted by a broadcast wave in the broadcast receiver 100 of the present embodiment will be described. Ina case in which a data broadcast by a broadcast service and a broadcast cooperation application are simultaneously present, the broadcast receiver 100 of the present embodiment can prescribe which should be preferentially activated, based on information on the PMT and information such as the AIT application control code 903 and the activation priority 907.

Figure 7A:
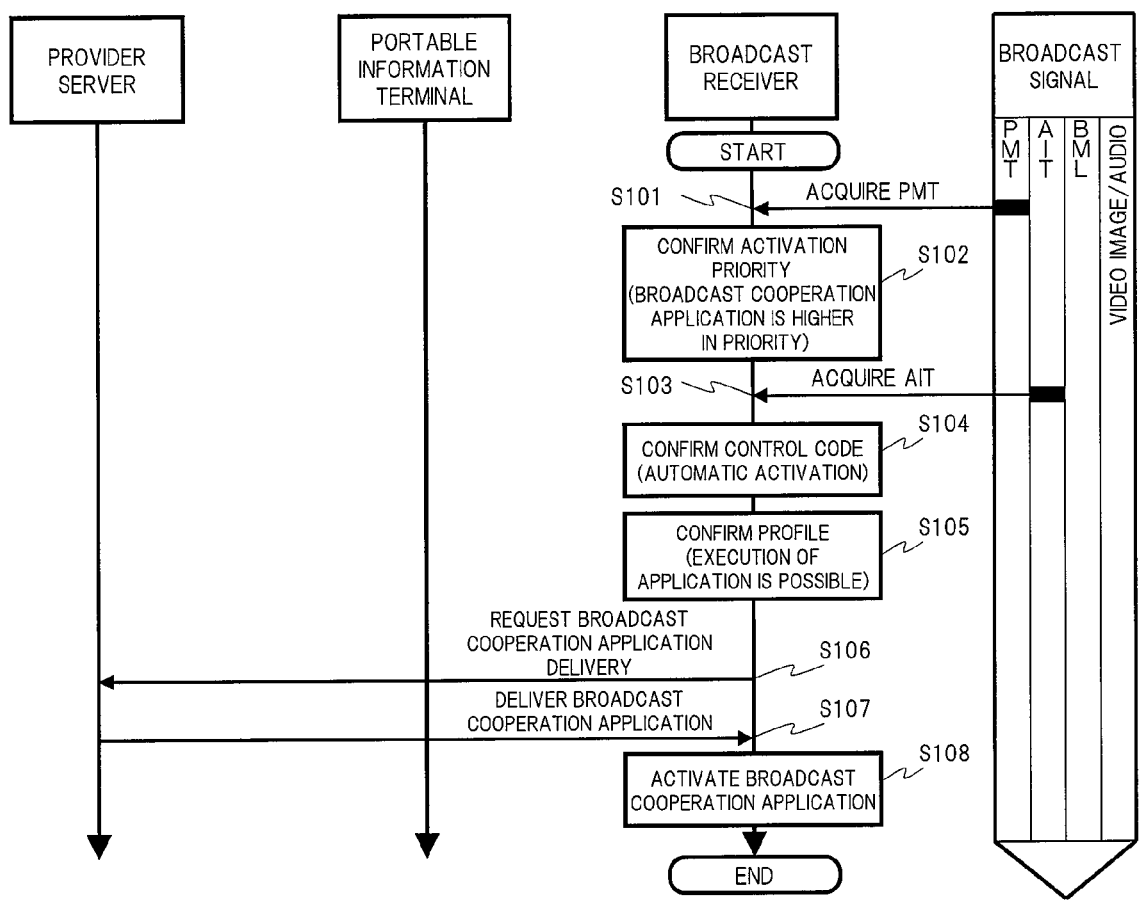
FIG. 7A is a diagram showing an operation sequence at the time of activation of an application in the broadcast receiver in accordance with the first embodiment.

FIG. 7A is an operation sequence diagram showing one example of an operation sequence of a broadcast cooperation application in a case in which the broadcast cooperation application is prescribed to be preferentially activated. FIG. 7A shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S101) to confirm the activation priority described in the PMT. When it is confirmed that the broadcast cooperation application has a high activation priority in the process of S101 (S102), the application control unit 161 acquires the AIT data row separated in the first separation unit 132 (S103) and confirms the application control code 903 of the acquired AIT data row (S104). In a case in which the application control code 903 is "automatic activation" in the process of S104, the application control unit 161 further confirms the application profile 904 of the AIT data row acquired as described above (S105), and in a case in which it is confirmed that the broadcast cooperation application specified by the AIT is executable, based on information described in the application acquisition source information 905, the application control unit 161 transmits a transmission request for the broadcast cooperation application to the predetermined service provider server 400 via the LAN communication unit 121 (S106).

The service provider server 400 that receives the transmission request for the broadcast cooperation application carries out an authentication process on the broadcast receiver 100 based on the control of the application managing/distributing execution unit 4103, if necessary, and then carries out a delivery of the predetermined broadcast cooperation application stored in the application storage region 4013 via the LAN communication unit 421 (S107). Note that, with respect to the above-mentioned authentication process, a generally known method may be used, and the detailed description thereof will be omitted. Next, the application engine 162 of the broadcast receiver 100 activates the predetermined broadcast cooperation application which is delivered by the service provider server 400 and received via the LAN communication unit 121, based on the control of the application control unit 161 (S108).

FIG. 7B is an operation sequence diagram showing one example of an operation sequence of a broadcast cooperation application in a case in which a data broadcast by a broadcast service is prescribed to be preferentially activated. FIG. 7B shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S201) to confirm the activation priority described in the PMT. When it is confirmed that the data broadcast by a broadcast service has a high activation priority in the process of S201 (S202), the data broadcast receiving and processing unit 141 acquires a BML data row separated by the first separation unit 132 and reproduces the BML document (S203). In a case in which the automatic activation of the data broadcast is set by the BML document, if the user requests the activation of the data broadcast by using an operation terminal (portable information terminal 700, remote controller, or the like) (S204), the data broadcast engine 142 generates data broadcast screen information by executing the reproduced BML document and displays the information on the video image display unit 173 (S205).

After the process of S205, or simultaneously as the process of S205, the application control unit 161 acquires the AIT data row separated by the first separation unit 132 (S206) and confirms the application profile 904 of the acquired AIT data row (S207). In the process of S207, it is confirmed that the broadcast cooperation application specified by the AIT can be executed, an entry button to the executable broadcast cooperation application is displayed on the data broadcast screen. The entry button may be always displayed, and only when the broadcast cooperation application is executable, the coloring thereof may be altered from a non-active color to an active color. The non-active state and the active state of the entry button may be switched by altering the shape thereof.

When the user selects the entry button by using the operation terminal (S208), the data broadcast engine 142 ends the process for generating the data broadcast screen information by executing the BML document (S209). Subsequently, the application control unit 161 acquires the AIT data row separated by the first separation unit 132 (S210) and confirms the application acquisition source information 905 of the acquired AIT data row. Further, based on information described in the application acquisition source information 905 confirmed in S210, the application control unit 161 transmits a transmission request for the broadcast cooperation application to the predetermined service provider server 400, via the LAN communication unit 121 (S211).

The service provider server 400 that receives the transmission request for the broadcast cooperation application carries out an authentication process on the broadcast receiver 100, if necessary, based on the control of the application managing/distributing execution unit 4103 and then, delivers the predetermined broadcast cooperation application stored in the application storage region 4013 via the LAN communication unit 421 (S212). Next, the application engine 162 of the broadcast receiver 100 activates the predetermined broadcast cooperation application which is delivered by the service provider server 400 and received via the LAN communication unit 121, based on the control of the application control unit 161 (S213).

Figure 7C:
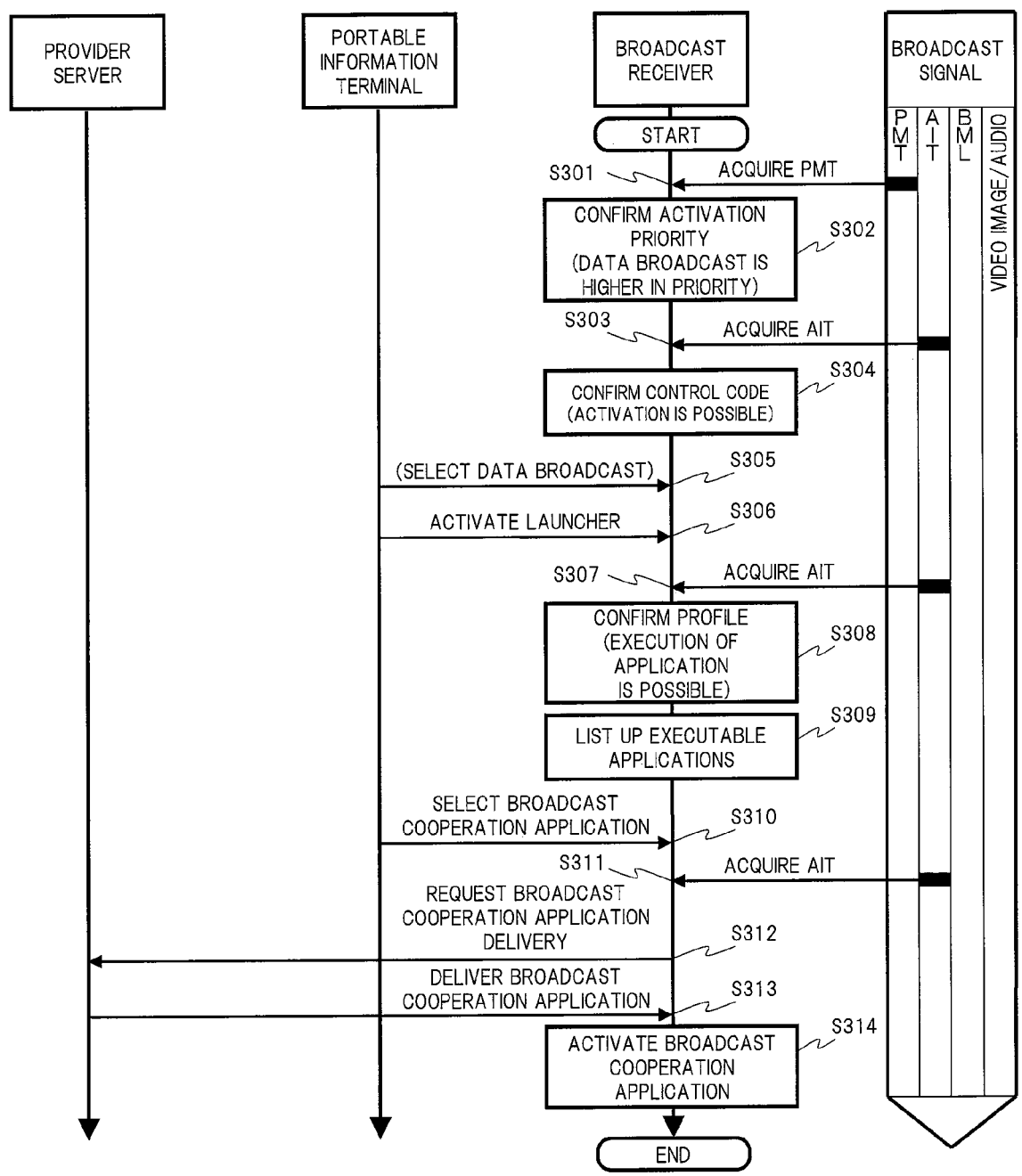
FIG. 7C is a diagram showing an operation sequence at the time of activation of an application in the broadcast receiver in accordance with the first embodiment.

FIG. 7C is an operation sequence diagram showing one example of an operation sequence of a broadcast cooperation application in a case in which no activation with priority is prescribed. FIG. 7C shows a series of flow until the broadcast receiver 100 activates a predetermined broadcast cooperation application after confirming the PMT and the AIT appropriately.

When the tuner/demodulation unit 131 of the broadcast receiver 100 acquires a TS by carrying out a selection process for a channel desired by the user, the main control unit 101 next acquires a PMT data row separated in the first separation unit 132 (S301) to confirm the activation priority described in the PMT. When it is confirmed that the broadcast cooperation application has a high activation priority in the process of S301 (S302), the application control unit 161 acquires the AIT data row separated in the first separation unit 132 (S303) and confirms the application control code 903 of the acquired AIT data row (S304). In the process of S304, the application control code 903 is not "automatic activation," but "activation is possible," it activates neither the data broadcast by a broadcast service nor the broadcast cooperation application, and continues to display a broadcast program.

In a case in which the user requests the activation of a data broadcast by using the operation terminal (S305) after the end of the process of S304, like the process of S205 in FIG. 7B and the subsequent steps, the acquisition of the BML data row, the reproduction of the BML document, the generation of the data broadcast screen information, and the like (omitted in the drawing) are carried out. Meanwhile, in a case in which the user requests the activation of a broadcast cooperation application launcher by using the operation terminal (S306) after the end of the process of S304, the application control unit 161 acquires the AIT data row separated in the first separation unit 132 (S307) and confirms the application profile 904 of the acquired AIT data row (S308). Further, the application control unit 161 displays a list of executable broadcast cooperation applications on the video image display unit 173 as a broadcast cooperation application launcher (S309).

When the user selects a predetermined broadcast cooperation application from the broadcast cooperation application launcher displayed in S309 by using the operation terminal (S310), the application control unit 161 acquires the AIT data row separated in the first separation unit 132 (S311) and confirms the application acquisition source information 905 of the acquired AIT data row. Further, based on information described in the application acquisition source information 905 confirmed in S311, the application control unit 161 transmits a transmission request for a broadcast cooperation application to the predetermined service provider server 400 via the LAN communication unit 121 (S312).

The service provider server 400 that receives the transmission request for the broadcast cooperation application carries out an authentication process on the broadcast receiver 100 based on the control of the application managing/distributing execution unit 4103, if necessary and then, carries out a delivery of the predetermined broadcast cooperation application stored in the application storage region 4013 via the LAN communication unit 421 (S313). Next, the application engine 162 of the broadcast receiver 100 activates the predetermined broadcast cooperation application which is delivered by the service provider server 400 and received via the LAN communication unit 121, based on the control of the application control unit 161 (S314).

Note that, in the activation sequence of the broadcast cooperation application described with reference to FIG. 7A to FIG. 7C, a configuration example in which an AIT is acquired from a broadcast wave is described in any cases; however, an AIT file may be acquired from a predetermined server device specified by an information description of a PMT or the like. Moreover, the acquisition of the broadcast cooperation application may be carried out not from the server device (service provider server 400) on the network, but from the broadcast wave. That is, in a case in which location information described in the application acquisition source information 905 of the AIT indicates a broadcast wave, the application control unit 161 may reproduce an HTML document from an HTML data row transmitted in a data carousel method or the like, separated in the first separation unit 132, and outputted therefrom so that the application engine 162 can execute the reproduced HTML document (broadcast cooperation application).

Note that, when no information for specifying the activation priority in a case in which a data broadcast by a broadcast service and a broadcast cooperation application are simultaneously present on the PMT, the activation priority may be confirmed only by information such as the application control code 903 of the AIT, the activation priority 907, and the like. Similarly, also in a case in which acquisition of the information on the PMT is failed, the activation priority may be confirmed only by information such as the application control code 903 of the AIT, the activation priority 907, and the like. That is, confirmation of the AIT is regularly made without depending on the information on the PMT, and when a broadcast cooperation application specified by "automatic activation" in the application control code 903 of the AIT is present, the activation of the broadcast cooperation application is preferentially carried out, while when broadcast cooperation application specified by "automatic activation" in the application control code 903 of the AIT is not present, the activation of the data broadcast by a broadcast service may be preferentially carried out.

Moreover, in a case in which no response is given from the service provider server 400 for a predetermined period of time or more upon carrying out a delivery request for the broadcast cooperation application in each step S106, S211, and S312, a message such as "Please wait for a while" or the like may be displayed on the video image display unit 173. Alternatively, in this case, a massage for inquiring of the user about cancellation of the execution of the broadcast cooperation application may be displayed.

Furthermore, it is needless to say that the activation sequence of the broadcast cooperation application is not limited by the above-mentioned three patterns, but may be activated by a different sequence.

[Operation Sequence of Portable Information Terminal at the Time of Cooperation]

In the broadcast receiver 100 of the present embodiment, a function extension of the broadcast communication cooperation service is possible by a cooperative operation between the broadcast receiver 100 and the portable information terminal 700. For example, by installing an application (cooperation control application) prepared by the television receiver maker, the portable information terminal 700 can be used as a highly functional remote controller for the broadcast receiver 100. Moreover, by executing the broadcast cooperation application also on the portable information terminal 700, a service in cooperation with a broadcast program currently displayed on the broadcast receiver 100 can be displayed also on the portable information terminal 700, for example. Note that, in order to carry out a function expansion by the cooperative operation between the broadcast receiver 100 and the portable information terminal 700, the above-mentioned cooperation control application is desirably activated on the portable information terminal 700, and it is assumed that the broadcast cooperation application to be operated on the portable information terminal 700 is operated by being controlled by the cooperation control application.

Figure 8A:
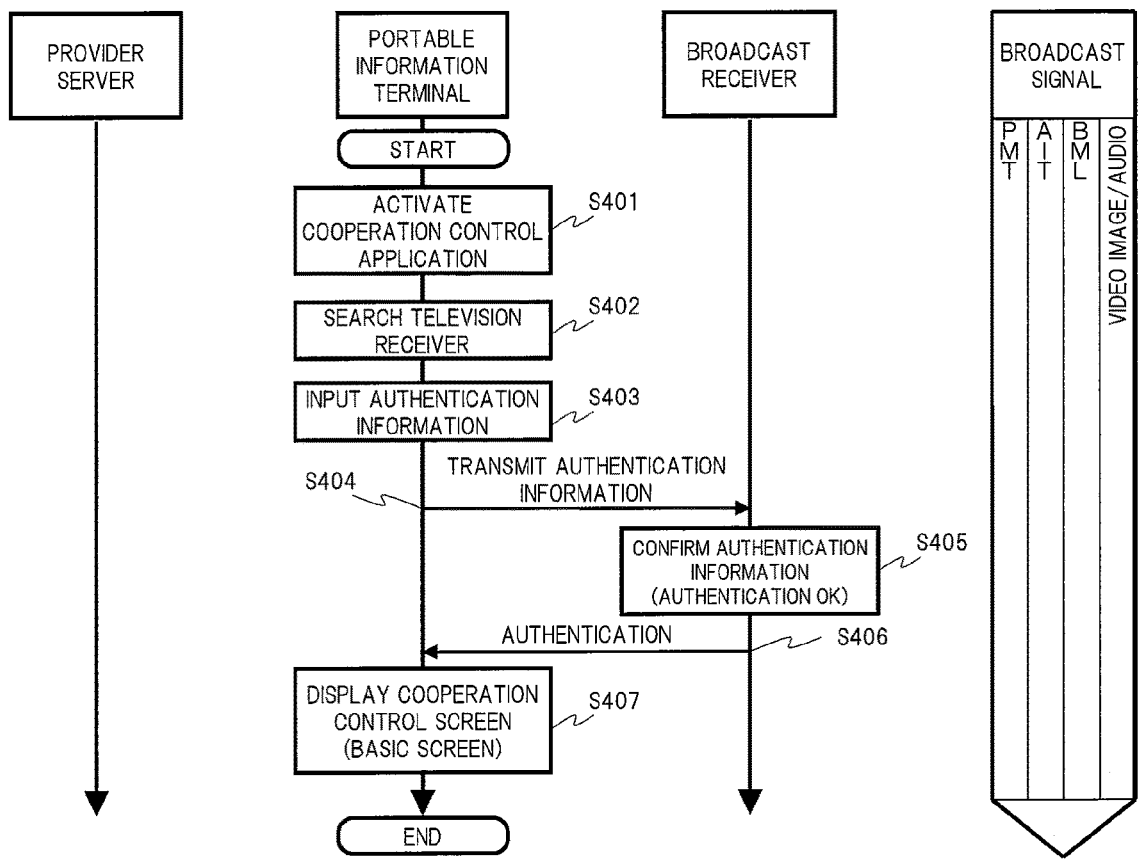
FIG. 8A is a diagram showing an operation sequence when the portable information terminal of the first embodiment is cooperatively used.

FIG. 8A is an operation sequence diagram showing one example of an operation sequence in activating the cooperation control application on the portable information terminal 700. FIG. 8A shows a series of flow (first time) until a cooperative operation becomes possible after the portable information terminal 700 carries out an authentication process with the broadcast receiver 100. Note that it is assumed that the cooperation control application is preliminarily installed in the storage unit 710 of the portable information terminal 700 as a cooperation control program 7002.

When the user gives an instruction for activation of the cooperation control application on the portable information terminal 700 (S401), the cooperation control execution unit 7102 of the portable information terminal 700 searches television receivers that can carry out communication (cooperative operation) on the network (S402) and displays the search results on the display unit 741 as a list of the television receivers. When the television receivers that can carry out communication are not found, the corresponding message is displayed to end the process. When the user selects a desired television receiver (broadcast receiver 100 in the present embodiment) from the list of television receivers, the cooperation control execution unit 7102 displays a log-in screen for connecting to the broadcast receiver 100 on the display unit 741. When the user inputs authentication information (log-in name, password, and the like specified by the broadcast receiver 100) to the log-in screen via the operation unit 730 (S403), the cooperation control execution unit 7102 stores the inputted authentication information in the authentication information storage region 7012 and simultaneously transmits to the broadcast receiver 100 (S404). Note that the transmitting process of the authentication information to the broadcast receiver 100 may be carried out via the LAN communication unit 721 and the router device 210 or may be directly carried out onto the broadcast receiver 100 via the NFC communication unit 723.

The terminal cooperation control unit 191 of the broadcast receiver 100 which receives the authentication information via the LAN communication unit 121 confirms whether or not the authentication information thus received is correct by referring to the authentication information storage region 1012 (S405). In a case in which the received authentication information is confirmed to be correct as a result of the process of S405, the terminal cooperation control unit 191 stores the information of the portable information terminal 700 in the authentication information storage region 1012 and also carries out an authentication process on the portable information terminal 700 (S406). The portable information terminal 700 authenticated by the broadcast receiver 100 displays a basic screen (for example, highly functional remote control screen) of the cooperation control application on the display unit 741 (S407). In a case in which the received authentication information is not confirmed to be correct in S405, the terminal cooperation control unit 191 of the broadcast receiver 100 returns an error to the portable information terminal 700. According to the above-mentioned process, the cooperative operation between the broadcast receiver 100 and the portable information terminal 700 becomes possible.

Figure 8B:
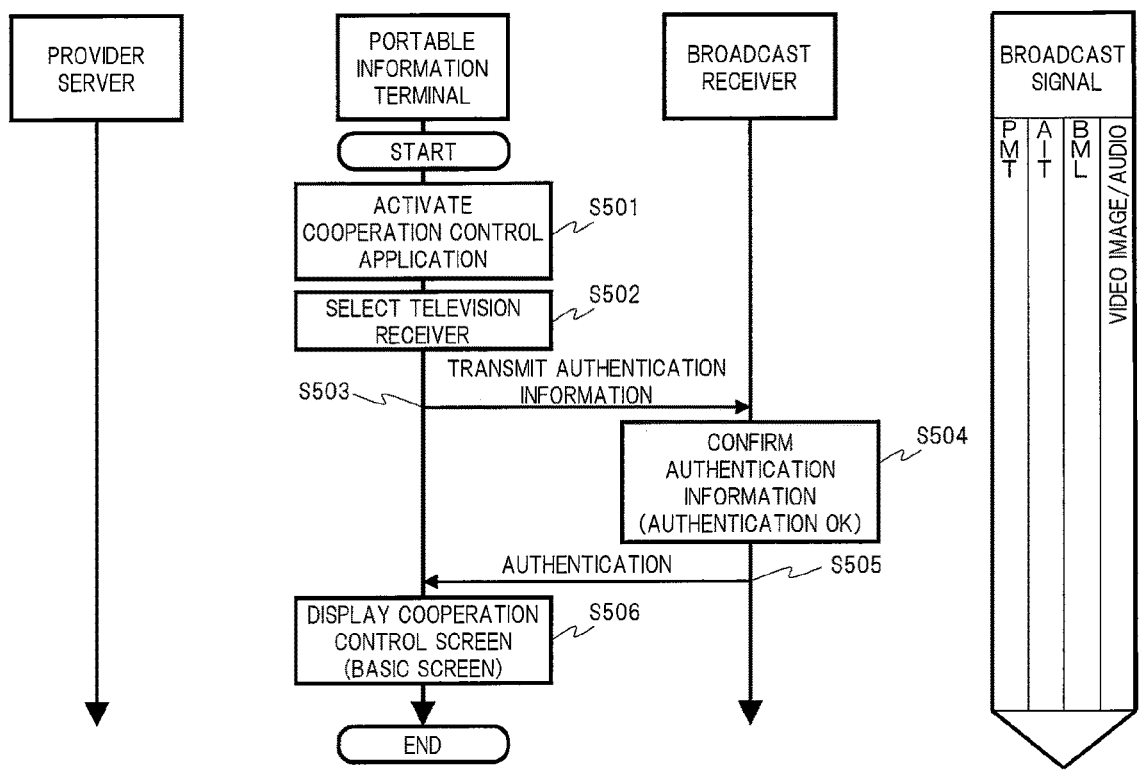
FIG. 8B is a diagram showing an operation sequence when the portable information terminal of the first embodiment is cooperatively used.

FIG. 8B is an operation sequence diagram showing one example of an operation sequence in activating the cooperation control application on the portable information terminal 700. FIG. 8B shows a series of flow (second time and thereafter) until a cooperative operation becomes possible after the portable information terminal 700 carries out an authentication process with the broadcast receiver 100.

When the user gives an instruction for activation of the cooperation control application on the portable information terminal 700 (S501), the cooperation control execution unit 7102 of the portable information terminal 700 searches television receivers that can carry out communication on the network and displays the search results on the display unit 741 as a list of the television receivers. When television receivers that can carry out communication are not found, the corresponding message is displayed to end the process. A desired television receiver (broadcast receiver 100 in the present embodiment) is selected from the list of television receivers by the user (S502), and when the selected broadcast receiver 100 is an device that has been connected (cooperative operation) therewith in the past, the cooperation control execution unit 7102 reads out the authentication information of the broadcast receiver 100 from the authentication information storage region 7012 to transmit the information to the broadcast receiver 100 (S503).

The terminal cooperation control unit 191 of the broadcast receiver 100 which receives the authentication information via the LAN communication unit 121 confirms whether or not the received authentication information is correct by referring to the authentication information storage region 1012 (S504). In a case in which the received authentication information is confirmed to be correct as a result of the process of S504, the terminal cooperation control unit 191 authenticates the portable information terminal 700 (S505). The portable information terminal 700 thus authenticated by the broadcast receiver 100 displays a basic screen of the cooperation control application on the display unit 741 (S506). According to the above-mentioned process, the cooperative operation between the broadcast receiver 100 and the portable information terminal 700 becomes possible.

Note that, in a case in which the broadcast cooperation application is activated in the broadcast receiver 100, subsequently to the processes in FIG. 8A and FIG. 8B, processes in FIG. 7A to FIG. 7C can be carried out after the processes in FIG. 8A and FIG. 8B.

Figure 8C:
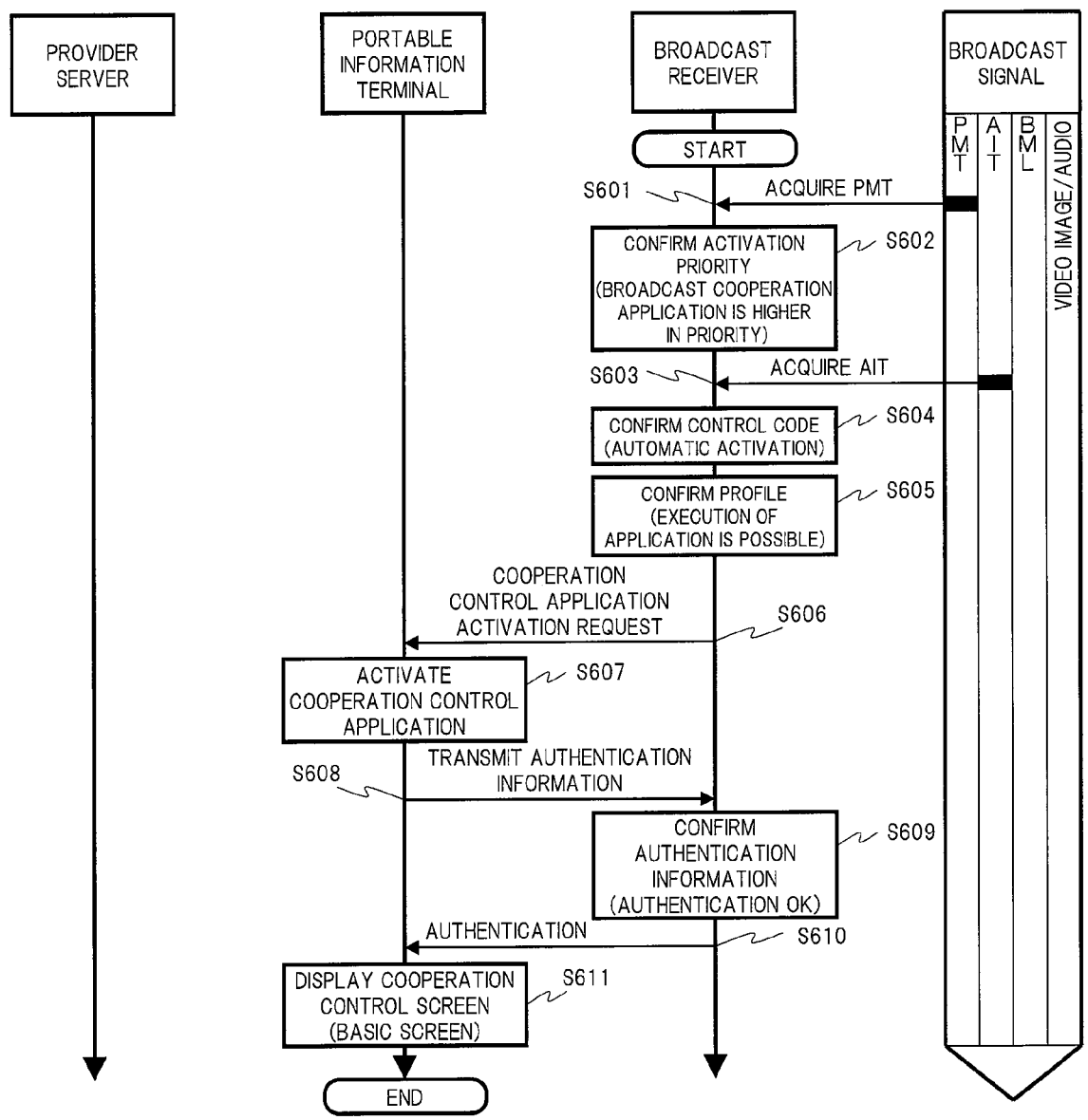
FIG. 8C is a diagram showing an operation sequence when the portable information terminal of the first embodiment is cooperatively used.

FIG. 8C is an operation sequence diagram showing one example of an operation sequence in activating the cooperation control application on the portable information terminal 700. FIG. 8C shows a series of flow (second time and thereafter) until a cooperative operation becomes possible after the portable information terminal 700 carries out an authentication process with the broadcast receiver 100. In this case, this figure exemplifies a case in which the activation of the cooperation control application is requested on the portable information terminal 700 by the broadcast receiver 100 that executes the activation sequence of the broadcast cooperation application.

When the tuner/demodulation unit 131 of the broadcast receiver 100 acquires a TS by carrying out a selection process for a channel desired by the user, the main control unit 101 next acquires a PMT data row separated in the first separation unit 132 (S601) to confirm the activation priority described in the PMT. When it is confirmed that the broadcast cooperation application has a high activation priority in the process of S601 (S602), the application control unit 161 acquires the AIT data row separated in the first separation unit 132 (S603) and confirms the application control code 903 of the acquired AIT data row (S604). In the process of S604, the application control code 903 is "automatic activation," the application control unit 161 further confirms the application profile 904 of the acquired AIT data row (S605). In the process of S605, the execution of the broadcast cooperation application specified by the AIT is confirmed to be possible, and further, when it is determined that the cooperation control of the portable terminal device is required, the terminal cooperation control unit 191 refers to the authentication information storage region 1012, thereby selecting the portable information terminal 700 as the portable terminal device to transmit a cooperation control application activation request to the selected portable information terminal 700 (S606).

Note that the selection of the portable information terminal 700 resulted from referring to the authentication information storage region 1012 may be carried out based on the newest information in the authentication information storage region 1012, or based on information which is most frequently used in the authentication information storage region 1012.

Moreover, in the process of S606, in a case in which no portable information terminal device to which the cooperation control application activation request is to be transmitted is found, the corresponding message may be displayed on the video image display unit 173. Alternatively, in this case, a message for inquiring of the user as to the cancellation of the execution of the broadcast cooperation application may be displayed.

The main control unit 701 of the portable information terminal 700 activates the cooperation control application (cooperation control execution unit 7102), in accordance with the cooperation control application activation request received via the LAN communication unit 721 (S607), and the cooperation control execution unit 7102 further reads out the authentication information of the broadcast receiver 100 from the authentication information storage region 7012 to transmit the information to the broadcast receiver 100 (S608).

The terminal cooperation control unit 191 of the broadcast receiver 100 which receives the authentication information via the LAN communication unit 121 confirms whether or not the received authentication information is correct by referring to the authentication information storage region 1012 (S609). In a case in which the received authentication information is confirmed to be correct as a result of the process of S609, the portable information terminal 700 is authenticated (S610). The portable information terminal 700 authenticated by the broadcast receiver 100 displays a basic screen of the cooperation control application on the display unit 741 (S611). According to the above-mentioned process, a cooperative operation between the broadcast receiver 100 and the portable information terminal 700 becomes possible.

Figure 9:
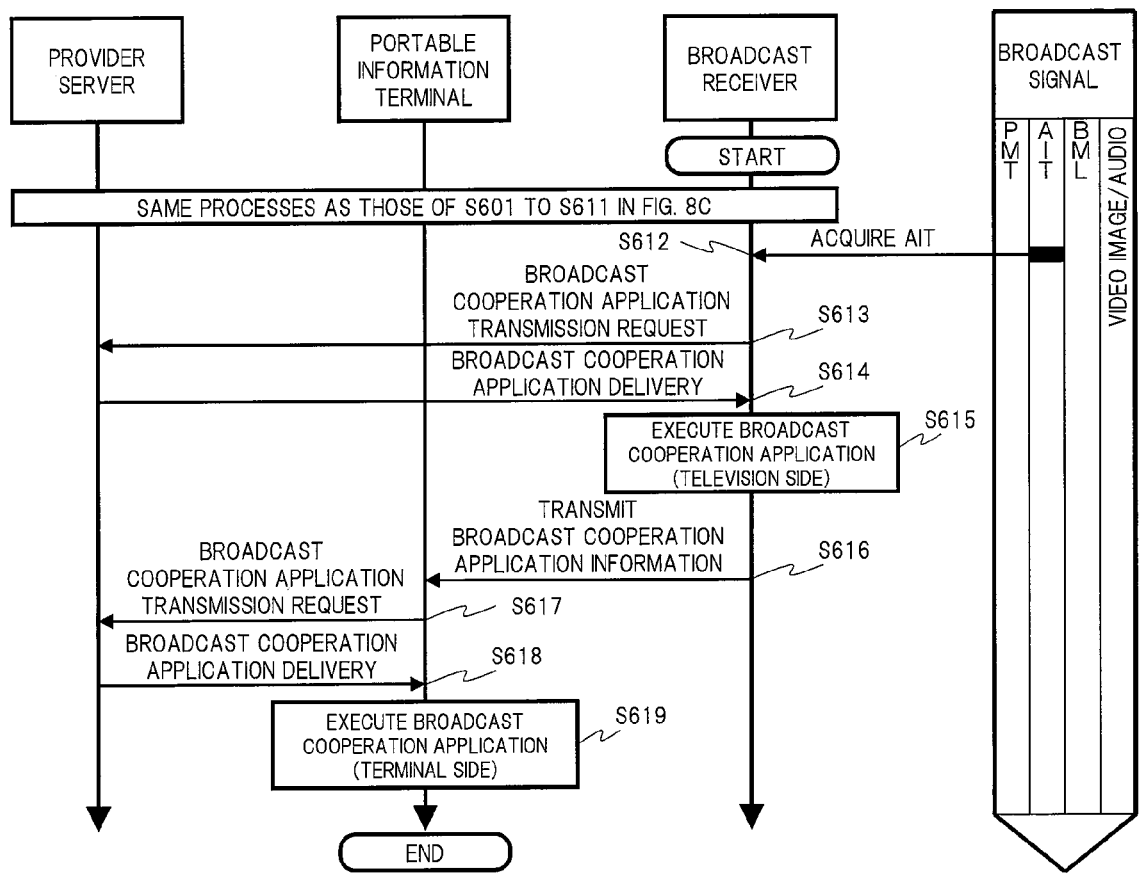
FIG. 9 is a diagram showing an operation sequence at the time of activation of an application in the broadcast receiver and the portable information terminal in accordance with the first embodiment.

Note that, in a case in which the broadcast cooperation application is executed in both of the broadcast receiver 100 and the portable information terminal 700 subsequently to the above-mentioned processes, processes shown in FIG. 9 may be carried out. FIG. 9 is an operation sequence diagram showing one example of an activation sequence of the broadcast cooperation application of the broadcast receiver 100 and the portable information terminal 700.

That is, after the processes of S601 to S611 shown in FIG. 8C, the application control unit 161 of the broadcast receiver 100 acquires an AIT data row separated in the first separation unit 132 (S612) and confirms the application acquisition source information 905 of the acquired AIT data row. Further, based on information described in the application acquisition source information 905 confirmed in S612, the application control unit 161 transmits a transmission request for the broadcast cooperation application (television side) to the predetermined service provider server 400 via the LAN communication unit 121 (S613).

The service provider server 400 that has received the transmission request for the broadcast cooperation application (television side) carries out an authentication process on the broadcast receiver 100 based on the control of the application managing/distributing execution unit 4103, if necessary, and then carries out a delivery of the predetermined broadcast cooperation application (television side) stored in the application storage region 4013 via the LAN communication unit 421 (S614). The application engine 162 of the broadcast receiver 100 activates the predetermined broadcast cooperation application (television side) which is delivered by the service provider server 400 and received via the LAN communication unit 121, based on the control of the application control unit 161 (S615).

Next, the terminal cooperation control unit 191 of the broadcast receiver 100 transmits the acquisition source URL information or the like of the broadcast cooperation application (terminal side) to be executed in the portable information terminal 700, acquired from the AIT or the broadcast cooperation application (television side) executed in S615, to the portable information terminal 700 (S616). The cooperation control execution unit 7102 of the portable information terminal 700 transmits a transmission request for the broadcast cooperation application (terminal side) to the predetermined service provider server 400 via the LAN communication unit 721, based on the acquisition source URL information or the like of the broadcast cooperation application (terminal side) received via the LAN communication unit 721 (S617).

The service provider server 400 that receives the transmission request for the broadcast cooperation application (terminal side) carries out an authentication process on the portable information terminal 700, if necessary, based on the control of the application managing/distributing execution unit 4103 and then, delivers the predetermined broadcast cooperation application (terminal side) stored in the application storage region 4013 via the LAN communication unit 421 (S618). The HTML browser engine 7103 of the portable information terminal 700 activates the predetermined broadcast cooperation application (terminal side) which is delivered by the service provider server 400 and received via the LAN communication unit 721 (S619).

Note that the acquisition of an AIT file is possible from a predetermined server, the acquisition of the broadcast cooperation application can be carried out not from the server device on the network, but from a broadcast wave, and the like are the same as those of the operation sequence shown in FIG. 7A to 7C. Note that, in a case in which the acquisition of the broadcast cooperation application is carried out from the broadcast wave, the broadcast receiver 100 may be designed to acquire the broadcast cooperation application (terminal side) to be executed in the portable information terminal 700 and to transfer the acquired broadcast cooperation application (terminal side) to the portable information terminal 700 via the communication unit 121. Alternatively, the broadcast receiver 100 may be designed to acquire the broadcast cooperation application (terminal side) to be executed in the portable information terminal 700 and store in the storage unit 110, and in the process of S616 in FIG. 9, to transmit location information in the storage unit 110 of the broadcast receiver 100 as URL information to be transmitted to the portable information terminal 700. The broadcast receiver 100 may be designed to acquire the broadcast cooperation application (television side) from a broadcast wave, and the portable information terminal 700 may be designed to acquire the broadcast cooperation application (terminal side) from a server device on the network. By using a digital broadcast receiving function included in the portable information terminal 700, the acquisition of the broadcast cooperation application (terminal side) can be directly carried out from a broadcast wave.

Moreover, the operation sequences shown in FIG. 7A to FIG. 7C, FIG. 8A to FIG. 8C, and FIG. 9 may be partially combined with one another appropriately, and partial operation steps may be appropriately replaced with other operation steps in the order or may be simultaneously operated with other operation steps, for example.

[Basic Screen of Cooperation Control Application of Portable Information Terminal]

Figure 10A:
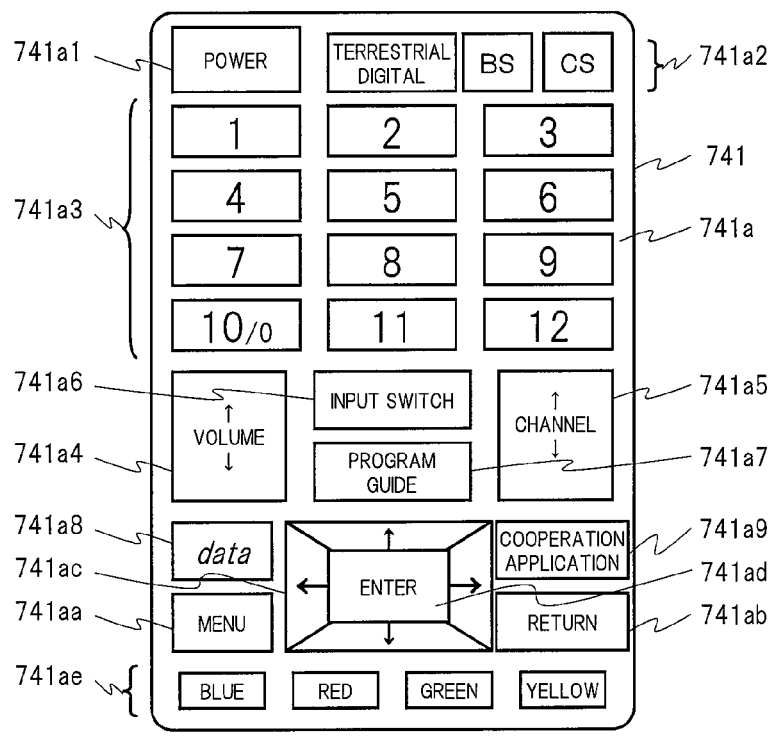
FIG. 10A is a screen display view showing a basic screen of a cooperation control application in the portable information terminal in accordance with the first embodiment.

FIG. 10A is a screen display view showing one example of a basic screen of a cooperation control application displayed in the process of S407 in FIG. 8A, the process of S506 in FIG. 8B, the process of S611 in FIG. 8C, and the like. In the present embodiment, it is assumed that a basic screen 741a of a cooperation control application is provided with functions as a highly functional remote controller corresponding to the broadcast receiver 100.

As shown in FIG. 10A, the basic screen 741a of the cooperation control application is constituted by a power key 741a1, network selection keys (digital terrestrial broadcast, BS, and CS) 741a2, numeral keys (1 to 12) 741a3, volume UP/DOWN key 741a4, channel UP/DOWN key 741a5, input switching key 741a6, program guide key 741a7, data key 741a8, cooperation application key 741a9, menu key 741aa, return key 741ab, cursor keys (up, down, left, right) 741ac, enter key 741ad, and color keys (blue, red, green, yellow) 741ae. Other operation keys may be further displayed.

When the above-mentioned respective operation keys are set to have the same key arrangements/operations as those of an exclusive remote controller attached to the broadcast receiver 100, improved usability can be achieved. Moreover, since the power key 741a1, the network selection keys 742a2, the numeral keys 741a3, and the like are supposed to have the same functions as the operation keys of a generally known television remote controller, the detailed descriptions thereof are omitted. The cooperation application key 741a9 is an operation key specially prepared for the broadcast communication cooperation function of the present embodiment.

Note that, in the processes of S204 in FIG. 7B and of S305 in FIG. 7C, by selecting the data key 741a8, the activation/end of data broadcast can be carried out. Moreover, in the processes of S208 in FIG. 7B and of S310 in FIG. 7C, by operating the cursor key 741ac and the enter key 741ad, selection can be made among the executable broadcast cooperation applications. Furthermore, in the processes of S306 in FIG. 7C, by selecting the cooperation application key 741a9, an activation request for a broadcast cooperation application launcher can be carried out.

In this manner, by preparing the cooperation application key 741a9 or another operation key having the same function on the basic screen 741a of the cooperation control application, the respective broadcast cooperation applications to be used in the broadcast cooperation system of the present embodiment can be easily selected/activated. Moreover, the cooperation application key 741a9 or another operation key having the same function may be installed in the exclusive remote controller attached to the broadcast receiver 100.

Figure 10B:
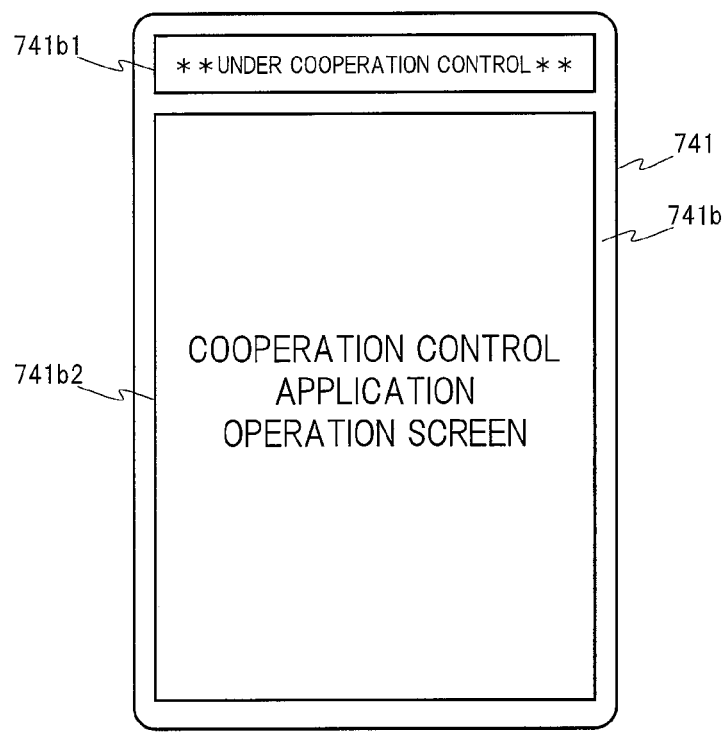
FIG. 10B is a screen display view showing the basic screen of the cooperation control application in the portable information terminal in accordance with the first embodiment.

FIG. 10B is a screen display view showing one example of a basic screen of a cooperation control application displayed in the process of S407 in FIG. 8A, the process of S506 in FIG. 8B, the process of S611 in FIG. 8C, and the like, which is different from the example of FIG. 10A.

The basic screen 741b of the cooperation control application is constituted by a message 741b1 under cooperation control and a cooperation control application operation screen 741b2. Other objects may be further displayed. The message 741b1 under cooperation control is a message display for allowing the user to recognize that the portable information terminal 700 is in cooperative operation with the broadcast receiver 100. The cooperation control application operation screen 741b2 corresponds to a region in which a desired screen display is carried out by the cooperation control application, and detailed description thereof will be omitted in the present embodiment. For example, the configuration in the cooperation control application operation screen 741b2 may be the same as the configuration of the basic screen 741a of the above-mentioned cooperation control application. A sub-screen or the like of a broadcast program displayed on the broadcast receiver 100 may be displayed.

As shown in FIG. 10B, by displaying the message 741b1 under cooperation control as shown in FIG. 10B, the user of the portable information terminal 700 can easily understand that the portable information terminal 700 is in cooperative operation with the broadcast receiver 100. Note that the message 741b1 under cooperation control may be indicated by not only a character display but also a symbol display, a graphic display, or the like. A difference in background color or the like may be used in place of the message 741b1 under cooperation control.

[Data Broadcast Screen of Broadcast Receiver]

Figure 11:
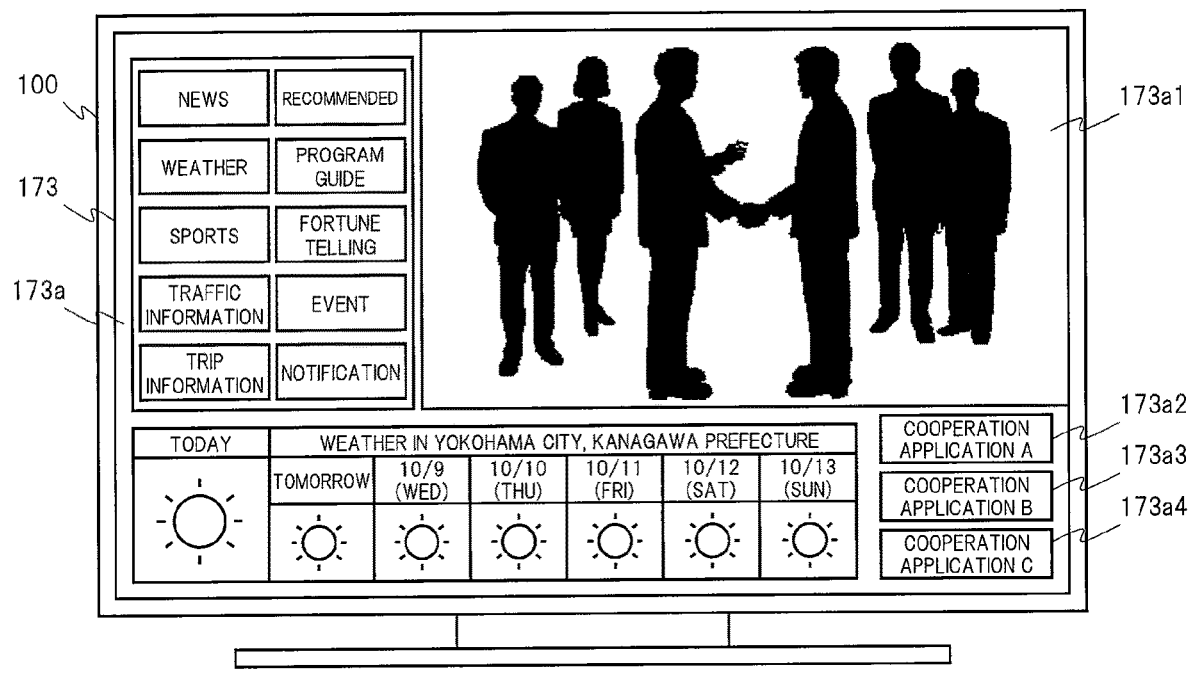
FIG. 11 is a screen display view showing a data broadcast screen in the broadcast receiver in accordance with the first embodiment.

FIG. 11 is a screen display view showing one example of a data broadcast screen displayed as a result of the process of S205 in FIG. 7B. In the present embodiment, three broadcast cooperation applications including a cooperation application A, a cooperation application B, and a cooperation application C are set in an executable state in the broadcast receiver 100 by the description of AIT or the like. In this case, an entry button 173a2 of the cooperation application A, an entry button 173a3 of the cooperation application B, and an entry button 173a4 of the cooperation application C are displayed at desired positions on the data broadcast screen 173a.

On the data broadcast screen 173a shown in FIG. 11, when the entry button 173a2, the entry button 173a3, the entry button 173a4, or the like is selected by using the cursor key 741ac and the enter key 741ad of the basic screen 741a of the cooperation control application, the display of the data broadcast screen 173a is ended, and the cooperation application A, the cooperation application B, the cooperation application C, or the like is activated by the control of the application control unit 161 and the application engine 162.

Note that, upon displaying the data broadcast screen 173a, the frame color, internal color, shape, character shape, size, flickering status, or the like of each entry button may be altered appropriately, depending on the kinds of the broadcast cooperation applications, security status, or the like. For example, in a case in which the cooperation application A is a broadcast managed application, the frame color of the entry button 173a2 is set to a blue, in a case in which the cooperation application B is an out-of-broadcast managed application, the frame color of the entry button 173a3 is set to a yellow, and in a case in which the cooperation application C is a general application, the frame color of the entry button 173a4 is set to a red, and the like. Alternatively, in a case in which it is determined that the cooperation application A is reliable in terms of security, the frame color of the entry button 173a2 is set to a blue, in a case in which it is determined that the cooperation application B is not necessarily reliable in terms of security, the frame color of the entry button 173a3 is set to a yellow, and in a case in which it is determined that the cooperation application C is dangerous in terms of security, the frame color of the entry button 173a4 is set to a red, and the like.

In addition, depending on functions and genres of the broadcast cooperation applications or depending on the expiration date for use or the like of the respective broadcast cooperation applications, the frame color, internal color, shape, character shape, size, flickering status, or the like of each entry button may be altered appropriately. Depending on whether or not the broadcast cooperation application has been acquired from the network or the like, the frame color, internal color, shape, character shape, size, flickering status, or the like of each entry button may be altered appropriately.

For example, in a case in which the cooperation application A has already been acquired from the network (has already been cached in the RAM 104 or the storage unit 110), the frame color of the entry button 173a2 is set to a blue, in a case in which the cooperation application B is being acquired, the frame color of the entry button 173a3 is set to a yellow, and in a case in which the cooperation application C has not been acquired, the frame color of the entry button 173a4 is set to a red, and the like.

By using this arrangement, the user of the broadcast receiver 100 can easily understand the kind, security status, or the like of the executable broadcast cooperation application in the broadcast receiver 100.

[Broadcast Cooperation Application Launcher Screen of Broadcast Receiver]

Figure 12A:
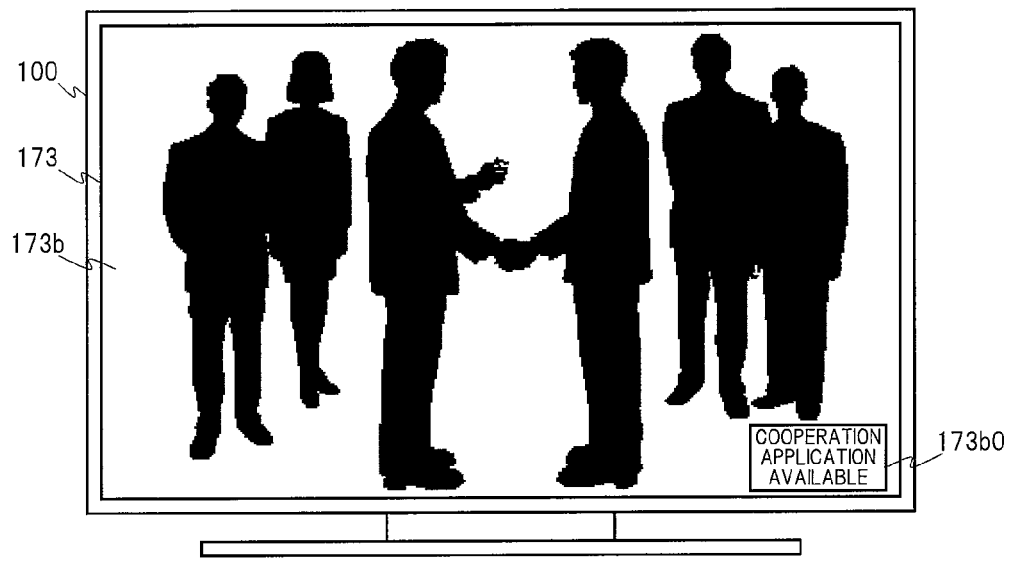
FIG. 12A is a screen display view showing a notification screen in the broadcast receiver in accordance with the first embodiment.

FIG. 12A is a screen display view showing one example of a notification screen for allowing the user to recognize that there is a broadcast cooperation application that can be activated in the broadcast receiver 100 of the present embodiment.

For example, in the operation sequence shown in FIG. 7C, after the process of S304, the display of a broadcast program is continuously given without any activation of a data broadcast by a broadcast service and a broadcast cooperation application. Meanwhile, in this case, by displaying the icon 173b0 shown in FIG. 12A in order to allow the user to recognize that there is a broadcast cooperation application that can be activated, improved usability in the broadcast receiver 100 is achieved. That is, by displaying the icon 173b0, it becomes possible to prevent the user from failing to see the broadcast cooperation application that can be activated.

Note that the display position of the icon 173b0 may be placed at any desired position on the screen; however, the position is desirably set to a position that does not disturb viewing of a broadcast program. For example, the position is set to each of four corners of the screen or the like. Moreover, the icon 173b0 may be indicated by a character display shown in FIG. 12A or may be indicated by a symbol display, a graphic display, or the like. Furthermore, the icon 173b0 may be always displayed or may be displayed only during a predetermined period of time after turning on the power or switching channels. Alternatively, the display thereof may be given simultaneously as the program information, the channel number, or the like is displayed.

Figure 12B:
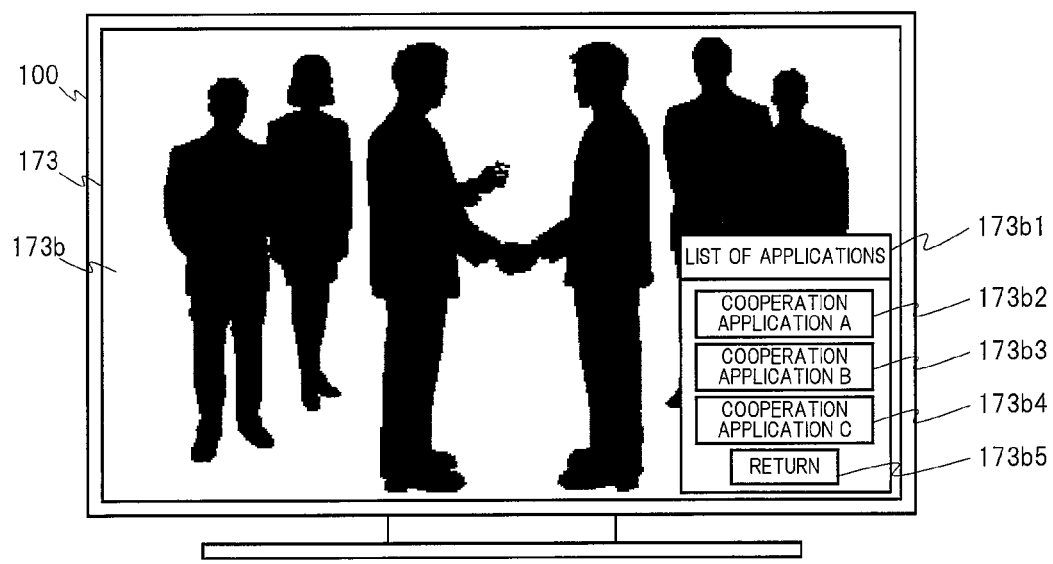
FIG. 12B is a screen display view showing a broadcast cooperation application launcher in the broadcast receiver in accordance with the first embodiment.

FIG. 12B is a screen display view showing one example of a broadcast cooperation application launcher to be displayed as a result of the process of S306 in FIG. 7C. In the present embodiment, three broadcast cooperation applications including a cooperation application A, a cooperation application B, and a cooperation application C are set in an executable state in the broadcast receiver 100 by the description of AIT or the like. In this case, a broadcast cooperation application launcher 173b1 is displayed at a desired position on a broadcast program screen 173b, and an entry button 173b2 of the cooperation application A, an entry button 173b3 of the cooperation application B, an entry button 173b4 of the cooperation application C, and a return button 173b5 are further displayed in the broadcast cooperation application launcher 173b1.

In a state where the broadcast cooperation application launcher 173b1 shown in FIG. 12B is displayed, when the entry button 173b2, the entry button 173b3, the entry button 173b4, or the like is selected by using the cursor key 741ac and the enter key 741ad of the basic screen 741a of the cooperation control application, the cooperation application A, the cooperation application B, the cooperation application C, or the like is activated by the control of the application control unit 161 and the application engine 162. In a case in which the return button 173b5 is selected, the display of the broadcast cooperation launcher 173b1 is ended.

Note that the point that the frame color, internal color, shape, character shape, size, flickering status, or the like of each entry button may be altered appropriately upon displaying the broadcast cooperation launcher 173b1 on the broadcast program screen 173b, depending on the kind and security status of a broadcast cooperation application, the functions and genres of the broadcast cooperation applications, the acquiring status of the broadcast application from the network, or the like is the same as in a case in which the entry buttons for the respective broadcast cooperation applications are displayed on the data broadcast screen 173a in FIG. 11.

Moreover, in a case in which no broadcast cooperation application that is executable in the broadcast receiver 100 is present, it may be designed in such a way that the broadcast cooperation application launcher 173b1 is not displayed. Alternatively, in this case, it may be designed in such a way that a message such as "no usable application is present" is displayed inside the broadcast cooperation application launcher 173b1.

[Broadcast Cooperation Application Execution Screen of Broadcast Receiver]

Figure 13A:
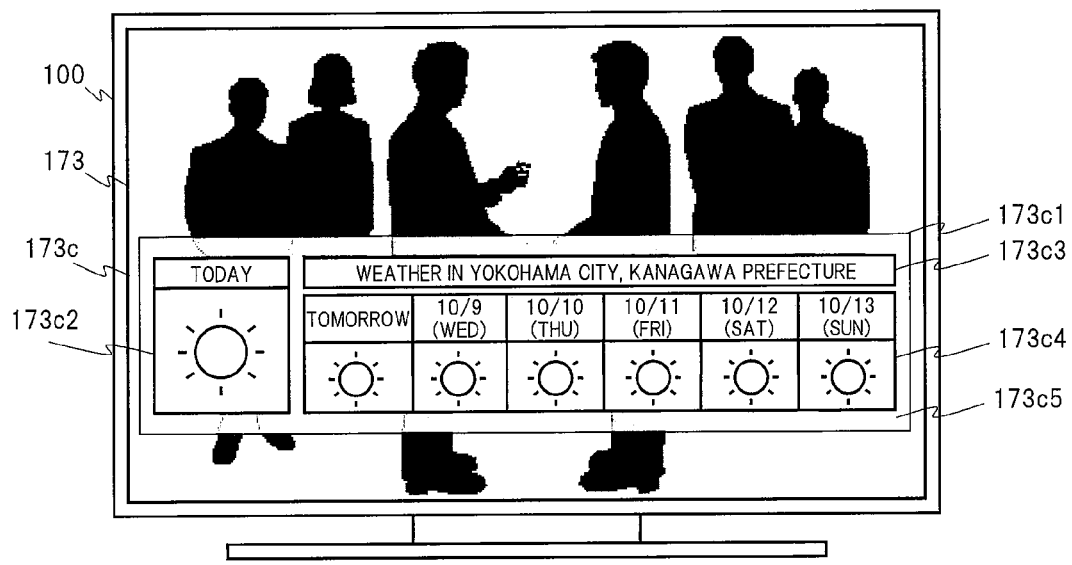
FIG. 13A is a screen display view showing a broadcast cooperation application executing screen in the broadcast receiver in accordance with the first embodiment.

FIG. 13A is a screen display view showing one example of a broadcast cooperation application execution screen that is displayed in the process of S108 in FIG. 7A, the process of S213 in FIG. 7B, the process of S314 in FIG. 7C, the process of S615 in FIG. 9, or the like. The broadcast cooperation application of the present embodiment is provided with a graphics performance, an effect performance, or the like by the HTML description, and is capable of providing an overlay display with a broadcast program screen on the video image display unit 173. For example, as shown in FIG. 13A, a broadcast cooperation application unit 173c1 which displays information such as weather forecast, news, or the like is overlaid and displayed at a desired position on the broadcast program screen 173c. The broadcast cooperation application unit 173c1 is constituted by a first main object 173c2, a second main object 173c3, a third main object 173c4, a background object 173c5, or the like. Other objects may be further displayed.

In a state where the broadcast cooperation application unit 173c1 is overlaid and displayed on the broadcast program screen 173c, by selecting a data key 741a8 of basic screen 741a of the cooperation control application, the execution of the broadcast cooperation application can be ended to move to a data broadcast screen. Moreover, by selecting the cooperation application key 741a9 of the basic screen 741a of the cooperation control application, the execution of the broadcast cooperation application can be ended to return to the display of only the broadcast program screen 173c. The above-mentioned processes may be achieved by using different operation keys.

Moreover, in a state where the broadcast cooperation application unit 173c1 is overlaid and displayed on the broadcast program screen 172c, by operating the respective operation keys of the basic screen 741a of the cooperation control application, the transmittance of the broadcast cooperation application unit 173c1 can be altered. The altering process of the transmittance may be carried out collectively on the entire broadcast cooperation application unit 173c1 or may be carried out independently on the first main object 173c2, the second main object 173c3, the third main object 173c4, and the background object 173c5. The altering process of the transmittance may also be carried out on each of predetermined groups (for example, a plurality of objects that are present in the same graphics layer).

Upon carrying out the altering process of the transmittance, for example, an object is selected by using the cursor key 741ac of the basic screen 741a of the cooperation control application, and the transmittance of the object is increased by the "blue" key of the color keys 741ae, or the transmittance of the object is reduced by the "yellow" key. The altering process of the transmittance may be carried out by using different operation keys. By collectively setting the transmittance of the entire broadcast cooperation application unit 173c1 to 100%, the broadcast cooperation application unit 173c1 can be temporarily set to a non-display state. For example, in a case in which an emergency broadcast is delivered by a broadcast wave, by setting the transmittance of the entire broadcast cooperation application unit to 100%, only the broadcast program screen of the emergency broadcast can be displayed on the video image display unit 173. Alternatively, a CM detection unit, not shown, detects that a broadcast program is moved to CM video images from the main video images to control the transmittance of the broadcast cooperation application unit 173c1 in such a way that the transmittance of the entire broadcast cooperation application unit 173c1 is collectively set to 100% (or to a transmittance that allows the video images of the broadcast program to be clearly checked).

By carrying out the above-mentioned processes, when the user wants to confirm a broadcast program screen located on the background during the execution of the broadcast cooperation application, it becomes possible to confirm the broadcast program screen without ending the broadcast cooperation application.

Figure 13B:
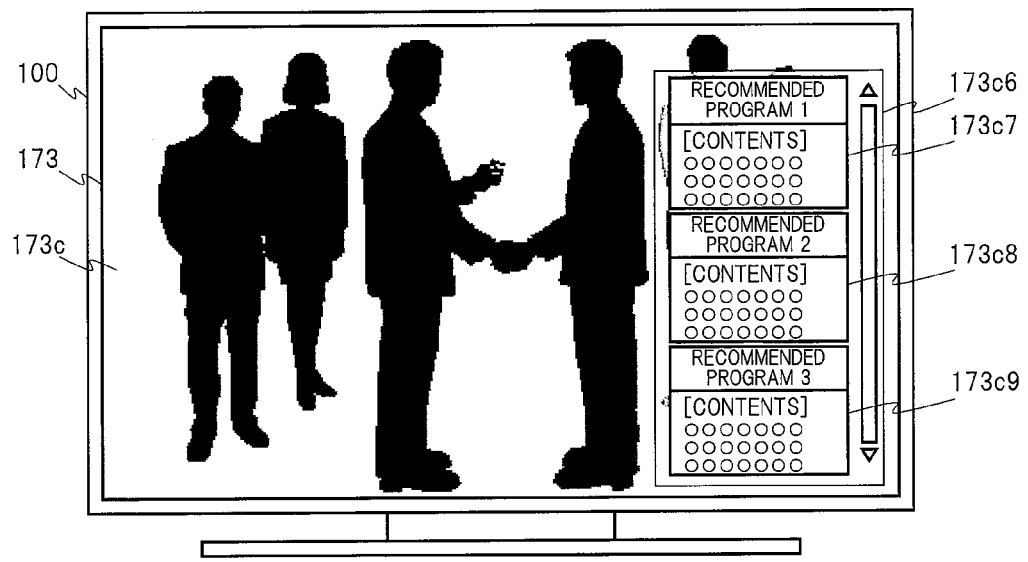
FIG. 13B is a screen display view showing the broadcast cooperation application executing screen in the broadcast receiver in accordance with the first embodiment.

FIG. 13B is a screen display view showing one example different from the above-mentioned example and of a broadcast cooperation application execution screen displayed in the process of S108 in FIG. 7A, the process of S213 in FIG. 7B, the process of S314 in FIG. 7C, the process of S615 in FIG. 9, or the like. In the example shown in FIG. 13B, a broadcast cooperation application unit 173c6 for introducing a recommended program is overlaid and displayed at a desired position on the broadcast program screen 173c. In the broadcast cooperation application unit 173c6, first recommended program information 173c7, second recommended program information 173c8, third recommended program information 173c9, and the like are displayed. A more number of pieces of recommended program information may be displayed by using scrolling, page switching, or the like.

Each piece of the recommended program information may be information of a program recommended relating to the broadcast program (broadcast program screen 173c) currently displayed, information of a program recommended based on viewing history of the user, or information of a program that is popular on the Internet or the like. It may be information of a recommended program sent to the user by a friend of the user of the broadcast receiver 100. Moreover, the above-mentioned recommended program may be a program transmitted by a broadcast wave by the digital broadcast service or may be a VOD (Video On Demand) program or the like delivered by each of the server devices on the Internet 200. It may be an information screen of a homepage or the like prepared in a server device on the Internet 200.

In a state where the broadcast cooperation application unit 173c6 is overlaid and displayed on the broadcast program screen 173c, the first recommended program information 173c7, the second recommended program information 173c8, the third recommended program information 173c9, or the like are selected by using the cursor key 741ac and the enter key 741ad of the basic screen 741a of the cooperation control application, so that video images of each of the respective programs recommended by the first recommended program information 173c7, the second recommended program information 173c8, the third recommended program information 173c9, or the like are displayed on the display unit 173.

Figure 13C:
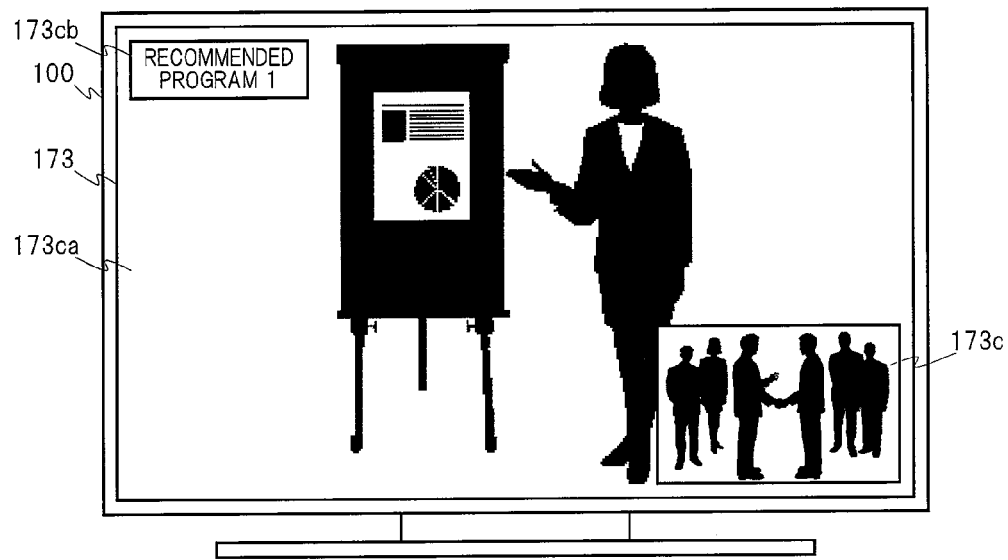
FIG. 13C is a screen display view showing the broadcast cooperation application executing screen in the broadcast receiver in accordance with the first embodiment.

FIG. 13C is a screen display view showing one example in which a program video image recommended by the broadcast cooperation application unit 173c6 for introducing the recommended program is displayed. For example, in a case in which the first recommended program information 173c7 of the broadcast cooperation application unit 173c6 is selected by using the cursor key 741ac and the enter key 741ad of the basic screen 741a of the cooperation control application, a program video image 173ca of a program recommended by the first recommended program information 173c7 is displayed on the display unit 173. The user operates the operation terminal in such a way that a temporary stop, a time specified jump, or the like of the program video image 173ca can be carried out. Moreover, upon displaying the program video image 173ca, the previous broadcast program screen 173c may be displayed at a desired position in a PIP (Picture In Picture) format. In this case, alternation may be made as to which screen of the program video image 173ca of the recommended program and the previous broadcast program screen 173c is set as the main screen by the operation of the user onto the operation terminal. The size of the window of the previous broadcast program screen 173c may be adjusted by the operation of the user onto the operation terminal.

Moreover, when an icon display 173cb indicating that the video image 173ca of the recommended program is an video image displayed by selecting any one of the pieces of the recommended program information displayed in the broadcast cooperation application unit 173c6 is displayed at a desired position on the screen, usability for the user can be improved. Furthermore, it is needless to say that also in the broadcast cooperation application execution screen shown in FIG. 13B, the transmittance of the broadcast cooperation application unit 173c6 may be altered in the same manner as described earlier.

Figure 13D:
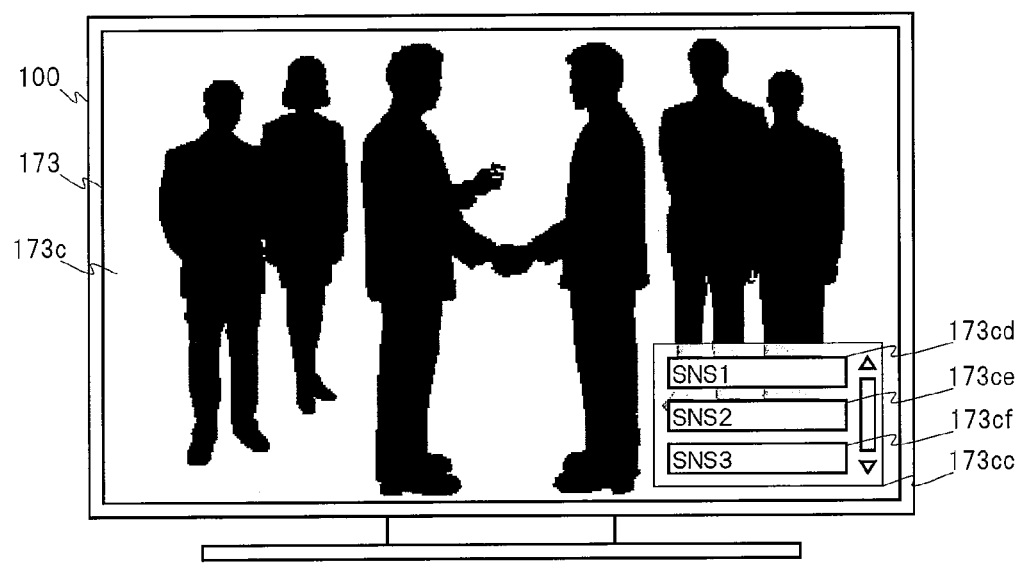
FIG. 13D is a screen display view showing the broadcast cooperation application executing screen in the broadcast receiver in accordance with the first embodiment.

FIG. 13D is a screen display view showing one example different from the above-mentioned example and of the broadcast cooperation application execution screen displayed in the process of S108 in FIG. 7A, the process of S213 in FIG. 7B, the process of S314 in FIG. 7C, the process of S615 in FIG. 9, or the like. In the example shown in FIG. 13D, at a desired position on the broadcast program screen 173c, a broadcast cooperation application unit 173cc forming a portal of an SNS (Social Networking Service) service is overlaid and displayed. In the broadcast cooperation application unit 173cc, an entry button 173cd of a first SNS service, an entry button 173ce of a second SNS service, an entry button 173cf of a third SNS service, and the like are displayed. More entry buttons for the SNS service may be displayed by using scrolling, page switching, or the like.

In a state where the broadcast cooperation application unit 173cc is overlaid and displayed on the broadcast program screen 173c, the entry button 173cd of the first SNS service, the entry button 173ce of the second SNS service, the entry button 173cf of the third SNS service, or the like are selected by using the cursor key 741ac and the enter key 741ad of the basic screen 741a of the cooperation control application, so that functions assigned to the respective entry buttons such as a chat function, a bulletin board function, an Internet telephone function, and the like, are activated. Thus, the user is allowed to enjoy the broadcast program (broadcast program screen 173c) currently displayed, while exchanging information with other people. Moreover, at the same time, the basic screen 741a of the cooperation control application on the portable information terminal 700 may be altered to a character input screen such as a software keyboard or the like, an audio input screen for chatting by audio input or writing in a bulletin board, or the like.

Furthermore, as a broadcast cooperation application executable in the broadcast receiver 100 of the present embodiment, in addition to the above-mentioned example, such a configuration may be used in which a related CM application is offered on both of the broadcast receiver 100 and the portable information terminal 700 further in synchronism with a broadcast timing of the CM, by utilizing the cooperative function between the broadcast receiver 100 and the portable information terminal 700. Alternatively, in a pay service available in the broadcast receiver 100, the broadcast cooperation application confirms whether or not the user of the broadcast receiver 100 subscribes the pay service, and in accordance with the result thereof, the display of the broadcast receiver 100 and/or the portable information terminal 700 may be altered. In the broadcast receiver 100 of the present embodiment, even when any of the broadcast cooperation applications are executed, the effects as described with reference to FIG. 13A, FIG. 13B, and the like can be obtained.

[Error Display Screen of Broadcast Receiver]

Figure 14:
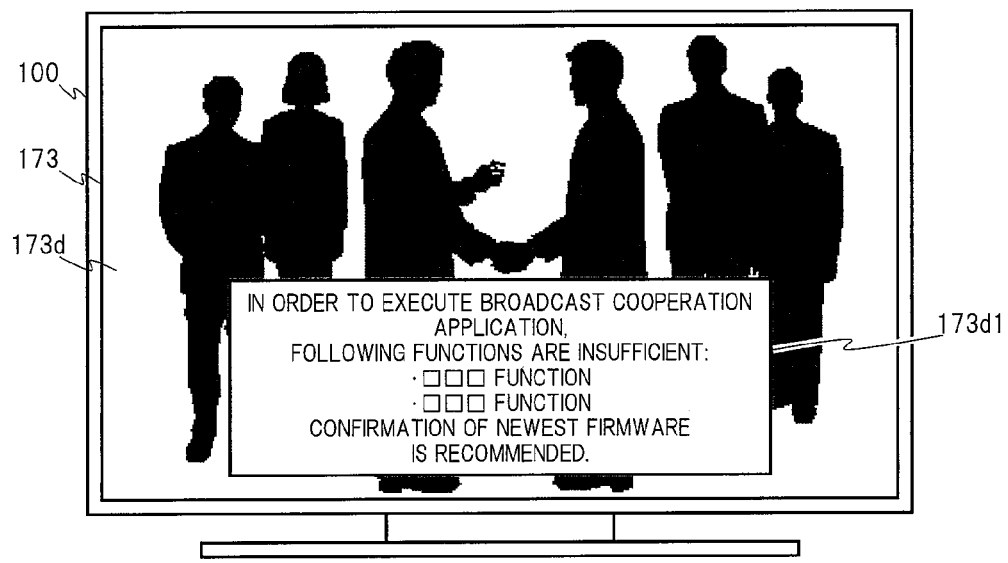
FIG. 14 is a screen display view showing an error display screen in the broadcast receiver in accordance with the first embodiment.

FIG. 14 is a screen display view showing an example of an error display screen that is given in the process of S105 in FIG. 7A, the process of S207 in FIG. 7B, the process of S308 in FIG. 7C, the process of S605 in FIG. 8C, or the like, in a case in which it is determined that the execution of the broadcast cooperation application is not possible by confirming an application profile 904 of the acquired AIT data row or the like, for example, in a case in which the description of the AIT is insufficient, or in a case in which acquisition of the AIT fails.

In the broadcast receiver 100 of the present embodiment, when it is determined that the execution of the broadcast cooperation application is not possible, the reason that the execution of the broadcast cooperation application is not possible such as the result of confirming the application profile 904, is displayed on an error message 173d1. For example, when after the confirmation of the application profile 904, the result shows that a predetermined optional function is insufficient on the television receiver side, the corresponding fact is displayed in the error message 173d1. In this case, an error code and a guide (URL or the like) of the homepage of the television receiver maker on which the explanation of the error code is written may be displayed. Alternatively, in a case in which a broadcast cooperation application is acquired from the network, the connection status of the network is preliminarily confirmed as a matter of course, and at this time, for example, when acquisition of the broadcast cooperation application is not possible due to a connection failure of the LAN cable or the like, the corresponding fact is displayed on the error message 173d1. In a case in which, although the network connection is established, the acquisition of the broadcast cooperation application is not correctly carried out due to a deteriorated error status, for example, the error message 173d1 may be displayed. The error message 173d1 may also be displayed in a case in which during the execution of the acquisition of a broadcast cooperation application, the broadcast cooperation application has not yet been executable. Moreover, the error message 173d1 may also be displayed in a case in which information such as the AIT cannot be received because the receiving status of the broadcast wave becomes unstable although the information such as the AIT has been received at first. Note that, in this case, if the broadcast cooperation application acquired from the respective server devices is cached as it is, the application can be used as it is after the recovery of the receiving status of the broadcast wave.

Moreover, in a case in which, as the result of the confirmation of the application profile 904, a predetermined optional function is insufficient on the television receiver side, a display for recommending the confirmation of a newest firmware for the television receiver or the update thereof may be shown in the error message 173d1. Alternatively, the broadcast receiver 100 may be designed to automatically carry out the confirmation of the newest firmware or the update thereof. Alternatively, in a case in which the broadcast cooperation application can be executed by adding pay optional hardware or optional software to the television receiver, the guide to the corresponding pay optional hardware or optional software may be displayed. Note that the error message 173d1 may be displayed not on the broadcast receiver 100, but on the portable information terminal 700.

[Execution Screen of Broadcast Cooperation Application of Portable Information Terminal]

Figure 15:
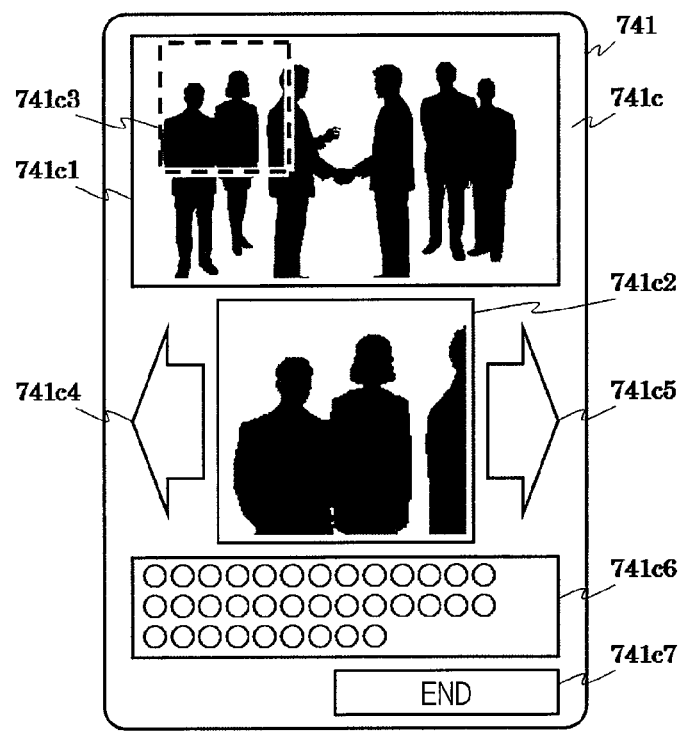
FIG. 15 is a screen display view showing a broadcast cooperation application executing screen of the portable information terminal in accordance with the first embodiment.

FIG. 15 is a screen display view showing one example of an execution screen of a broadcast cooperation application (terminal side) displayed in the process of S619 in FIG. 9. A broadcast cooperation application execution screen 741c shown in FIG. 15 is constituted by a main window 741c1, a sub-window 741c2, a selection marker 741c3, cursor keys 741c4 and 741c5, an explanation display unit 741c6, and an end button 741c7. Other objects may be further added thereto.

In the present embodiment, the broadcast cooperation application (terminal side) to be executed in the portable information terminal 700 is an application for confirming a broadcast program currently displayed on the broadcast receiver 100 in detail. Moreover, the same video image as those of the broadcast program screen currently displayed on the broadcast receiver 100 is displayed on the main window 741c1, and an enlarged video image of a position specified by the selection marker 741c3 is displayed on the sub-window 741c2, respectively. By selecting the cursor keys 741c4 and 741c5, the position of the selection marker 741c3 can be altered. In the explanation display unit 714c6, an explanation subtitle sentence in relation to the broadcast program currently displayed on the main window 741c1 and a comment or the like contributed by another user relating to the broadcast program are displayed. The end button 741c7 is a button for ending the operation of the broadcast cooperation application (on terminal side).

By operating the broadcast cooperation application (on terminal side) on the portable information terminal 700, the functional expansion of the broadcast communication cooperation service by the cooperative operation between the broadcast receiver 100 and the portable information terminal 700 can be obtained.

[EPG Screen of Broadcast Receiver]

Figure 16A:
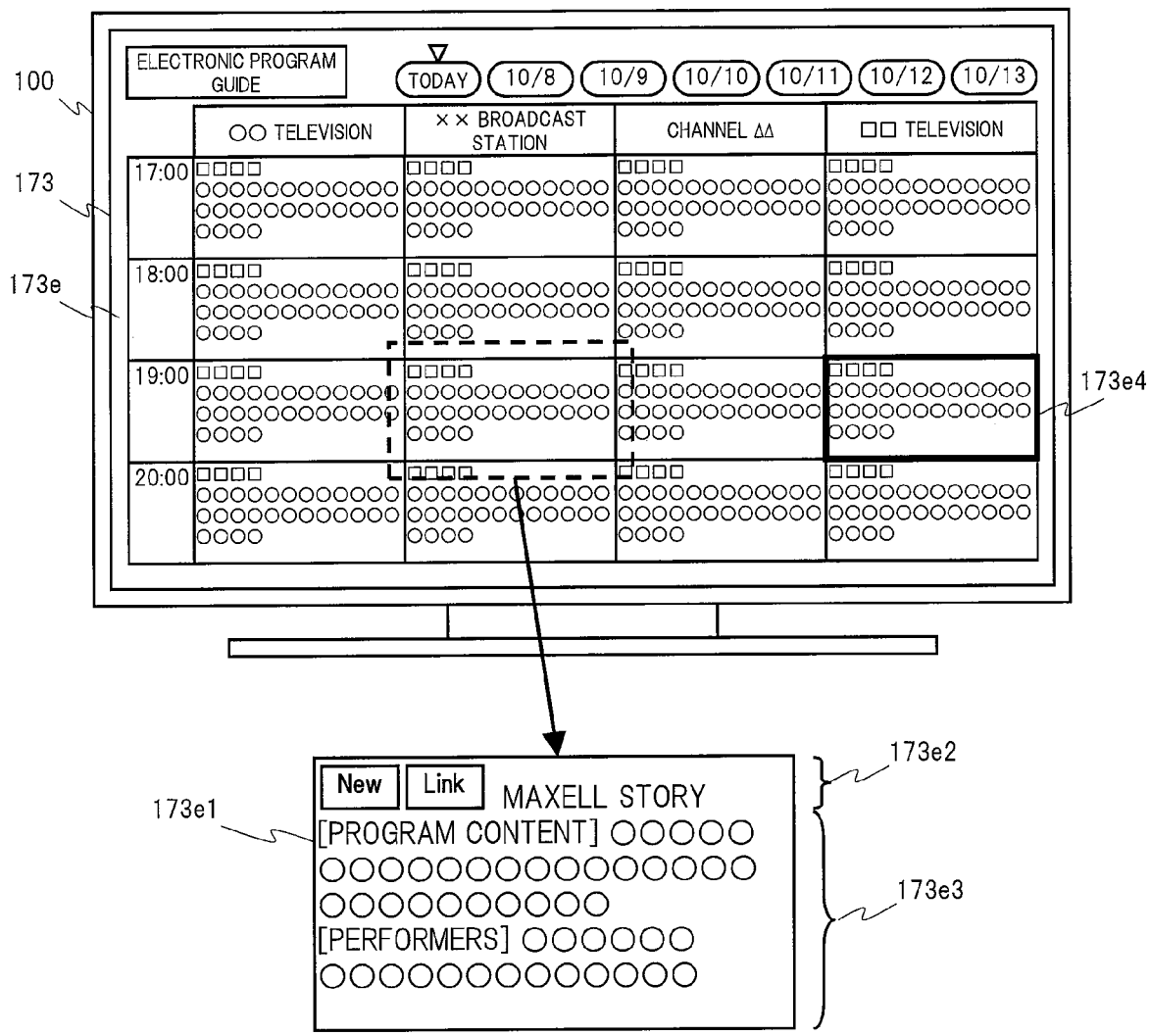
FIG. 16A is a screen display view showing an EPG display screen in the broadcast receiver in accordance with the first embodiment.

FIG. 16A is a screen display view showing one example of a display screen of an electronic program guide (EPG) in the broadcast receiver 100 of the present embodiment. An EPG display screen 173e is a delivery planning guide of a broadcast program in a digital broadcast service of the present embodiment, which is formed by the main control unit 101 based on a program information data row outputted from the first separation unit 132. By selecting a program guide key 741a7 of the basic screen 741a of the cooperation control application, the EPG display screen 173e is displayed on the video image display unit 173.

In the present embodiment, the EPG display screen 173e has a matrix shape in which the axis of ordinate is used for displaying time and the axis of abscissas is used for displaying a service ID (channel), and detailed information of each broadcast program to be broadcast in each channel in each time zone is displayed. As shown in FIG. 16A, the detailed information 173e1 of each broadcast program is mainly composed of a title region 173e2 and a detailed explanation region 173e3.

In the title region 173e2, the program title of each broadcast program and a symbol or the like showing the attribute of each broadcast program are displayed. The symbol or the like showing the attribute of each broadcast program include, for example, a mark formed by symbolizing "New" indicating a new program, a mark formed by symbolizing "Replay" indicating a re-broadcast program, or the like. Alternatively, a mark formed by symbolizing "data" indicating a relation applicable to data broadcast by a broadcast service or the like may be used. Moreover, in the case of a broadcast program in which a broadcast cooperation application executable in the broadcast receiver 100 of the present embodiment is prepared, a mark or the like formed by symbolizing "Linkage" indicating the corresponding fact may be used. The detailed explanation region 173e3 displays related information such as a program content and performers of each broadcast program, and URL of a homepage introducing each broadcast program.

Note that the mark or the like formed by symbolizing the "Linkage" and displayed in the title region 173e2 may be designed so as not to be displayed in a case in which, even though a broadcast cooperation application is prepared in the broadcast program, the execution thereof cannot be carried out in the broadcast receiver 100 as the result of the confirmation of the application profile 904. Moreover, the mark formed by symbolizing "Linkage" indicating that the broadcast program is provided with an executable broadcast cooperation application and displayed in the title region 173e2 may be further altered in its color, shape, character type, or the like depending on whether or not the cooperative operation with the portable information terminal is possible. In a case in which the cooperative operation with the portable information terminal is possible, a mark formed by symbolizing "Mobile" may be displayed in combination with the mark formed by symbolizing the "Linkage."

Note that the presence or absence of displays of the mark formed by symbolizing the "Linkage" and the mark formed by symbolizing the "Mobile" may be controlled by acquiring information on whether or not each of the broadcast programs is a broadcast program provided with an executable broadcast cooperation application in the broadcast receiver 100 of the present embodiment or on whether or not the executable broadcast cooperation application can be cooperatively operated with a portable information terminal, which has been preliminarily described in EIT information including detailed information or the like of the respective broadcast programs. Alternatively, the information acquired from the program delivery information of a digital broadcast program prepared in the predetermined server device on the Internet 200 may be added to an electronic program guide formed based on the program information data row acquired from a broadcast wave of a digital broadcast service.

As described above, by displaying the mark formed by symbolizing the "Linkage" indicating the broadcast program provided with an executable broadcast cooperation application and the mark formed by symbolizing the "Mobile" indicating that the cooperative operation with a portable terminal device is possible on the EPG display screen 173e, the user is allowed to easily understand the state of which each broadcast program is applicable to a broadcast communication cooperation service in the broadcast receiver 100. Note that it is needless to say that the mark formed by symbolizing a predetermined character indicating the attribute of each broadcast program may be replaced by the character, a sentence, or the like. By altering the background color of the detailed information 173e1 of each of the broadcast programs, the state of which each broadcast program is applicable to a broadcast communication cooperation service may be indicated. Furthermore, the mark formed by symbolizing the "Linkage," the mark formed by symbolizing the "Mobile," and the like may not be displayed in the title region 173e2 normally, but may be pop-up displayed only in a case in which each of the broadcast programs is selected by the program selection cursor 173e4.

The broadcast receiver 100 of the present embodiment has functions for making a viewing reservation and/or a recording reservation for each broadcast program on the EPG display screen 173e. For example, in a state where the EPG display screen 173e is displayed, the program selection cursor 173e4 on the EPG display screen 173e is moved by using the cursor key 741ac of the basic screen 741a of the cooperation control application, and a desired broadcast program is selected by the enter key 741ad, so that the viewing reservation and/or the recording reservation for the selected broadcast program is carried out.

In the above-mentioned process, in a case in which the broadcast program on which the viewing reservation and/or the recording reservation is carried out is a broadcast program applicable to a broadcast communication cooperation service, by using the above-mentioned viewing reservation and/or recording reservation as a trigger, the acquisition of the broadcast cooperation application prepared for the broadcast program may be started without waiting for the broadcast staring time of the broadcast program. That is, information (location information such as URL) for specifying the acquisition source of the broadcast cooperation application is described in the EIT information including the detailed information or the like of each broadcast program. With this arrangement, the broadcast receiver 100 can acquire the information of the acquisition source of the broadcast cooperation application prepared for each broadcast program at the time when the broadcast program is selected by the program selection cursor 173e4. Therefore, the broadcast receiver 100 makes it possible to start of an acquisition of the broadcast cooperation application before the broadcast start time of the broadcast program.

Figure 16B:
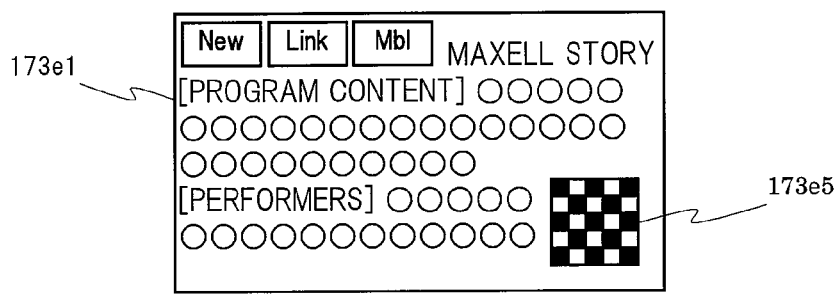
FIG. 16B is a view showing detailed information of the EPG display screen in the broadcast receiver in accordance with the first embodiment.

Note that, in a case in which the broadcast program on which the viewing reservation and/or the recording reservation are carried out is a broadcast program applicable to a broadcast communication cooperation service, and when it is a broadcast program in which a cooperative operation with a portable terminal device is possible, the acquiring process of a broadcast cooperation application (terminal side) prepared for a portable terminal device may also be started before the broadcast start time of the broadcast program in the same process as described above. Moreover, as shown in FIG. 16B, a two-dimensional bar code 173e5 or the like indicating the information (location information such as URL) of the acquisition source of the broadcast cooperation application (terminal side) prepared for the portable terminal device is displayed on the EPG display screen 173e so that the user may be encouraged to download the broadcast cooperation application (terminal side) prepared for the portable terminal device.

Thus, when the broadcast receiver 100 is designed to start the acquisition of the broadcast cooperation application before the broadcast start time of the broadcast program by referring to the information of the acquisition source of the broadcast cooperation application included in the EPG information, it becomes possible to disperse the load of the service provider server 400 for storing the broadcast cooperation application. Moreover, even when the network communication speed between the service provider server 400 and the broadcast receiver 100 is insufficient, it becomes possible to effectively use the broadcast cooperation application immediately after the start of the broadcast of the broadcast program.

FIG. 17 is an operation sequence diagram showing one example of an acquiring sequence of the broadcast cooperation application in a case in which the viewing reservation and/or recording reservation of the broadcast program is carried out on the EPG display screen 173e.

While viewing the digital broadcast service, the main control unit 101 of the broadcast receiver 100 acquires a program information data row outputted from the first separation unit 132 (S701). When the user gives an activation request for the EPG screen by using the operation terminal (S702), the EPG display screen 173e is displayed on the video image display unit 173 (S703). When the user selects a desired broadcast program by using the operation terminal on the EPG display screen 173e and carries out the viewing reservation and/or recording reservation of the broadcast program (S704), the main control unit 101 confirms the program information data row acquired from the first separation unit 132 (S705), and further confirms the location of the acquisition source of the broadcast cooperation application that is in cooperation with the broadcast program on which the viewing reservation and/or the recording reservation are carried out (S706).

After the process of S706, the application control unit 161 transmits a transmission request for the broadcast cooperation application to the predetermined service provider server 400, via the LAN communication unit 121 based on the confirmed URL (S707). Upon receipt of the transmission request for the broadcast cooperation application, the service provider service 400 carries out an authentication process of the broadcast receiver 100, if necessary, based on control of the application managing/distributing execution unit 4103, and then delivers the predetermined broadcast cooperation application stored in the application storage region 4013 via the LAN communication unit 121 (S708). Subsequently, the application control unit 161 caches the predetermined broadcast cooperation application delivered from the service provider server 400 and received via the LAN communication unit 121 in the RAM 104 or the storage unit 110 (S709).

In accordance with the broadcast receiver 100 of the present embodiment described above, it is possible to execute functions having high added values.

Second Embodiment

In the following, a second embodiment of the present invention will be described. Note that the configuration, effects, and the like of the present embodiment are the same as those of the first embodiment unless otherwise stated. Therefore, in the following, difference between the present embodiment and the first embodiment is mainly described, and with respect to common points, the description thereof will be omitted in order to avoid overlapped descriptions.

An embodiment for carrying out a portable information terminal cooperation process (hereinafter, referred to as "terminal cooperation") is described also in the first embodiment, and the embodiment will be described in more detail.

Upon carrying out a portable information terminal cooperation process, there is a case in which the utilization of the terminal cooperation process is desirably limited only to the portable information terminal 700 that is present in the same residence as the broadcast receiver 100 (hereinafter, this limitation is referred to as "limitation in the same residence"). For example, in an application (hereinafter, referred to as "broadcast cooperation application") for utilizing the broadcast cooperation process, such cases are a case in which the display screen of the broadcast receiver 100 and the display screen of the portable information terminal 700 are closely related to each other or a case in which advertising video images displayed on the broadcast receiver 100 are wanted to be certainly viewed by the user of the portable information terminal 700.

Note that the point required to be considered as a step is determination as to whether or not the target broadcast cooperation application imposes the limitation in the same residence. On the assumption that all the broadcast cooperation applications impose the limitation in the same residence, this determination is not necessary; however, in some cases in which no limitation is imposed, the broadcast receiver 100 needs to acquire control information relating to the presence and absence of the limitation in the same residence and alter the operation step. The control information relating to the presence or absence of this limitation may be acquired from a broadcast signal (for example, described as an item of AIT) or may be acquired from a server specified by the broadcast station.

Including the above-mentioned step, the step for ensuring that the portable information terminal 700 is present in the same residence as the broadcast receiver 100 will be described in the present embodiment.

Normally, devices present in the same residence are present on a local network that is connected to the same router device 210. Therefore, since the portable information terminal 700 is connected to the same local network as that of the broadcast receiver 100, it is determined that they are present in the same residence. Note that determination as to whether or not the target device is connected to the local network may be made by using a known method and the description thereof will be omitted.

Moreover, even in the case of a portable information terminal 700 not present on a local network, when it is directly communicated with the broadcast receiver 100 by using NFC, Bluetooth, infrared communication, or the like, the determination may be made that it is present in the same residence. In this case, the communication for acquiring the broadcast cooperation application or the like may be carried out by the above-mentioned direct communication, or may be carried out by using a mobile telephone communication.

As described above, a plurality of methods for confirming that the target terminal is present in the same residence, and which method is used is, for example, described in AIT and read by the broadcast receiver 100.

Moreover, if the fact that the portable information terminal 700 is present in the same residence is once confirmed, the terminal may be regarded as being present in the same residence until the program ends, or another method may be used in which by setting an effective period of time (for example, 10 minutes), the terminal is regarded as being present in the same residence within the effective period of time, but after the effective period of time, the terminal is not regarded as being present in the same residence without the confirmation that is newly made. The effective period of time is described, for example, in the AIT, and read out by the broadcast receiver 100.

Moreover, still another method may be used in which, for example, at a desired point of time during the progress of a program, an event signal is set in a broadcast signal, and each time the event signal is received, the fact that the portable information terminal 700 is present in the same residence is confirmed.

Furthermore, the above-mentioned two methods may be used in combination.

Next, a specific step in which only the portable information terminal 700 that is present in the same residence is permitted to carry out the terminal cooperation will be described. In the present embodiment, when the portable information terminal 700 acquires a broadcast cooperation application or when the portable information terminal 700 acquires information to be used in the broadcast cooperation application, a limitation is set (broadcast cooperation application and information to be used in the broadcast cooperation application, specifically, HTML document, streaming video images, or the like, referred to collectively as broadcast cooperation information, hereinafter). There are two kinds of the method of acquiring broadcast cooperation information; that is, a communication acquiring method for acquiring from the broadcast station server 300 or the service provider server 400, and a broadcast acquiring method for acquiring from a broadcast wave. The communication acquiring method includes two kinds of methods, that is, a method for acquiring after the start of a broadcast receiving process, and a method for acquiring before the start of the broadcast receiving process. Moreover, the communication acquiring method includes two kinds of cases, that is, a case in which after the broadcast receiver 100 once receives the information, the portable information terminal 700 acquires from the broadcast receiver 100, and a case in which the portable information terminal 700 directly acquires from the broadcast station server 300 or the service provider server 400. Although there are various kinds of methods, when seen from the portable information terminal 700, there are mainly two cases, that is, a case in which the portable information terminal 700 acquires from the broadcast receiver 100 and a case in which the portable information terminal 700 acquires from the broadcast station server 300 or the service provider server 400.

In the present embodiment, the case in which the portable information terminal 700 acquires the broadcast cooperation information from the broadcast receiver 100 will be described, and the case in which the broadcast cooperation information is acquired from the server will be described in the next embodiment.

Figure 18A:
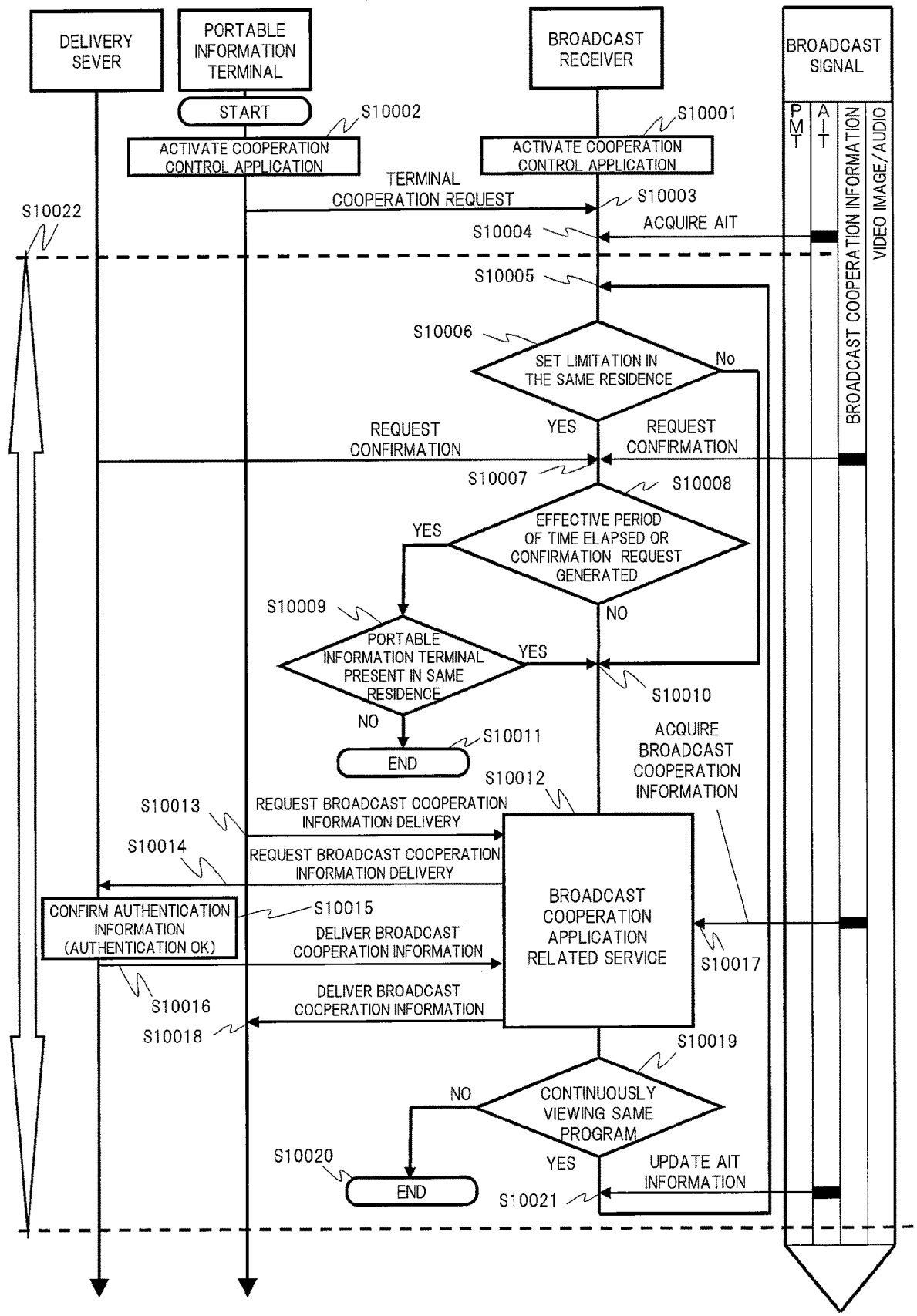
FIG. 18A is a diagram showing an operation sequence at the time of cooperation with a terminal in accordance with a second embodiment.

FIG. 18A shows steps of the present embodiment.

First, prior to carrying out a terminal cooperation, cooperation control applications that control the terminal cooperation are preliminarily activated in the portable information terminal 700 and the broadcast receiver 100, respectively (S10001, S10002). In this state, the portable information terminal 700 makes a terminal cooperation request to the broadcast receiver 100 (S10003). Next, AIT is acquired from a broadcast signal (S10004). From this AIT information, determination is made as to whether or not the application for a target portable information terminal has the limitation in the same residence (S10006), and when the application has the limitation, the process proceeds to a step S10008, and in a first stage in which the terminal cooperation request is received, the process proceeds to a step S10009 to determine whether or not the portable information terminal 700 making the terminal cooperation request is present in the same residence as the broadcast receiver 100 (S10009). When it is determined that the portable information terminal 700 is not present in the same residence as the broadcast receiver 100, a response that cooperation is not allowed is given to the cooperation control application on the portable information terminal side, thereby ending the process (S10011).

Here, in a case in which all the broadcast cooperation applications are assumed to have the limitation in the same residence, the step in S10006 is skipped without carrying out the determination. In a case in which there is a possibility that an application having the limitation in the same residence and an application without the limitation in the same residence are present, the determination in S10006 is carried out.

In a case in which the portable information terminal 700 is present in the same residence or the application does not have the limitation in the same residence, the process proceeds to S10012, and a broadcast cooperation application related service is carried out. In this service (S10012), a broadcast cooperation information delivery request from the portable information terminal 700 is processed (S10013), and the broadcast cooperation information is delivered to the portable information terminal 700 (S10018). The broadcast cooperation information includes information delivered to the broadcast receiver 100 from the delivery server corresponding to the service provider server 300 (S10014, S10015, and S10016), information acquired from a broadcast signal (S10017), information stored in the broadcast receiver 100, and the like. Receiving (S10016 and S10017) the broadcast cooperation information by the broadcast receiver 100 may be not only carried out based on receiving the broadcast cooperation information delivery request from the portable information terminal 700 (S10013), but also may be autonomously carried out by the broadcast receiver 100 or may be carried out based on an event occurrence in the broadcast signal. Moreover, the delivery of the broadcast cooperation information to the portable information terminal 700 (S10018) may also be spontaneously carried out from the broadcast receiver 100 side.

After a series of steps of receiving (acquiring) and delivering the broadcast cooperation information, determination is made as to whether or not the broadcast receiver 100 continues to view the same program (S10019), and if the broadcast receiver 100 does not continue to view, a response that cooperation is not allowed is given to the cooperation control application on the portable information terminal side, thereby ending the process (S10020).

If the viewing is continuously carried out, the process returns to the step S10005, and when the application has the limitation in the same residence, confirmation is made as to whether or not the portable information terminal 700 is present in the same residence as the broadcast receiver 100 (S10009); in this case, determination is made as to whether or not the predetermined effective period of time has elapsed after the previous confirmation or as to whether or not a confirmation request (S10007) from the broadcast signal or the delivery server is generated (S10008) after the previous confirmation, and if neither of the conditions are satisfied, the process proceeds to the execution of the next broadcast cooperation application related service (S10012) by way of step S10010 without carrying out the confirmation as to whether or not the terminal is present in the same residence (S10009). Here, the confirmation request (S10007) from the broadcast signal is described as being acquired from the broadcast cooperation information; however, in this case, an event message is also described as being included in the broadcast cooperation information. Moreover, this confirmation request may be described in the AIT.

Note that the steps described above are steps in a loop process including a broadcast signal, the broadcast receiver 100, the portable information terminal 700 and the entire delivery server, within a section indicated by an arrow of S10022. The confirmation request of S10007 may be made at any timing within the loop.

Moreover, the authentication information described in the AIT may be incorporated in an authentication key to be used for the authentication (S10015) in the delivery server. Thus, the authentication request is confirmed to be a valid request. Moreover, by using an arrangement in which the authentication information described in the AIT is altered in accordance with the progress of the program, and the delivery server does not carry out the authentication unless an authentication key formed by incorporating information that is in synchronization with the progress of the program is used, it is possible to confirm that the same program is being continuously viewed. In this case, the information of the AIT is read and updated appropriately (S10021). Note that, in this case, the authentication information to be incorporated in the broadcast signal may be incorporated as broadcast cooperation information, in addition to being described in the AIT. Moreover, as the method for actually altering the authentication information, a method for continuously altering the URL itself of the delivery server in accordance with the progress of a program may be used.

In this manner, by confirming whether or not the portable information terminal 700 is present in the same residence as the broadcast receiver 100, while executing the broadcast cooperation application related service (S10012), for every predetermined effective period of time, or each time the broadcast signal is given or the confirmation request from the delivery server is made, it is possible to appropriately execute the broadcast related application having the limitation in the same residence. Moreover, by using the authentication information incorporated in the broadcast signal for the authentication in the delivery server, it is possible to ensure the validity of the delivery request, and by altering the authentication information of the broadcast signal appropriately, it is possible to confirm that the same program is being continuously viewed.

In accordance with the portable information terminal cooperation technique related to the present embodiment described above, the limitation in the same residence can be achieved in a portable information terminal in cooperation with the broadcast receiver.

Third Embodiment

In the present embodiment, a case in which the portable terminal 700 acquires broadcast cooperation information from a delivery server will be described.

Figure 18B:
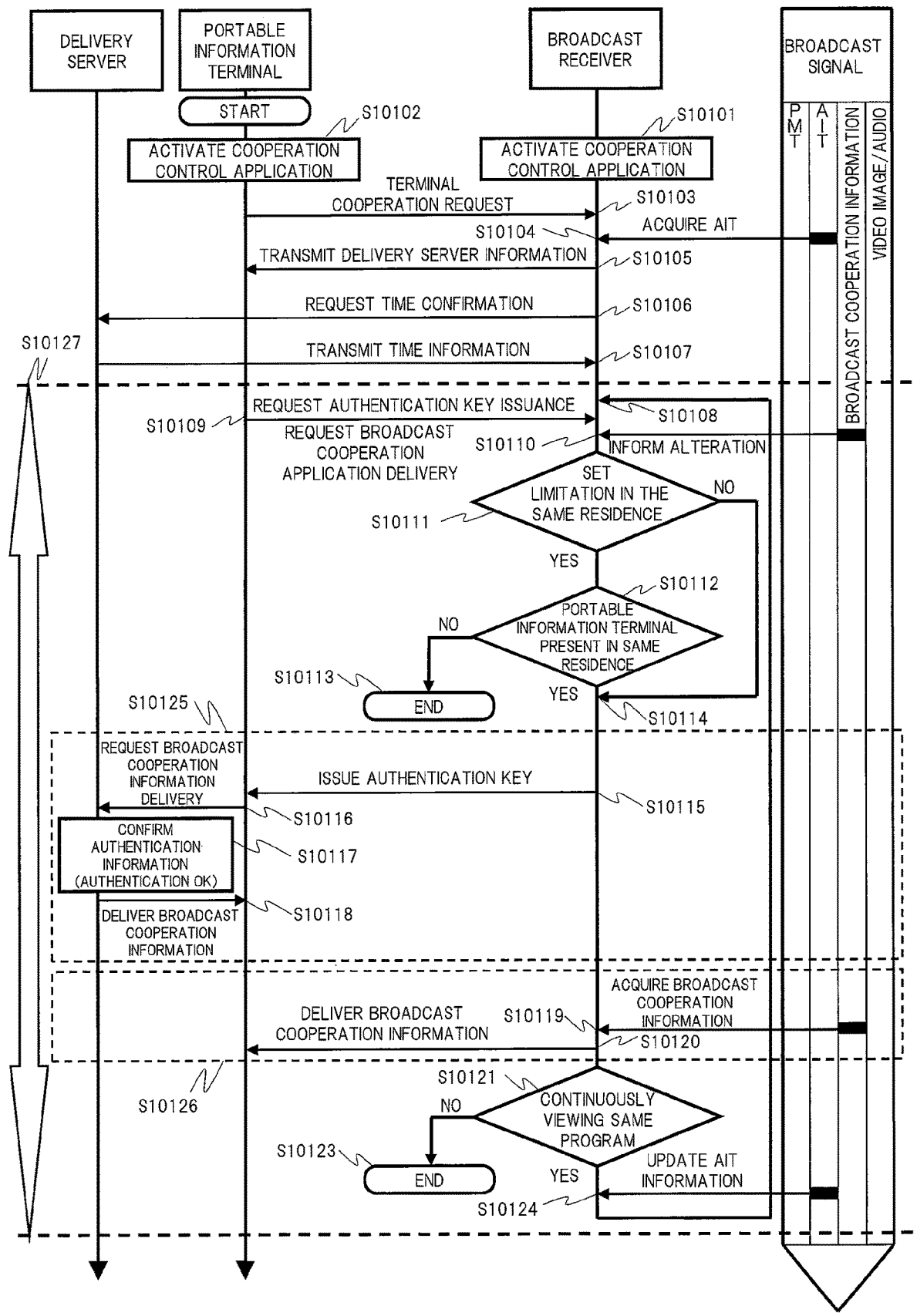
FIG. 18B is a diagram showing an operation sequence at the time of cooperation with a terminal in accordance with a third embodiment.

FIG. 18B shows steps of the present embodiment.

First, prior to carrying out a terminal cooperation, in the portable information terminal 700 and the broadcast receiver 100, cooperation control applications that are applications for controlling the terminal cooperation are preliminarily activated (S10101 and S10102), respectively. In this state, the portable information terminal 700 makes a terminal cooperation request to the broadcast receiver 100 (S10103).

Next, AIT is acquired from a broadcast signal (S10104). From this AIT information, information such as URL relating to the delivery server is acquired, and the information is transmitted to the portable information terminal 700 (S10105). Next, a time confirmation request is made from the broadcast receiver 100 to the delivery server (S10106), and based on this request, time information is transmitted from the delivery server to the broadcast receiver 100 (S10107). Thus, an authentication key for the subsequent steps is issued in accordance with the time of the delivery server (S10115); however, in a case in which no time deviation problem occurs, this process may be omitted.

Thereafter, a loop control indicated by an arrow of S10127 is started.

First, an issue request for an authentication key or a broadcast cooperation information delivery request is made from the portable information terminal 700 to the broadcast receiver 100 (S10109). The authentication key is used for the broadcast cooperation information delivery request to the delivery server in the subsequent stage (S10125). The broadcast cooperation delivery request in S10109 is a delivery request for information acquired from a broadcast signal, which corresponds to a step in S10126 in the subsequent stage.

In any cases, when the request in S10109 is outputted from the portable information terminal, determination is made as to whether or not the broadcast cooperation application has the limitation in the same residence (S10111), and if having the limitation, the process proceeds to a step S10112, and if not having the limitation, the process proceeds to S10114 with the step S10112 being skipped. In a case in which all the broadcast cooperation applications have the limitation in the same residence, the process proceeds to S10112 without carrying out the determination in S10111. In S10112, determination is made as to whether or not the portable information terminal that has issued the request is present in the same residence, and if not present therein, the terminal cooperation is ended (S10113). If present in the same residence, the requested sequence, that is, the acquisition of broadcast cooperation information from the delivery server (S10125) or the acquisition of broadcast cooperation information from the broadcast signal (S10126) is carried out. Since any acquisition from the broadcast signal may be carried out in addition to the acquisition from the delivery server, the step S10126 is also described.

First, the acquisition step (S10125) of the broadcast cooperation information from the delivery server will be described.

At first, the broadcast receiver 100 issues an authentication key corresponding to the request from the portable information terminal 700. At this time, the authentication key is made to be effective only for a predetermined period of time (for example, 10 minutes) including the time information at the time of the issuance. The delivery server confirms the authentication information, including whether or not the authentication key is issued within the effective period of time, and if the authentication is OK, the delivery server permits the delivery of broadcast cooperation information. Thereafter, within the effective period of time, delivery of information is permitted, and at the point of time when the effective period of time has elapsed, the delivery is stopped. For example, after the effective period of time, a streaming video image is no longer viewed.

The predetermined effective period of time may be maintained in the delivery server, or the broadcast receiver 100 may acquire it from the broadcast signal (for example, AIT), and the information of the effective period of time may be incorporated in the authentication key. The information of the effective period of time is preliminarily notified to the portable information terminal 700, so that the issue of the authentication key is requested before the effective period of time has expired. Alternatively, the effective period of time may be managed by the broadcast receiver 100, and before the expiration of the effective period of time, the authentication key may be automatically issued to the portable information terminal 700 from the broadcast receiver 100 after confirming that the portable information terminal 700 is present in the same residence.

The effective period of time may be the same in a single program, or may be changed in accordance with the progress of the program. Moreover, it may be designed such that if no setting of the effective period of time is given, when once authenticated, the authentication is effective during the viewing of the program.

Furthermore, the authentication information described in the AIT may be incorporated in an authentication key to be used in the authentication (S10117) in the delivery server. Thus, the validity of the authentication request can be confirmed. Moreover, such an arrangement may be made in which the authentication information described in the AIT is altered in accordance with the progress of the program, and the delivery server does not carry out the authentication unless an authentication key formed by incorporating information that is in synchronization with the progress of the program is used, so that it is possible to confirm that the same program is being continuously viewed. In this case, the information of the AIT is read and updated appropriately (S10024). Note that the authentication information to be incorporated in the broadcast signal may be incorporated as broadcast cooperation information, in addition to being described in the AIT. Further, as the method for actually altering the authentication information, a method for continuously altering the URL itself of the delivery server in accordance with the progress of the program may be used. Note that the alteration of the URL in this case corresponds to a case in which the delivery server is the same with a different entrance; however, by an alteration of the broadcast cooperation application or the like, the delivery server may be altered to new one. In this case, each time the alteration is made, steps such as the transmission of the delivery server information (S10105), the time confirmation request (S10106), and the transmission of time information (S10107) are carried out.

Next, the step (S10126) for acquiring broadcast cooperation information from a broadcast signal will be described.

In this case, after confirming that the portable information terminal 700 is present in the same residence, the broadcast receiver 100 acquires broadcast cooperation information from a broadcast signal (S10119) and subsequently delivers the information to the portable information terminal 700 (S10120).

Note that, in a case in which the broadcast cooperation information is altered in accordance with the progress of the program, a notification of the alteration is issued from the broadcast signal (S10110), and the broadcast cooperation information may be acquired by using the notification as a trigger. In this case, if the acquisition is made from the delivery server, an authentication key is issued from the broadcast receiver 100 to the portable information terminal (S10115), and the presence of the alteration notification is notified. If the acquisition is made within the effective period of time, the issuance of the authentication key may be omitted, so that only the notification of alternation may be made. In the case of acquisition from the broadcast signal, the broadcast receiver 100 acquires the information (S10119) and delivers the information to the portable information terminal (S10120). Note that, in the case of the acquisition from the broadcast signal, the confirmation as to whether or not the portable information terminal 700 is present in the same residence may be carried out each time the alteration notification is issued, or as in the case of the second embodiment, if the acquisition is made within the effective period of time, the confirmation may be omitted. Here, the alternation notification (S10110) from the broadcast signal is described as being acquired from the broadcast cooperation information; however, in this case, an event message is also described as being included in the broadcast cooperation information. Moreover, the alteration notification may be described in the AIT.

After a series of steps of receiving (acquiring) and delivering the broadcast cooperation information, determination is made as to whether or not the broadcast receiver 100 continues to view the same program (S10121), and if the broadcast receiver 100 does not continue to view, a response that cooperation is not allowed is given to the cooperation control application on the portable information terminal side, thereby ending the process (S10123). If the viewing is continuously carried out, the process returns to 510108, and the loop process of S10127 is continued.

Thus, the time information is included in an authentication key to be used for the authentication in the delivery server, and the effective period of time is managed, so that it is possible to regularly confirm whether or not the portable information terminal 700 is present in the same residence as the broadcast receiver 100 and a broadcast cooperation application having the limitation in the same residence can be executed appropriately. Moreover, by using authentication information incorporated in a broadcast signal for the authentication in the delivery server, the validity for the delivery request can be ensured, and by altering the authentication information of a broadcast signal appropriately, the fact that the same program is continuously viewed can also be confirmed.

In accordance with the portable information terminal cooperation technique relating to the present embodiment described above, even when the portable information terminal in cooperation with the broadcast receiver acquires broadcast cooperation information from the delivery server, the limitation in the same residence can also be achieved.

Fourth Embodiment

In the second and third embodiments, steps of achieving the limitation in the same residence in the terminal cooperation are described; however, depending on a broadcast cooperation application, the use from the outside of the residence may be permitted. In the present embodiment, such a case will be described. For example, in a case in which a program itself forms publication and advertisement such as television shopping or the like, it becomes more desirable for the broadcast provider to be able to use the broadcast cooperation application irrespective of the inside or outside of the residence. In the case of such a program, the use of the broadcast cooperation application may be allowed, irrespective of whether or not the portable information terminal 700 is present in the residence, as long as the registration is once made in the broadcast receiver 100. In this case, when there is a broadcast cooperation application which forms broadcast video images themselves into streaming data and delivers the data from the broadcast receiver 100 to the portable information terminal 700 byway of the Internet, the convenience thereof is further improved. The streaming data may be encoded in the broadcast receiver 100 to protect the copyright. Information on whether or not the broadcast cooperation application permits the use thereof from the outside of the residence, including the delivery of the broadcast video images to the outside of the residence, is described in data (for example, AIT) inside the broadcast signal.

Figure 18C:
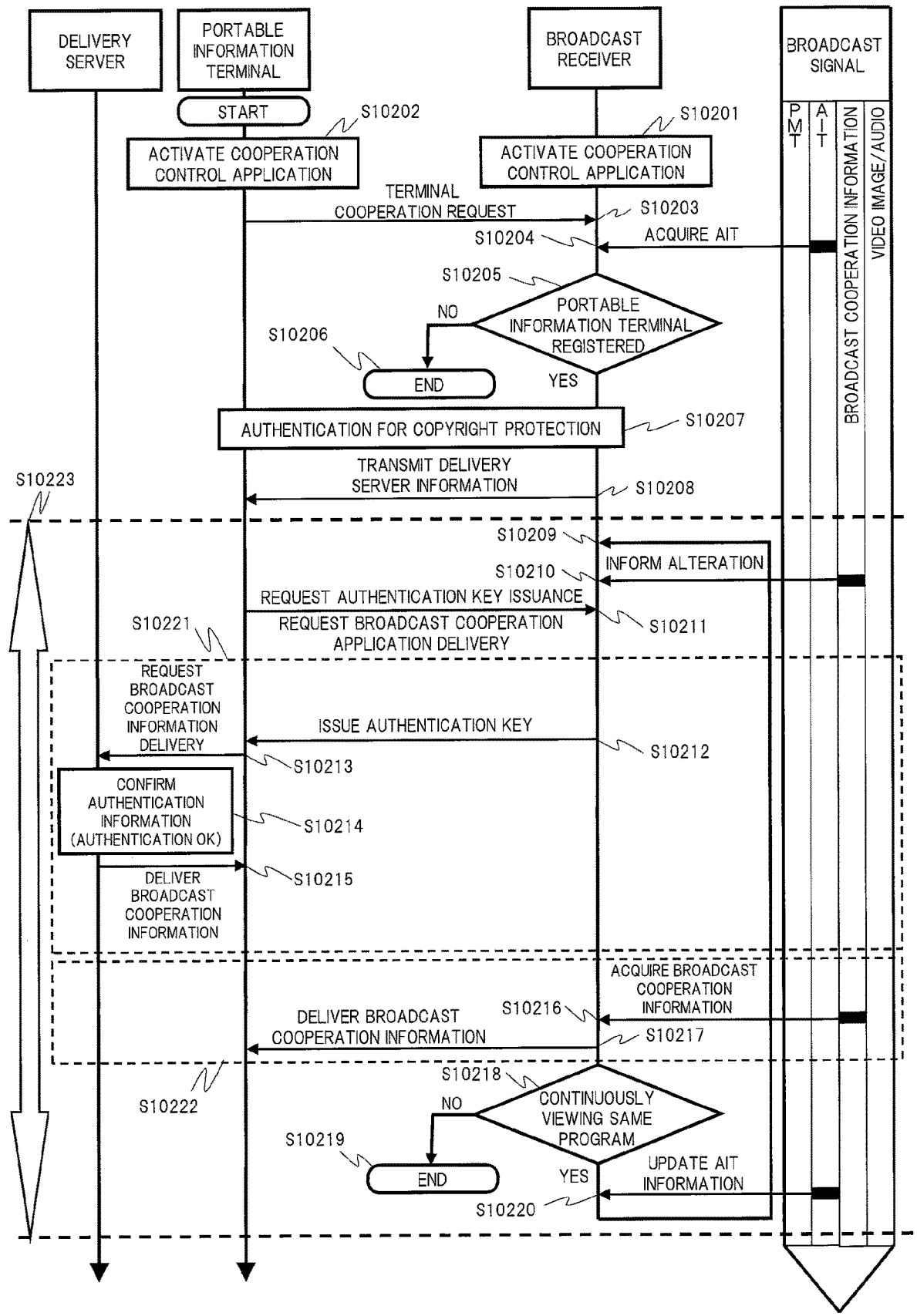
FIG. 18C is a diagram showing an operation sequence at the time of cooperation with a terminal in accordance with a fourth embodiment.

FIG. 18C shows specific steps. Since some steps are in common with those of the second and third embodiments, descriptions of the overlapped portions with those of the second and third embodiments will be omitted. In a case in which there is a terminal cooperation request (S10203) from the outside of the residence, if the use of the application outside the residence is permitted, the broadcast receiver 100 confirms whether or not the source of request is a portable information terminal that has been registered (S10205) and then permits the cooperation. In this case, if necessary, an authentication may be carried out between the portable information terminal 700 and the broadcast receiver 100 in order to protect the copyright of the broadcast video images and broadcast cooperation information (S10207). At this time, the authentication may be carried out as an authentication in the delivery server (S10207). Information on necessity/unnecessity for the copyright protection and information on the authentication method for the copyright protection (supposed to be described, for example, in AIT) are acquired from the broadcast signal, and the control is carried out in accordance with the information. In a case in which no such information is stored in the broadcast signal, a specific method predetermined in the broadcast receiver 100 is carried out. For example, a given copyright protection process predetermined therein may be carried out. Moreover, it may be predetermined that when no such information is stored in the broadcast signal, no copyright protection process is carried out in the broadcast receiver 100.

Specific examples of authentication for protecting the copyright will be described in the following. In the following authentication processes, only each one of them may be carried out. Alternatively, a plurality of the authentication processes exemplified below may be carried out in combination. Moreover, the authentication exemplified below and another authentication process not exemplified below may be combined with each other and carried out.

[Authentication by ID and Password]

Upon registering the portable information terminal 700 in the broadcast receiver 100, an ID and a password are issued, and the broadcast receiver 100 permits the cooperation based on the confirmation of the ID and the password.

[Use of Encryption Key]

In addition to the authentication using the above-mentioned ID and password, an encryption key for decoding encoded video image data or the like is transmitted from the broadcast receiver 100 to the portable information terminal. This encryption key may be acquired from the broadcast signal (for example, described in the AIT).

[Utilization of Delivery Server]

A method of issuing the encryption key for decoding encoded video images and the like from the delivery server. The portable information terminal 700 transmits the ID and the password to the delivery server to acquire an encryption key. In this case, by acquiring the location information (specifically, URL) of the delivery server from the broadcast signal (for example, described in the AIT), and by transmitting this location information from the broadcast receiver 100 to the portable information terminal 700, security is further improved. Since the video images and the like are not decoded unless the portable information terminal 700 acquires the encryption key, the authentication of the copyright protection may be carried out by requesting the authentication in the delivery server from the broadcast receiver 100, or the authentication may be ended by notifying the acquisition of the encryption key from the portable information terminal 700 to the broadcast receiver 100. Note that these processes may be charged by the delivery server.

[Mutual Authentication of Encryption Key]

By mutually authenticating encryption keys respectively possessed by the broadcast receiver 100 and the portable information terminal 700 to be confirmed, the authentication of the copyright protection is executed.

In a case in which information stored in the broadcast signal indicates the necessity of the copyright protection by a predetermined method, if no authentication of the copyright protection is carried out by the predetermined method, the terminal cooperation is not permitted. Moreover, in a case in which, since no specification is given to the broadcast signal, the authentication is carried out by the predetermined method of the broadcast receiver 100, if no authentication of the copyright protection is possible by the predetermined method, the terminal cooperation is not permitted.

In a case in which the terminal cooperation is permitted, thereafter, without carrying out the confirmation as to whether or not the portable information terminal 700 is present in the same residence, a delivery of the broadcast cooperation information to the portable information terminal 700 (S10217) and the issuance of an authentication key for the delivery server (S10212) are carried out in accordance with a request from the portable information terminal 700 (S10211), an autonomous control of the broadcast receiver 100, and a request from the broadcast signal (S10210). Note that, in this case, it is not necessary to carry out a control with the effective period of time set therein. The portable information terminal 700 which is present outside the residence acquires broadcast cooperation information from the broadcast receiver 100, or from the delivery server by using an authentication key issued therefrom (S10215). Alternatively, by incorporating authentication information (for example, described in the AIT) acquired from the broadcast signal into an authentication key issued by the broadcast receiver 100, the delivery server permits an access with the authentication key into which the authentication information acquired from the broadcast signal is incorporated, so that utilization outside the residence can be further optimized.

Moreover, there are some cases in which the limitless use of the broadcast cooperation application had better not be permitted such as a case in which a discount is offered as a premium for viewing a program. In such a case, another method is preferably used in which an authentication is once carried out in a state where the portable information terminal is present in the same residence and then the use of the delivery server is permitted even when the portable information terminal is not present in the same residence. In this case, the registering of the portable information terminal 700 in the broadcast receiver 100 is not required.

Figure 18D:
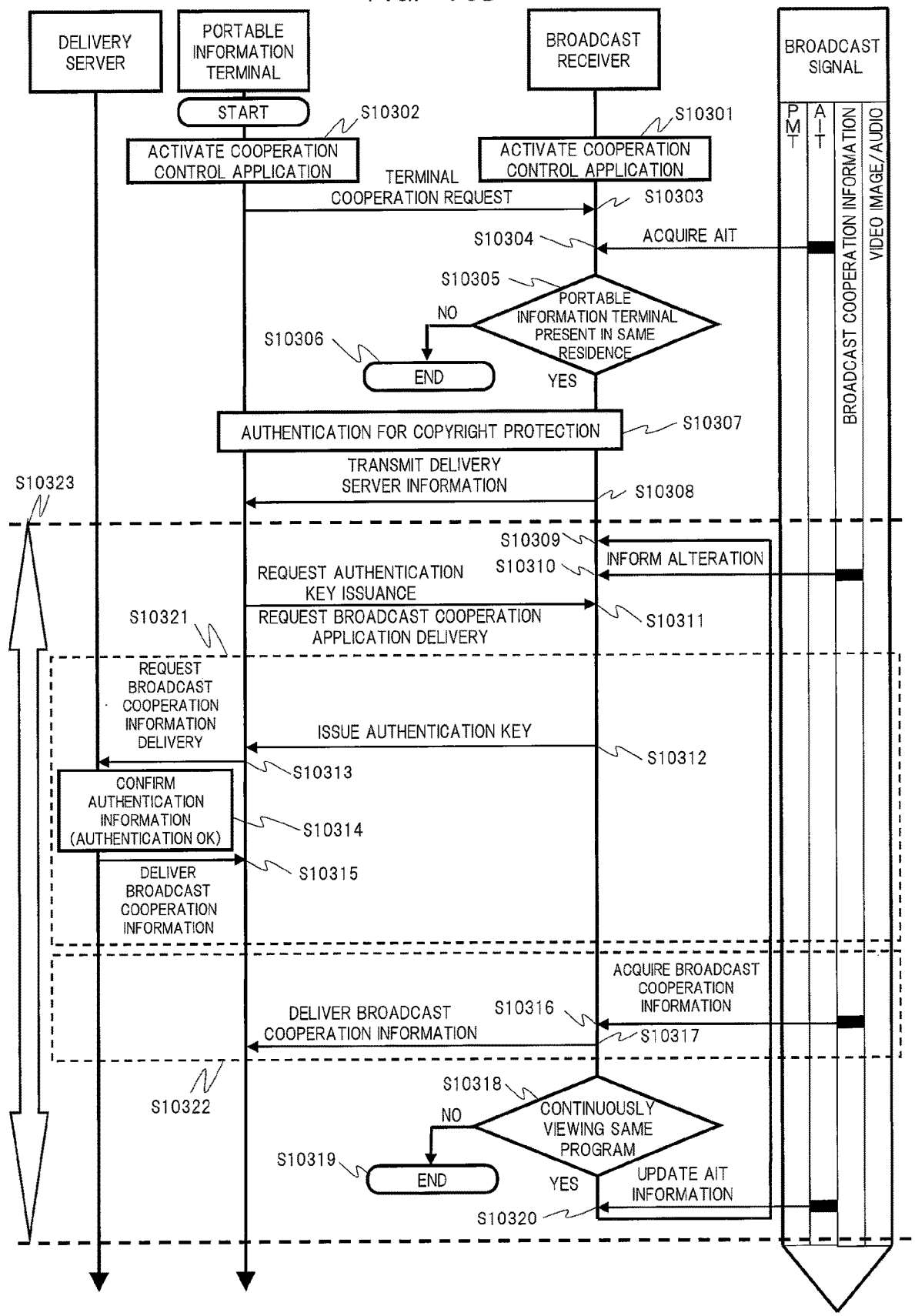
FIG. 18D is a diagram showing an operation sequence at the time of cooperation with the terminal in accordance with the fourth embodiment.

FIG. 18D shows specific steps in this case. Since some steps in the sequence are in common with those shown in FIG. 18C, the description of the overlapped portions will be omitted. First, in a state where the portable information terminal 700 is present in the same residence as the broadcast receiver 100, a terminal cooperation request is made from the portable information terminal 700 to the broadcast receiver 100, and after confirming that the portable information terminal 700 is present in the same residence (S10305), the broadcast receiver 100 permits the cooperation. In this case, if necessary, authentication may be executed between the portable information terminal 700 and the broadcast receiver 100 in order to protect the copyright about the broadcast cooperation information (S10307). At this time, the corresponding authentication may be carried out in an outside delivery server. Information on necessity/unnecessity for the copyright protection and information on the authentication method for the copyright protection (supposed to be described, for example, in AIT) are acquired from the broadcast signal, and the control is carried out in accordance with the information. In a case in which no such information is stored in the broadcast signal, a specific method predetermined in the broadcast receiver 100 is carried out. For example, a given copyright protection process predetermined therein may be carried out. Moreover, it may be predetermined that when no such information is stored in the broadcast signal, no copyright protection process is carried out in the broadcast receiver 100.

Specific examples of authentication for protecting the copyright will be described. In the following authentication processes, only each one of them may be carried out. Alternatively, a plurality of the authentication processes exemplified below may be carried out in combination. Moreover, the authentication exemplified below and another authentication process not exemplified below may be combined with each other and carried out.

[Use of Encryption Key]

In a state where the portable information terminal 700 is present in the same residence, an encryption key for decoding encoded video image data or the like is transmitted from the broadcast receiver 100 to the portable information terminal. This encryption key may be acquired from the broadcast signal (for example, described in the AIT). The authentication is executed by transferring this encryption key inside the same residence. Moreover, when such an arrangement is made so as not to acquire an encryption key from the broadcast signal unless the acquisition is made during a specific time in a program, while the delivery of the encryption key to the portable information terminal 700 is limited in the same residence, it is possible to set a limitation that a person needs to stay in the same residence at the corresponding time, so that this arrangement is also utilized for offering a premium for the viewing.

[Utilization of Delivery Server]

A method of issuing the encryption key for decoding encoded video images and the like from a delivery server. The portable information terminal 700 transmits the ID and the password to the delivery server to acquire an encryption key. In this case, by acquiring the location information (specifically, URL) of the delivery server from the broadcast signal (for example, described in the AIT), and by transmitting this location information from the broadcast receiver 100 to the portable information terminal 700, security is further improved. Since the video images and the like are not decoded unless the portable information terminal 700 acquires the encryption key, the authentication of the copyright protection may be carried out by requesting the authentication in the delivery server from the broadcast receiver 100, or the authentication may be ended by notifying the acquisition of the encryption key from the portable information terminal 700 to the broadcast receiver 100. The access to the delivery server may be carried out inside the residence or outside the residence; however, when such an arrangement is made so as not to acquire location information of the delivery server from the broadcast signal unless the accessing is made during a specific time in a program, while the delivery of the location information to the portable information terminal 700 is limited in the same residence, it is possible to set a limitation that a person needs to stay in the same residence at the corresponding time, so that this arrangement is also utilized for offering a premium for the viewing. Note that these processes may be charged by the delivery server.

[Mutual Authentication of Encryption Key]

By mutually authenticating encryption keys respectively possessed by the broadcast receiver 100 and the portable information terminal 700 to be confirmed, the authentication of the copyright protection is executed. This authentication may also be carried out either the inside the residence or outside the residence.

In a case in which information stored in the broadcast signal indicates the necessity of the copyright protection by a predetermined method, if no authentication of copyright protection is carried out by the predetermined method, the terminal cooperation is not permitted. Moreover, in a case in which, since no specification is given to the broadcast signal, the authentication is carried out by the predetermined method of the broadcast receiver 100, if no authentication of the copyright protection is possible by the predetermined method, the terminal cooperation is not permitted. Since after the permission of the terminal cooperation, the same sequence of processes as those of FIG. 18C are carried out, the description thereof will be omitted.

In accordance with the portable information terminal cooperation technique relating to the present embodiment described above, with respect to a portable information terminal to be cooperated with a broadcast receiver, the utilization from the outside of the residence can be achieved, while taking into consideration the copyright protection.

Fifth Embodiment

In an actual usage status, it is desirable to easily recognize the presence or absence of a terminal cooperation application depending on programs and which terminal cooperation application can be utilized. In the present embodiment, description will be given to a display method of a status in which a terminal cooperation application can be utilized. The terminal cooperation application refers to a broadcast cooperation application to be used for terminal cooperation.

Figure 19A:
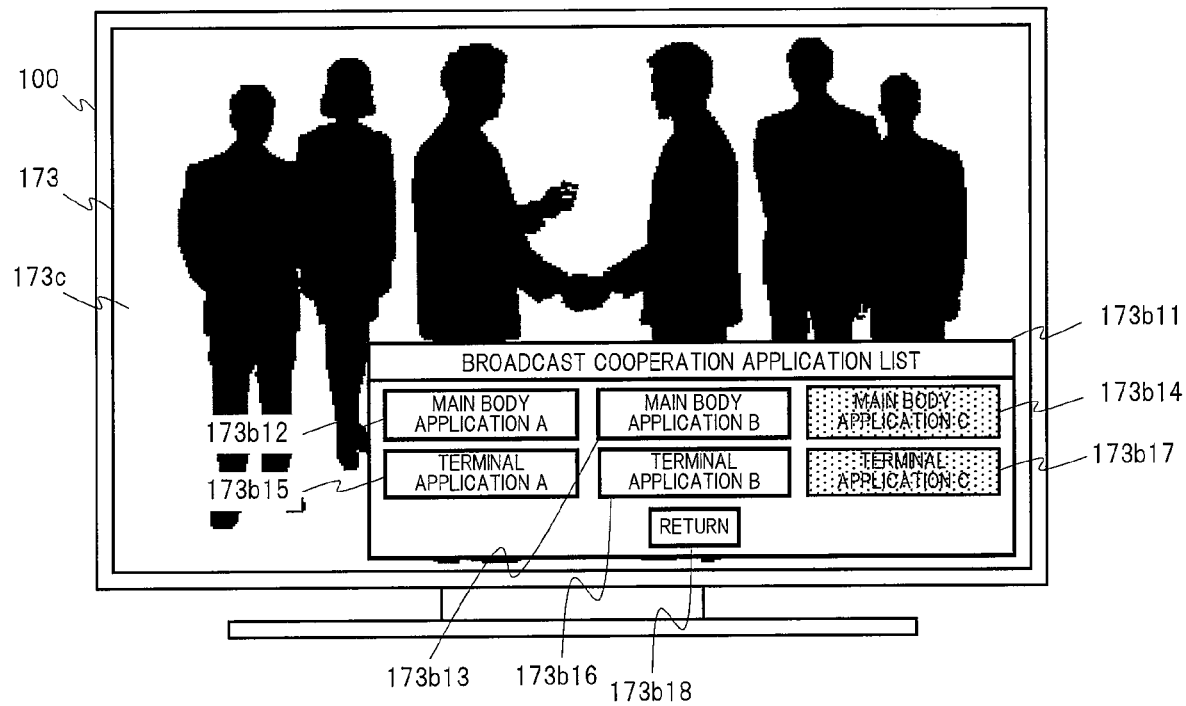
FIG. 19A is a screen display view showing a broadcast cooperation application launcher in a broadcast receiver in accordance with a fifth embodiment.

FIG. 19A shows an example of a launcher screen (173*b*11) for a broadcast cooperation application in a case in which terminal cooperation applications are present. The broadcast cooperation applications are indicated by character icons with frames. Broadcast cooperation applications (173*b*12 to 173*b*14) for the broadcast receiver 100 in cooperation with a program currently viewed and broadcast cooperation applications (173*b*15 to 173*b*17) for the portable information terminal are displayed. In the case of this example, statuses of the applications are indicated by the thickness of each frame line surrounding a character row and the coloring of the inside of the frame. Main body applications A and B (173*b*12 and 173*b*13) and terminal applications A and B (173*b*15 and 173*b*16) are in a state in which utilization is possible, and a main body application C (173*b*14) and a terminal application C (173*b*17) are in a state in which utilization is impossible. The state in which utilization of the terminal application is impossible means that among portable information terminals 700 that are in communicable states with the broadcast receiver 100, no portable information terminal having a function for executing the corresponding application is present.

Figure 19B:
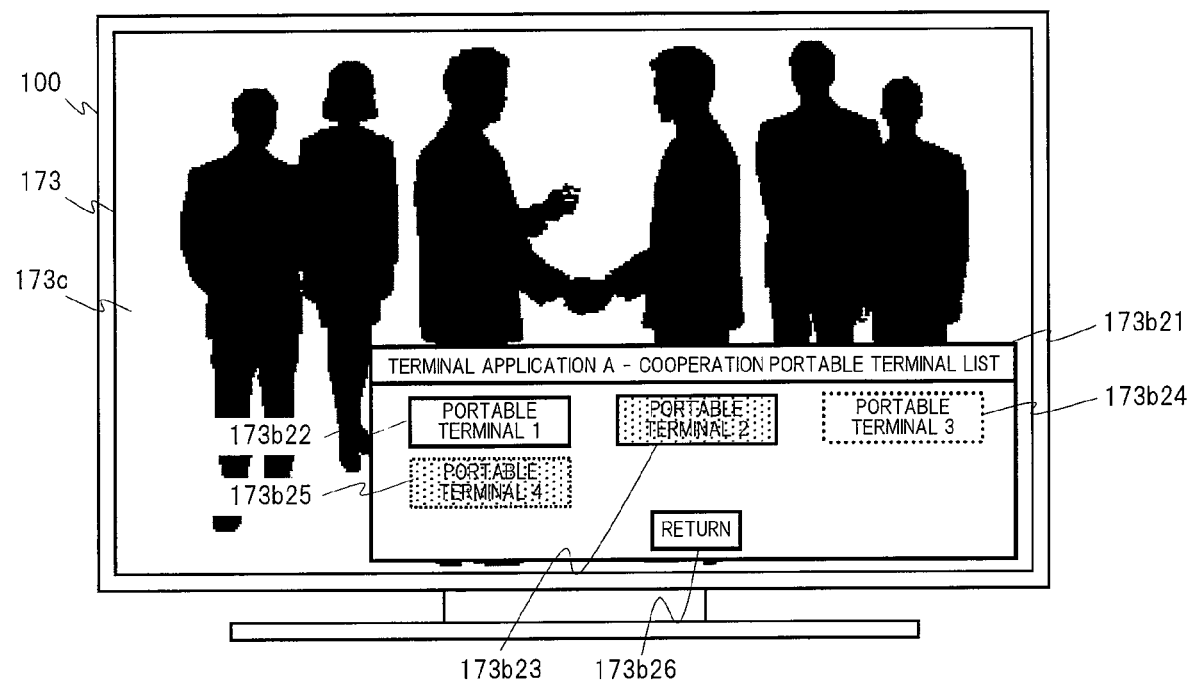
FIG. 19B is a screen display view showing the broadcast cooperation application launcher in the broadcast receiver in accordance with the fifth embodiment.

FIG. 19B shows a screen after the terminal application A has been selected in FIG. 19A. States of respective portable information terminals 700 relating to the terminal application A are shown. The portable information terminals displayed on the screen are the terminals that are registered as to whether or not they have performed cooperation with the broadcast receiver 100 in the past.

A portable terminal 1 (173*b*22) and a portable terminal 2 (173*b*23), each having an icon whose frame line is indicated by a solid line, are in a communicable state with the broadcast receiver 100, while a portable terminal 3 (173*b*24) and a portable terminal 4 (173*b*25), each having an icon whose frame line is indicated by a dotted line, are not in a communicable state. Moreover, the portable terminal 1 (173*b*22) and the portable terminal 3 (173*b*24), each having the icon the inside of the frame of which is white, have a function for executing the terminal application A, while the portable terminal 2 (173*b*23) and the portable terminal 4 (173*b*25), each having the icon the inside of the frame of which is gray, do not have the function for executing the terminal application A. Moreover, in a case in which the application is being executed in the corresponding terminal, an icon having a design indicating the fact may be used.

Moreover, in a case in which a picture pattern is utilized for the icon, since the icon becomes recognizable more visually, the following example will be described next.

Figure 19C:
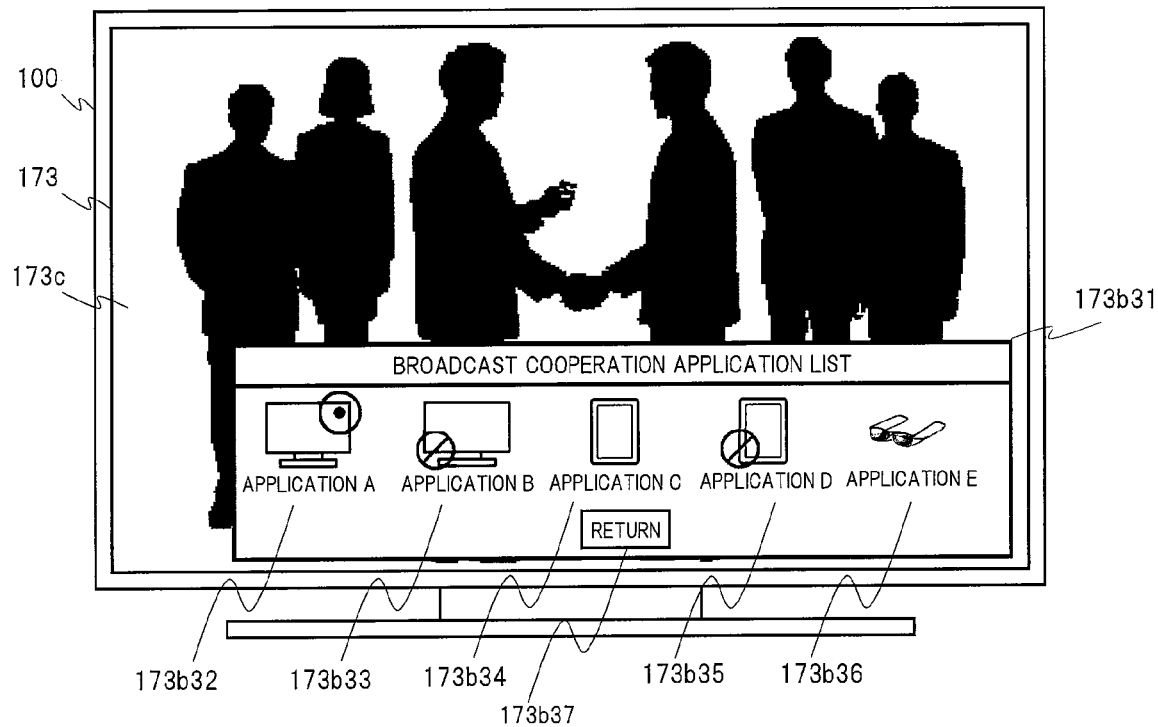
FIG. 19C is a screen display view showing the broadcast cooperation application launcher in the broadcast receiver in accordance with the fifth embodiment.

FIG. 19C shows an example of a launcher screen (173*b*31) showing a list of broadcast cooperation applications. Icons are shown in a manner classified by types of the portable information terminal 700 in addition to the broadcast receiver 100. Each of reference numerals 173*b*32 and 173*b*33 shows an icon indicating the broadcast receiver 100, each of reference numerals 173*b*34 and 173*b*35 shows an icon indicating a smartphone-type portable information terminal 700, and reference numeral 173*b*36 shows an icon indicating a head mount display-type portable information terminal 700. The respective applications are used for devices indicated by the icons.

In FIG. 19C, in a case in which the corresponding application is not utilized, a mark (in this case, round mark with a diagonal line) indicating a state in which utilization is impossible is displayed to be overlapped with the picture pattern of the device. Moreover, with respect to the broadcast receiver 100, in a case in which the corresponding application is already being executed, a mark indicating this fact (in this case, round mark with a dot in the center) may be displayed in an overlapped manner. By using this display, such a wasteful operation to move ahead the steps of the launcher in spite of the fact that the corresponding application is being executed can be prevented. In the case of the portable information terminal 700, a method may be used in which a mark indicating "in execution" is displayed when all the terminals that are in the communicable state with the broadcast receiver and capable of executing the corresponding application are executing the corresponding application.

Figure 19D:
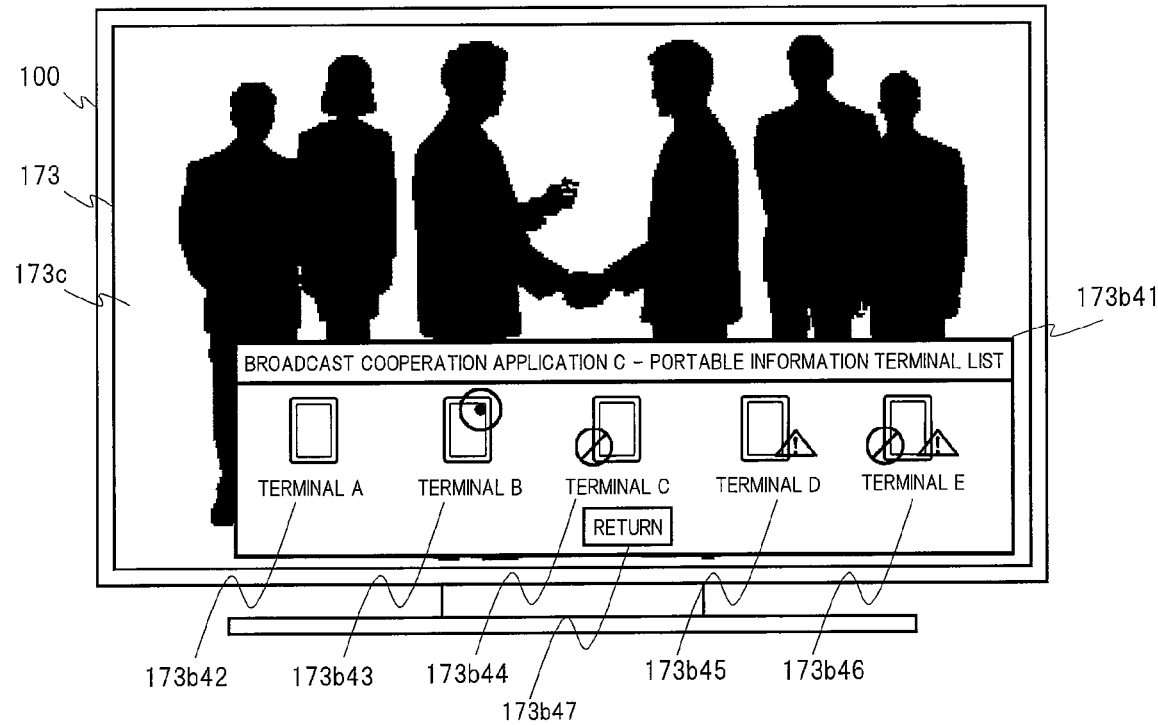
FIG. 19D is a screen display view showing the broadcast cooperation application launcher in the broadcast receiver in accordance with the fifth embodiment.

FIG. 19D shows a screen (173*b*41) after selection of the application C (173*b*34) in FIG. 19C. The states of the portable information terminals 700 corresponding to the application C are shown. In this screen, each of the marks indicating each of the facts that the portable information terminal 700 does not have the execution function of the broadcast cooperation application, that it is not in the state communicable with the broadcast receiver 100, and that it has already been executing the corresponding broadcast cooperation application, is displayed to be overlapped with the icon. In this example, around mark with a diagonal line (173*b*44 and 173*b*46) is shown when it has no executable function, a triangle mark with an exclamation mark (173*b*45 and 173*b*46) is shown when it is not the communicable state, and a round mark with a dot in the center (173*b*43) is shown when it has already been in execution, respectively.

Moreover, it is preferable to provide a display method indicating the presence of a broadcast cooperation application when the situation changes, without activating the launcher. For example, when a power is turned on, when channels are changed, when alternation of a broadcast cooperation application occurs at the start of a program or even in the middle of the program, when a change in the communication state between the broadcast receiver 100 and the portable information terminal 700 occurs, or when the execution status of the application are changed, the icon is displayed for a predetermined period of time to display the corresponding state at that time.

FIG. 19E shows an example in this case. In a case in which icons showing the types of the respective devices are displayed, this state indicates that there are broadcast cooperation applications corresponding to the devices of the respective types. In this case, the round mark with a diagonal line indicates that among the devices of the corresponding type that are in the usable state, there are no devices capable of executing the corresponding application thereon. The round mark with a dot in the center indicates that all the devices of the corresponding type that are in the usable state have already been executing the corresponding application.

FIG. 19F shows a display screen (10401) in the portable information terminal 700. Upon making a request for a terminal cooperation from the portable information terminal, with a list table indicating which types of broadcast cooperation applications can be utilized in which type of broadcast receivers 100, utilization can be carried out more conveniently. FIG. 19F shows an example of such a list table (10402). This table shows that a broadcast cooperation application corresponding to a program that is desirably checked can be utilized in which type of the broadcast receivers 100 present in the user's residence. Moreover, when the list also shows the state of each of the broadcast receivers 100, it becomes possible to achieve higher convenience, in particular, when the application is utilized outside the residence. In this example, display examples including states such as the corresponding program is being received, another program is being received, empty state, and reservation for another program is present (a case in which recording of another program is reserved in the middle of the program), are shown. Here, note that, in a case in which a plurality of tuners are present in the broadcast receiver 100, the state of each of the plural tuners is displayed, thereby achieving much higher convenience. In a table 10202, branch numbers are given to discriminate the tuners in the same device. For example, a receiver B-1 and a receiver B-2 are the tuners in the same broadcast receiver 100. In the case of the terminal cooperation, when deliveries of broadcast video images and audio are received as streaming data, it is not necessary to use the video image unit of the broadcast receiver 100, and since the utilization of the broadcast is possible by using the tuner inside the broadcast receiver 100, it becomes more convenient when the usage status of each of the tuners is recognized.

Note that, in order to execute the display described in this embodiment, information on whether the application in question corresponds to the broadcast receiver 100 or information on whether the application in question corresponds to which type of the portable information terminal 700 is required for each of the broadcast cooperation applications. Moreover, pieces of information for executing the corresponding application on the broadcast receiver 100 and the portable information terminal 700 are required. By describing these pieces of information, for example, in the AIT, the broadcast receiver 100 can acquire the information.

In accordance with the portable information terminal cooperation technique related to the present embodiment described above, by displaying information relating to the broadcast cooperation application, the broadcast receiver 100, and the portable information terminal 700, a broadcast cooperation service having higher usability can be utilized.

Sixth Embodiment

In the following, a sixth embodiment of the present invention will be described. Note that the configuration, effects, and the like of the present embodiment are the same as those of the first embodiment unless otherwise stated. Therefore, in the following, difference between the present embodiment and the first embodiment is mainly described, and with respect to common points, the description thereof will be omitted as much as possible in order to avoid overlapped descriptions.

In the present embodiment, with respect to activation processes of the broadcast cooperation application based on AIT transmitted by a broadcast wave, descriptions will be given by reference to examples on operations of the broadcast receiver 100 corresponding to the following case, in particular. The case corresponds to a case in which the above broadcast cooperation application is a broadcast managed application, and specifications and instructions are given in such a way that the broadcast managed application, that is, the broadcast cooperation application, is preferentially activated automatically in accordance with information on the PMT and information (FIG. 6) about the application control code 903, the activation priority 907, or the like of the AIT. Note that, in the following description, the broadcast managed application is referred to as "broadcast managed appli" in some cases.

The broadcast receiver 100 of the sixth embodiment has a function for controlling the activation process of the broadcast cooperation application specified to be automatically activated in the digital broadcast service, in accordance with the selection of the user. When there is a prescription or an instruction for the automatic activation, the broadcast receiver 100 of the sixth embodiment controls the broadcast cooperation application so as not to be automatically activated unconditionally, but to be automatically activated only when the following conditions (1) to (3) are satisfied: (1) a case in which the user setting of the broadcast receiver permits the automatic activation, (2) a case in which the user who has a predetermined terminal in cooperation with the broadcast receiver is viewing a grogram, in other words, a case in which the user setting of the cooperative terminal permits the automatic activation, and (3) a case in which the confirmation of the activation is given to the user accordingly and the activation is positively confirmed.

Figure 20:
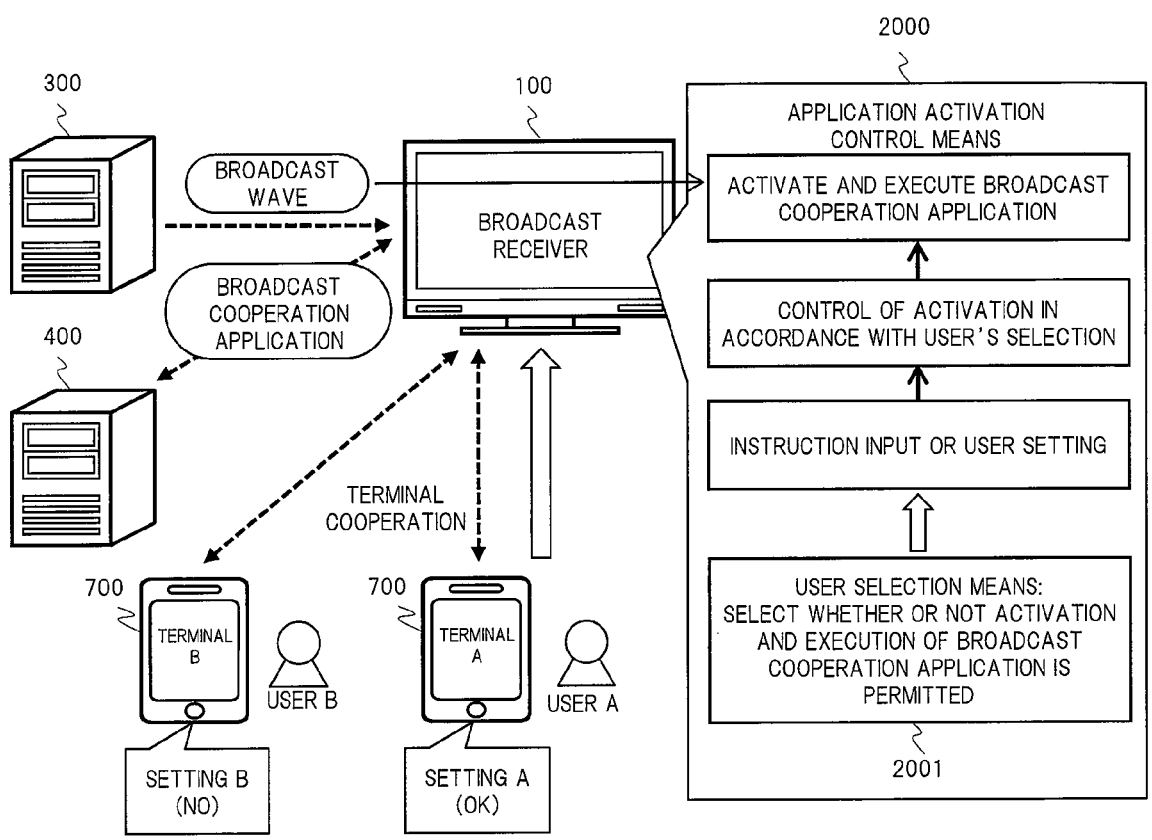
FIG. 20 is a view showing a system configuration including a broadcast receiver in accordance with a sixth embodiment and an example of utilization thereof.

FIG. 20 shows of a system configuration and a utilization example including the broadcast receiver 100 of the sixth embodiment. The broadcast receiver 100 receives a broadcast wave from the broadcast station server 300 via the radio wave tower 300*t* to separate video images of a broadcast program and information such as AIT. Based on information such as AIT, the broadcast receiver 100 acquires a broadcast cooperation application from the service provider server 400 appropriately. The AIT includes information for instructing the automatic activation of the broadcast cooperation application in cooperation with the broadcast program, in some cases.

There are one or more portable information terminals 700 that perform terminal cooperation with the broadcast receiver 100, in some cases. For example, the single broadcast receiver 100 may be cooperatively connected to the portable information terminals 700 of two users and commonly used. For example, there are a terminal A possessed by a user A and a terminal B possessed by a user B. Not limited to this case, one user may use a plurality of portable information terminals 700.

The broadcast receiver 100 of the sixth embodiment is provided with application activation control means 2000 including user selection means 2001. The user selection means 2001 is means for selecting whether or not activation and execution of the broadcast cooperation application is permitted based on the operation of the user of the broadcast receiver 100 and the portable information terminal 700. The user selection means 2001 is constituted by, for example, an instruction input unit, a user setting unit, and the like for the broadcast receiver 100 and the portable information terminal 700. In a case in which the automatic activation of a broadcast cooperation application is instructed by the AIT, the application activation control means 2000 controls the activation of the corresponding broadcast cooperation application in accordance with the selection of whether or not activation and execution of the broadcast cooperation application is permitted by the user and the user selection means 2001.

[In a Case of Automatic Activation of Broadcast Managed Application]

In the sixth embodiment, in a case in which it is prescribed that the broadcast managed application is first preferentially automatically activated, an operation sequence from the confirmation of information such as the PMT and the AIT appropriately carried out by the broadcast receiver 100 up to the activation of the broadcast managed application is the same as that described in the first embodiment by reference to FIG. 7A. Note that, in the example of FIG. 7A, it is confirmed whether or not the target broadcast managed application is executable in the broadcast receiver 100 by confirming the application profile 904 of the AIT (S105). When confirmed that it is executable, regardless of the selection of the user of the broadcast receiver 100, the corresponding broadcast managed application is always automatically activated.

However, the possibility that the user of the broadcast receiver 100 does not want the automatic activation of the broadcast managed application also should be taken into consideration because the user wants to concentrate on viewing the broadcast program, for example. The broadcast receiver 100 of the sixth embodiment is provided with the application activation control means 2000 as a control function which the possibility is taken into consideration. That is, in a case in which the instruction for preferentially automatically activating the broadcast managed application is given by information such as the PMT and the AIT, and also in a case in which it is confirmed by the information such as the AIT that the broadcast managed application is executable, the activation of the corresponding application is controlled in accordance with the selection of whether or not the activation is permitted by the user in the broadcast receiver of the sixth embodiment. In the following, an example in which whether or not the automatic activation of the broadcast managed application is permitted is controlled will be described.

[Operation Sequence (1) upon Activation of Broadcast Managed Application]

Figure 21:
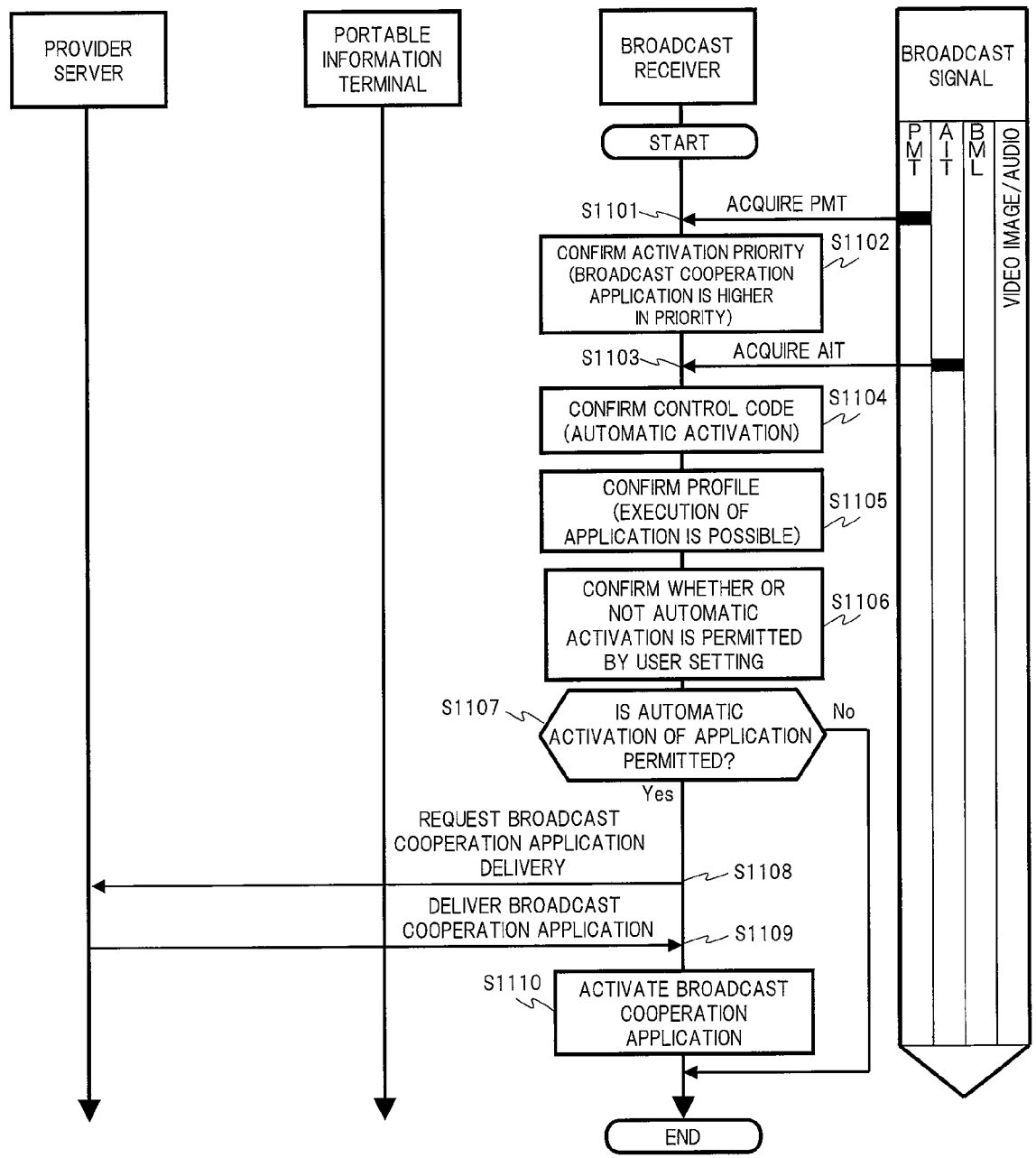
FIG. 21 is a diagram showing an operation sequence at the time of activation of a broadcast cooperation application in the broadcast receiver in accordance with the sixth embodiment.

FIG. 21 shows one example of an operation sequence upon activation of a broadcast cooperation application in a case in which it is prescribed in such a way that the broadcast managed application corresponding to a broadcast cooperation application is preferentially activated as a first example of configuration and processing example of the broadcast receiver 100 of the sixth embodiment. FIG. 21 shows a series of flow carried out by the broadcast receiver 100, until the broadcast receiver 100 controls whether or not the automatic activation of a predetermined broadcast cooperation application is permitted in accordance with the selection of the user after the confirmation of information such as the PMT and the AIT appropriately. The first configuration example uses the user setting in the broadcast receiver 100 as the user selection means 2000.

In FIG. 21, the broadcast receiver 100 carries out a channel selection for a channel desired by the user by the tuner/demodulation unit 131 of FIG. 2A to acquire a TS. Next, the broadcast receiver 100 acquires a PMT data row separated in the first separation unit 132 by the main control unit 101 (S1101) and confirms the activation priority described in the acquired PMT (S1102). The broadcast receiver 100 confirms that the broadcast managed application serving as the broadcast cooperation application has a high activation priority in the processes of S1101 and S1102.

After the above confirmation, the broadcast receiver 100 acquires an AIT data row separated in the first separation unit 132 by using the application control unit 161 (S1103) and confirms the application control code 903 of the AIT data row thus acquired (S1104). In a case in which the application control code 903 corresponds to "automatic activation" in the processes of S1103 and S1104, that is, when the automatic activation of the broadcast cooperation application is specified, the broadcast receiver 100 further confirms the application profile 904 of the AIT data row thus acquired (S1105).

In S1105, the broadcast receiver 100 confirms that the broadcast cooperation application specified by the AIT in the broadcast receiver 100 is executable by confirming the information of the application profile 904. When the fact that it is executable is confirmed, the broadcast receiver 100 further refers to an operation setting value stored in the storage unit 110 by the application control unit 161. Thus, the broadcast receiver 100 confirms whether or not the automatic activation of the broadcast cooperation application is permitted in the user setting of the corresponding broadcast receiver 100 (S1106).

The operation setting value indicating whether or not the automatic activation of the broadcast cooperation application is permitted can be selected and set in accordance with the user's taste by using the function setting menu or the like of the broadcast receiver 100. As the user selection means 2001, the broadcast receiver 100 provides a function setting menu to the user on the screen or the like. By using the function setting menu on the screen, the user can carry out the user setting relating to various functions by the operation on the remote controller of the broadcast receiver 100, the portable information terminal 700 in cooperation therewith, or the like. The broadcast receiver 100 stores the user setting information on the function setting menu in a memory in the broadcast receiver 100 as operation set values.

If it is confirmed that the automatic activation of the broadcast cooperation application is not permitted ("NO"), that is, the user does not want to automatically activate the broadcast cooperation application, in the process of S1106

(S1107-No), the broadcast receiver 100 ends the present processes in FIG. 21. That is, the application control unit 161 does not carry out the acquisition and the activation of the broadcast cooperation application specified in the AIT.

In contrast, if it is confirmed that in the process of S1106, the automatic activation of the broadcast cooperation application is permitted ("OK"), that is, the user wants to automatically activate the broadcast cooperation application (S1107-Yes), the broadcast receiver 100 proceeds to S1108. In the process of S1108, the broadcast receiver 100 allows the application control unit 161 to transmit a delivery request for the broadcast cooperation application to the predetermined service provider server 400 via the LAN communication unit 121 based on information described in the application acquisition source information 905 of the AIT.

The service provider server 400 that has received the delivery request for the broadcast cooperation application in S1108 carries out an authentication process of the broadcast receiver 100, if necessary, based on the control of the application managing/distributing execution unit 4103 of FIG. 4, and then delivers the predetermined broadcast cooperation application stored in the application storage region 4013 via the LAN communication unit 421 (S1109). Note that, with respect to the corresponding authentication process, a generally known method may be used, and the detailed description thereof will be omitted.

Next, the broadcast receiver 100 activates the predetermined broadcast cooperation application that has been delivered from the service provider server 400 and received via the LAN communication unit 121, by the application engine 162, based on the control of the application control unit 161 (S1110). Thus, the broadcast cooperation application is executed so that an execution screen for the corresponding application is displayed.

Note that, as a modified example, the processes of S1106 to S1107 may be carried out after the acquisition of the broadcast cooperation application in the processes of S1108 to S1109.

As shown in the above-mentioned first configuration example of FIG. 21, in the sixth embodiment, the broadcast cooperation application can be activated when the permission of the automatic activation is confirmed by the user setting of the broadcast receiver 100.

[Operation Sequence (2) upon Activation of Broadcast Managed Application]

Figure 22:
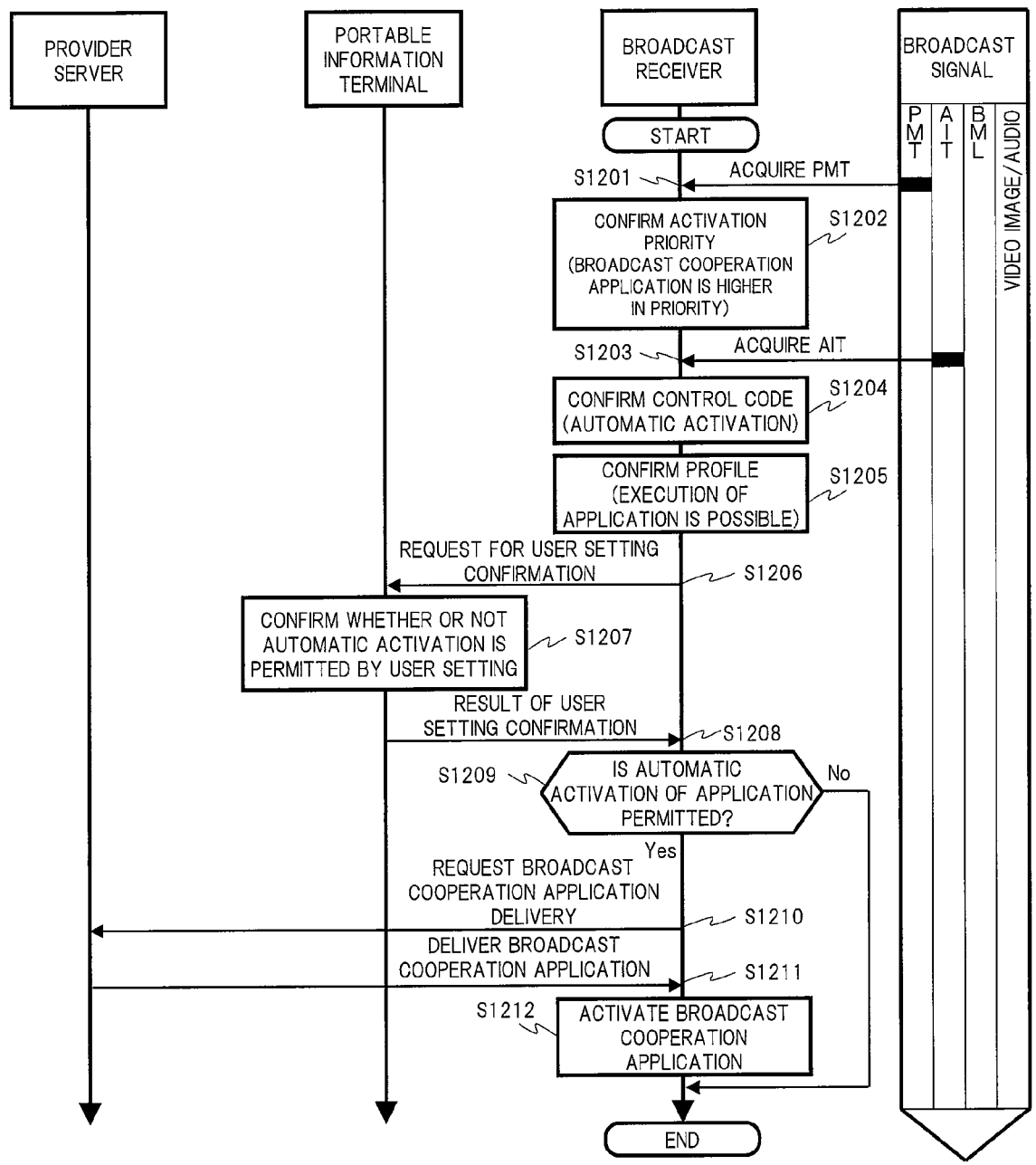
FIG. 22 is a diagram showing an operation sequence at the time of activation of the broadcast cooperation application in the broadcast receiver in accordance with the sixth embodiment.

FIG. 22 shows one example of an operation sequence upon activation of a broadcast cooperation application which is different from that of FIG. 21 in a case in which it is prescribed in such a way that the broadcast managed application corresponding to a broadcast cooperation application is preferentially activated as second configuration example and processing example of the broadcast receiver 100 of the sixth embodiment. FIG. 22 shows an example in which whether or not the automatic activation of the broadcast cooperation application is permitted is confirmed by referring to the cooperative operation with the broadcast receiver 100, that is, operation setting values stored in the portable information terminal 700 with which the terminal cooperation is performed, that is, the user setting information. In the second configuration example, user setting in the portable information terminal 700 is used as the user selection means 2000. The user selects whether or not the automatic activation of the broadcast cooperation application is permitted and sets the selected result on the portable information terminal 700.

In FIG. 22, the broadcast receiver 100 first carries out processes of S1201 to S1205 that are the same as those processes of S1101 to S1105 in FIG. 21. In a case in which the broadcast cooperation application specified by the AIT is confirmed to be executable by confirming the application profile 904 in S1205, the broadcast receiver 100 next carries out the process of S1206. In S1206, the broadcast receiver 100 allows the application control unit 161 to transmit a user setting confirmation request to the portable information terminal 700 under a cooperative operation. In this case, suppose that, for example, the terminal A shown in FIG. 20 is present as the portable information terminal 700 that is currently in cooperative operation or in a state in which terminal cooperation can be performed.

In response to the above-mentioned user setting confirmation request received by the cooperation control execution unit 7102 in FIG. 5B via the LAN communication unit 721, the portable information terminal 700 refers to operation setting values relating to the broadcast receiver 100 stored in the storage unit 710 shown in FIG. 5A. Thus, the portable information terminal 700 confirms whether or not the automatic activation of the broadcast cooperation application in the corresponding broadcast receiver 100 is permitted in the user setting of the portable information terminal (S1207). The portable information terminal 700 allows the cooperation control execution unit 7102 to transmit the confirmation result of whether or not the automatic activation is permitted to the broadcast receiver 100 via the LAN communication unit 721 as the results of the user setting confirmation (S1208). Note that the operation setting value for whether or not the automatic activation of the broadcast cooperation application in the broadcast receiver 100 is permitted, which is the user setting information of the portable information terminal 700, can be set by using, for example, the following means. That is, in a cooperative operation state between the broadcast receiver 100 and the portable information terminal 700, the user makes a selection in accordance with his or her taste and can set the value by using, for example, the cooperation function setting menu that is one of items of the function setting menu of the portable information terminal 700. The portable information terminal 700 provides the above-mentioned function setting menu to the user as a screen or the like. The user selects the cooperation function setting menu from the function setting menu. The cooperation function setting menu is a menu by which setting relating to the cooperative operation can be made. The user can make setting relating to whether or not the automatic activation of the broadcast cooperation application in the broadcast receiver 100 is permitted through selecting operations from the cooperation function setting menu. The portable information terminal 700 stores the user setting information made on the function setting menu in the memory in the portable information terminal 700 as operation setting values.

In a case in which the broadcast receiver 100 confirms that the automatic activation of the broadcast cooperation application is not permitted, that is, the user possessing the portable information terminal 700 does not want the automatic activation of the broadcast cooperation application in the broadcast receiver 100, through the processes of S1206 to S1208 (S1209-No), the broadcast receiver 100 ends the present processes in FIG. 22. That is, the application control unit 161 does not carry out the acquisition and activation of the broadcast cooperation application specified by the AIT.

In contrast, in a case in which the broadcast receiver 100 confirms that the automatic activation of the broadcast cooperation application is permitted, that is, the user possessing the portable information terminal 700 wants the automatic activation of the broadcast cooperation application in the broadcast receiver 100 (S1209-Yes), the broadcast receiver 100 proceeds to S1210.

In S1210, the broadcast receiver 100 allows the application control unit 161 to transmit a delivery request for the broadcast cooperation application to the predetermined service provider server 400 via the LAN communication unit 121 based on information described in the application acquisition source information 905 of the AIT.

The service provider server 400 that has received the delivery request for the broadcast cooperation application in S1210 carries out an authentication process on the broadcast receiver 100 based on the control of the application managing/distributing execution unit 4103, if necessary, and then delivers the predetermined broadcast cooperation application stored in the application storage region 4013 via the LAN communication unit 421 (S1211).

Next, the broadcast receiver 100 allows the application engine 162 to activate the predetermined broadcast cooperation application delivered by the service provider server 400 and received via the LAN communication unit 121, based on the control of the application control unit 161 (S1212).

As described in the second configuration example of FIG. 22, in the sixth embodiment, in a case in which the portable information terminal 700 in cooperation with the broadcast receiver 100 is present and the permission of automatic activation is confirmed by the user setting of the portable information terminal 700, the broadcast cooperation application can be activated.

Note that, as a modified example, upon confirming the user setting in FIG. 22, in a case in which the portable information terminal 700 is not currently in cooperative operation with the broadcast receiver 100, the processes of S606 to S611 in FIG. 8C may be carried out prior to the processes of S1206 to S1208. Thus, in this modified example, the activation process of the cooperation control application is carried out to allow the portable information terminal 700 to start the cooperative operation with the broadcast receiver 100, and in this state, the user setting is confirmed.

Moreover, as other modified examples, in the following cases, an embodiment in which a control is carried out to select the Yes side in S1209 and an embodiment in which a control is carried out to select the No side in S1209 may be possible. Those cases include a case in which there is no portable information terminal 700 which is a target object of the user setting confirmation request to be transmitted in S1206, a case in which no response to the corresponding request is received, a case in which the result of the user setting confirmation is not correctly acquired in S1208, or the like. These cases correspond to a situation where no portable information terminal 700 that can perform terminal cooperation is present at that time, a situation where no communication is temporarily carried out between the broadcast receiver 100 and the portable information terminal 700, or the like. In the former embodiment, even though the permission of the activation by the user setting is not confirmed, the broadcast cooperation application is activated. In the latter embodiment, since no permission of activation by the user setting can confirmed, the broadcast cooperation application is not activated. Which control operation is taken in the above-mentioned modified examples can be set by prescribing the specification of the broadcast receiver 100 or selecting by the user.

Furthermore, as another modified example, the processes of S1206 to S1209 may be carried out after the acquisition of the broadcast cooperation application in the processes of S1210 to S1211.

[Operation Sequence (3) upon Activation of Broadcast Managed Application]

Figure 23:
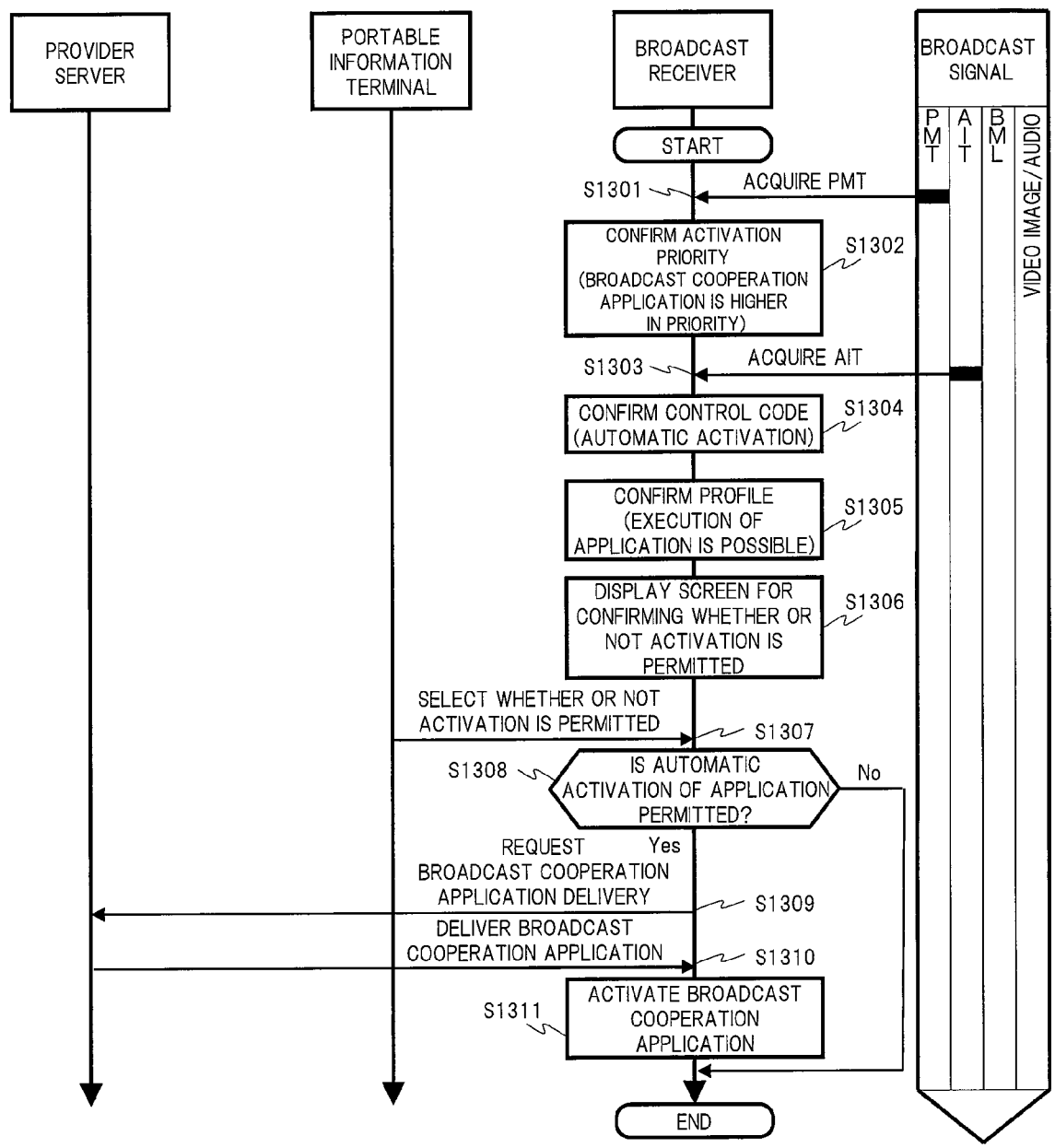
FIG. 23 is a diagram showing an operation sequence at the time of activation of the broadcast cooperation application in the broadcast receiver in accordance with the sixth embodiment.

FIG. 23 shows one example of an operation sequence upon activation of a broadcast cooperation application which is different from the above-mentioned example in a case in which it is prescribed in such a way that the broadcast managed application corresponding to a broadcast cooperation application is preferentially activated as third configuration example and processing example of the broadcast receiver 100 of the sixth embodiment. FIG. 23 shows an example in which whether or not the activation of the broadcast cooperation application is permitted is each time confirmed to the user by a message or the like on the screen in real time. In the third configuration example, instruction inputs from the portable information terminal 700 to the broadcast receiver 100 are used as the user selection means 2000.

In FIG. 23, the broadcast receiver 100 first carries out processes of S1301 to S1305 that are the same as those of S1101 to S1105 in FIG. 21. In a case in which it is confirmed that the broadcast cooperation application specified by the AIT is executable by confirming the application profile 904 in S1205, the broadcast receiver 100 next carries out the process of S1306. In S1306, the broadcast receiver 100 allows the application control unit 161 to display a screen for confirming whether or not activation is permitted, allowing the user to select whether or not the activation of the broadcast cooperation application is permitted.

The user selects whether or not the activation of the corresponding broadcast cooperation application is permitted on the screen for confirming whether or not activation is permitted which is displayed in S1306 by using the portable information terminal 700, a remote controller, or the like that are the operation means (S1307). The broadcast receiver 100 receives the selection information as an instruction input.

In a case in which in accordance with the result of selecting whether or not activation is permitted by the user in S1307, the activation of the broadcast cooperation application is not selected, that is, the user does not permit the activation at this point of time (S1308-No), the broadcast receiver 100 ends the present processes in FIG. 23. That is, the application control unit 161 does not carry out the acquisition and the activation of the broadcast cooperation application specified by the AIT.

In contrast, in a case in which the activation of the broadcast cooperation application is selected by the user in S1307, that is, when the user permits the activation at this point of time (S1308-Yes), the broadcast receiver 100 proceeds to S1309. In the process of S1309, the broadcast receiver 100 allows the application control unit 161 to transmit a delivery request for the broadcast cooperation application to the predetermined service provider server 400 via the LAN communication unit 121 based on information described in the application acquisition source information 905.

The service provider server 400 that has received the distribution request for the broadcast cooperation application carries out an authentication process on the broadcast receiver 100 based on the control of the application managing/distributing execution unit 4103, if necessary, and then delivers the predetermined broadcast cooperation application stored in the application storage region 4013 via the LAN communication unit 421 (S1310).

Next, the broadcast receiver 100 allows the application engine 162 to activate the predetermined broadcast cooperation application delivered by the service provider server 400 and received via the LAN communication unit 121, based on the control of the application control unit 161 (S1311).

Note that, as another modified example, the processes of S1306 to S1308 may be carried out after the acquisition of the broadcast cooperation application in the processes of S1309 to S1310.

As described in the third configuration example of FIG. 23, in the sixth embodiment, the confirmation of the activation is each time carried out to the user on the screen, and when the permission is confirmed, the broadcast cooperation application can be activated.

In the example of FIG. 23, by allowing the portable information terminal 700 to function as operation means for the broadcast receiver 100 by terminal cooperation, whether or not the activation is permitted is selected. Not limited to this configuration, another embodiment may also be possible in which whether or not the activation is permitted is selected by using a remote controller or the like provided in the broadcast receiver 100 that is the main body.

[Screen for Confirming Whether or Not Activation is Permitted]

Figure 24:
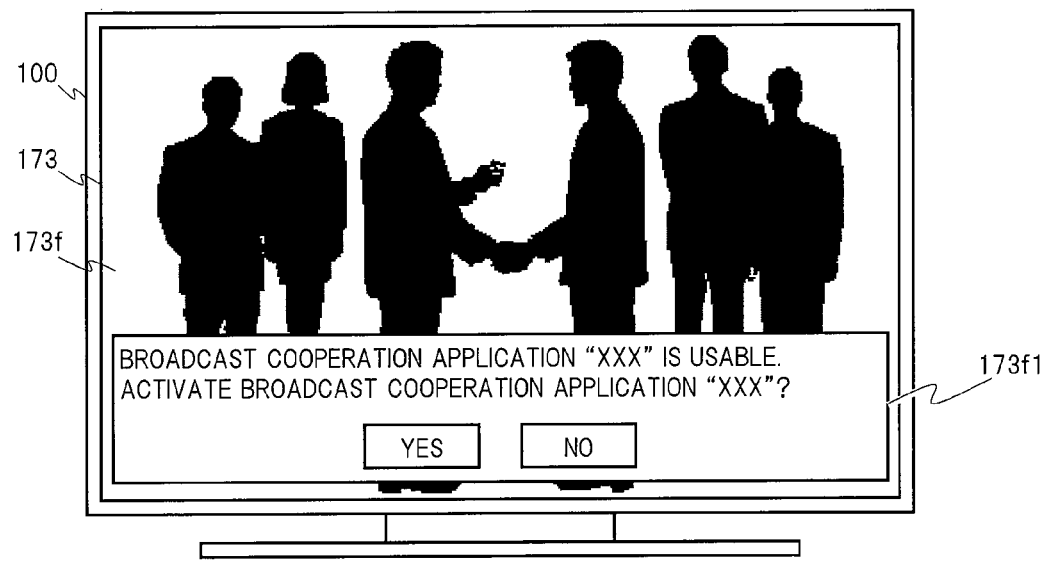
FIG. 24 is a screen display view showing a screen for confirming whether or not activation is permitted in the broadcast receiver in accordance with the sixth embodiment.

FIG. 24 shows one example of a screen for confirming whether or not activation is permitted of the broadcast receiver 100 displayed as a result of the process of S1306 in FIG. 23. In the present embodiment, on the screen of the video image display unit 173 of FIG. 24, a message box 173f1 is displayed as the screen for confirming whether or not activation is permitted. The message box 173f1 includes a message indicating that a predetermined broadcast cooperation application is usable and "Yes" and "No" buttons for allowing the user to select whether or not the activation of the corresponding broadcast cooperation application is permitted. Examples of the message include "Broadcast cooperation application XXX is usable. Activate the broadcast cooperation application XXX?" or the like. In another message example, "Activation of broadcast cooperation application XXX is specified, and activation is possible; Permit activation?" or the like is given.

In a state where the message box 173f1 shown in FIG. 24 is displayed, the user selects whether or not the activation is permitted by using the operation means (S1307). For example, on the basic screen 741a of the cooperation control application of the portable information terminal 700 of FIG. 10A, the user selects "Yes" or "No" by using the cursor key 741ac, the enter key 741ad, and the like. Thus, the user can select whether or not the activation of the broadcast cooperation application presented in the message box 173f1 of the broadcast receiver 100 is permitted, in accordance with the user's convenience and situation at that time.

Note that, as a modified example, in place of the message box 173f1, the icon 173b0 indicating the presence of the cooperation application shown in FIG. 12A described above, another mark, image, or the like may be displayed within the screen to allow the user to carry out a selection operation. In this case, for example, the user depresses the cooperation application key 741a9 on the basic screen 741a of the cooperation control application. Thus, the predetermined broadcast cooperation application is activated. Moreover, in a case in which the cooperation application key 741a9 corresponding to the selection of the icon 173b0 is not depressed for a predetermined period of time, the display of the icon 173b0 may be controlled to be erased.

Effects and the Like

As described above, in accordance with the respective configuration examples of the broadcast receiver 100 of the sixth embodiment, also in a case in which automatic activation of the broadcast managed application in priority is prescribed and instructed by the PMT and the AIT and it is confirmed that the execution of the broadcast managed application is possible by the AIT, the activation of the corresponding broadcast managed application can be controlled appropriately in accordance with the selection of the user. That is, in accordance with the broadcast receiver 100 of the present embodiment, it is possible to execute functions having higher added values.

Note that, which of the above-mentioned first to third configuration examples and various modified examples may be adopted can be set by prescribing as the specification in the broadcast receiver 100 or the like, or by user's selection in the broadcast receiver 100 or the like. For example, in the configuration examples of FIG. 21 and FIG. 22, as the operation setting values relating to the user setting, the selection may be made from two values, that is, (a) "activation of the broadcast managed application is permitted (OK)" and (b) "activation of the broadcast managed application is not permitted (NO)." Not limited by this method, as a modified example, in addition to the above-mentioned (a) and (b), selection may be made from multiple values including these values, that is, (c) "give an inquiry to the terminal," and (d) "confirm on screen each time." The broadcast receivers 100 of these modified examples carry out control operations related to the first to third configuration examples in accordance with the setting values by the user's selection. In the case of the setting of (c), processes of the second configuration example are carried out, and in the case of the setting of (d), processes of the third configuration example are carried out.

In particular, in the first configuration example of FIG. 21, in accordance with user's setting preliminarily carried out on the broadcast receiver 100, the activation of the broadcast cooperation application can be controlled. The user can alter the setting appropriately in accordance with his or her convenience and utilize the broadcast cooperation application.

Figure 25:
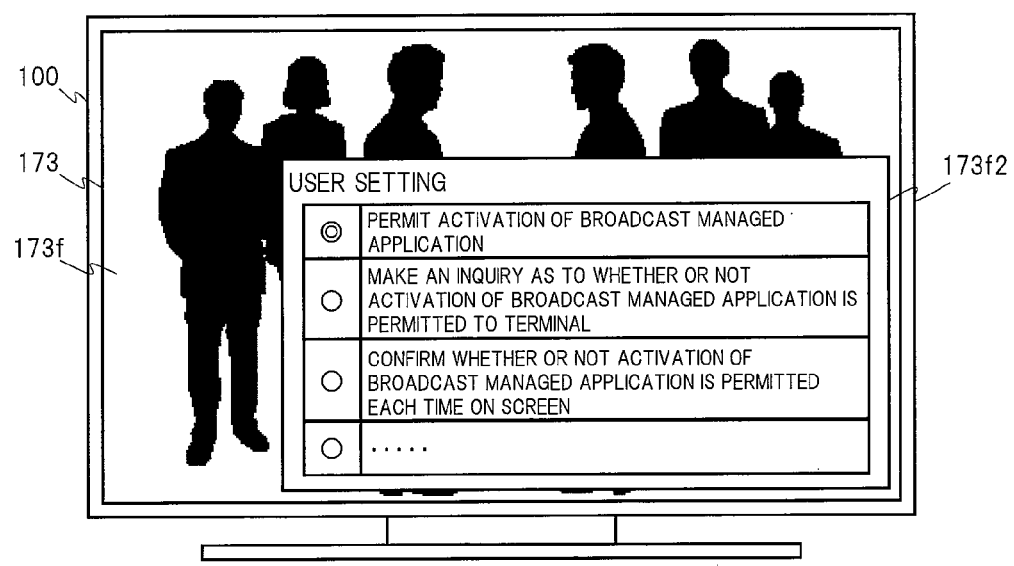
FIG. 25 is a screen display view showing a user setting screen in the broadcast receiver in accordance with the sixth embodiment.

FIG. 25 shows an example in which a user setting menu is displayed on the screen of the broadcast receiver 100. In response to an operation of the remote controller or the like by the user, a menu 173f2 for user setting is displayed on the screen. In the case of the first configuration example, the menu 173f2 includes "Automatic activation of the broadcast managed application is permitted" as one of setting items thereof. The item corresponds to "Whether or not the automatic activation is permitted, when the automatic activation of the broadcast cooperation application is specified." The user can set OK/NO corresponding to the above-mentioned (a) and (b), by the on-off operations or the like on buttons relating to the corresponding setting item of the menu 173f2. The same function can be achieved also on the screen of the portable information terminal 700.

In particular, in the second configuration example of FIG. 22, whether or not the automatic activation of the broadcast managed application is permitted can be set based on a unit of a user possessing the portable information terminal 700, and further, the selection of whether or not the automatic activation of the broadcast managed application is permitted can also be made depending on the presence or absence of the portable information terminal 700 that performs cooperative operation.

By using FIG. 20 described above, an example of the above-mentioned setting and utilization will be described. As the user setting in the portable information terminal 700, a setting A is prepared in a terminal A of a user A, and a different setting B is prepared in a terminal B of a user B. For example, the setting A corresponds to "OK" of the automatic activation of the broadcast cooperation application, and the setting B corresponds to "NO" of the automatic activation of the broadcast cooperation application. In a case in which, at the time of the processes of S1206 to S1209 in FIG. 22, for example, only the terminal A of the user A performs cooperative operation, the corresponding terminal A is confirmed, so that the activation thereof is permitted as the result. In a case in which only the terminal B of the user B performs cooperative operation, the terminal B is confirmed, so that the activation thereof is not permitted as the result. In this manner, whether or not the activation of the broadcast cooperation application is permitted can be set by a portable information terminal 700 of each user, and the activation and the utilization of the broadcast cooperation application are possible depending on the presence or absence of the portable information terminal 700 to perform cooperation in the situation at that time.

Moreover, as a modified example, a control operation can be carried out by taking into consideration both combinations of the specification or the user setting in the broadcast receiver 100 and the specification or the user setting in the portable information terminal 700. For example, either of an embodiment in which the content of the user setting in the portable information terminal 700 is preferentially used rather than the user setting in the broadcast receiver 100 and an embodiment in which the content of the user setting in the broadcast receiver 100 is preferentially used rather than the user setting in the portable information terminal 700 can be used.

Moreover, in the second configuration example, the user setting on whether or not confirmation is made by making an inquiry as to whether or not the activation of the broadcast cooperation application is permitted to the portable information terminal 700 may be possible. In this case, in the menu 173f2 for user setting in FIG. 25 described above, a setting item corresponding to the above-mentioned (c) "make an inquiry to the terminal" is provided.

In particular, in the third configuration example in FIG. 23, whether or not the activation is permitted can be controlled by a broadcast managed application prepared for each of broadcast programs. The user views the broadcast managed application and confirmation information presented on the screen, and when he or she wants to activate the corresponding application at that time, the user can permit the activation thereof, while, when he or she does not want to activate the corresponding application, the user can make the activation non-permissible.

Moreover, in the third configuration example, the user setting on whether or not permission of the activation of the broadcast cooperation application is each time confirmed on the screen may be possible. In this case, in the menu 173f2 for user setting of FIG. 25 described above, a setting item corresponding to the above-mentioned (d) "confirm on screen each time" is provided.

As another embodiment, the following example is proposed. In another example, an option is prepared in which, even when the setting is made by selecting "NO" preliminarily in the user setting in the above-mentioned (b) in the configuration example in FIG. 21 and FIG. 22, the broadcast managed application is forcibly activated regardless of the corresponding setting value. In this embodiment, for example, in the data configuration of AIT shown in FIG. 6, as setting values of the parameters of the application control code 903, in addition to (1) to (4), a setting value of (5) "forcible activation" is prepared. Alternatively, in a separate manner, as one of the AIT parameters (one of "other pieces of information" in FIG. 6), an item of "forcible activation setting" may be prepared. By these setting values, for example, "valid" or "invalid" can be selected.

Moreover, in a case in which the setting value of the application control code 903 is the above-mentioned (5) "forcible activation," or when the value of the item of the above-mentioned "forcible activation setting" is "valid," the broadcast receiver 100 controls in the following manner. That is, even in a case in which the operation setting value is set to (b) "NO," the broadcast receiver 100 controls in such a way that the broadcast managed application is forcibly activated. In other words, in the control in this embodiment, the forcible activation is provided as a higher-order and more preferential item than the item of the aforementioned user setting relating to the automatic activation. In the case of the embodiment having an option of the above-mentioned forcible activation, for example, an application having a higher degree of necessity to be displayed and presented such as an application for displaying emergency information, an application required for demonstration for a specific CM, and the like, can be suitably displayed and provided from the broadcast station side to the user.

As another embodiment, in a case in which a broadcast cooperation application is pre-installed in the broadcast receiver 100, such a process as to acquire the broadcast cooperation application from the service provider server 400 described above (for example, processes from S1108 to S1110 in FIG. 21) becomes unnecessary.

With respect to information for controlling the broadcast cooperation application contained in a broadcast wave, not limited to PAT, AIT, or the like, any information can be applicable. For example, one of the parameters (901 to 909) of the AIT in FIG. 6 may be separated to be constituted as independent control information and be provided. The control information may be provided in a form contained in a broadcast wave or may be provided in another form different from the broadcast wave. The corresponding control information may be preliminarily set in the device.

Seventh Embodiment

In the following, a seventh embodiment of the present invention will be described. Note that the configuration, effects, and the like of the present embodiment are the same as those of the first embodiment unless otherwise stated. Therefore, in the following, difference between the present embodiment and the first embodiment is mainly described, and with respect to common points, the description thereof will be omitted as much as possible in order to avoid overlapped descriptions.

Since the broadcast cooperation application serving as an application to be used in the broadcast communication cooperation system of the present embodiment is constituted by an HTML document, it can be linked with another HTML document on the network. In a broadcast managed application, operations such as activation/end are controlled based on an application control code 903 or the like of the AIT contained in a broadcast signal of a broadcast wave. In an out-of-broadcast managed application and a general application, operations such as activation/end are not controlled by the above-mentioned broadcast signal. Note that, in the following description, the out-of-broadcast managed application is referred to as "out-of-broadcast appli" and the general application as "general appli," respectively, in some cases.

Since linking by the use of HTML documents constituting the broadcast cooperation application is possible, transition from the broadcast managed application to the out-of-broadcast application or the general application can be made in the seventh embodiment. Moreover, in the seventh embodiment, the out-of-broadcast application and general application can be directly activated from the aforementioned broadcast cooperation application launcher screen or the like in accordance with the user's instruction operation. For example, the broadcast station, the service provider, or the like allows information on an instruction for transition to another HTML document constituting the out-of-broadcast application or the like to be contained in the HTML document of the broadcast managed application, by using a description of a link such as URL. In this case, the transition from the broadcast managed application to the out-of-broadcast application or the like may be generated.

Since in the out-of-broadcast application and general application, operations such as the activation/end are not controlled by a broadcast signal, the user executes an out-of-broadcast application and a general application while viewing a broadcast program, in some cases. In a case in which the user executes the out-of-broadcast application or the like while viewing a broadcast program, he or she further requests an activation of a broadcast managed application that is in cooperation with the corresponding broadcast program, in some cases. The corresponding request includes, for example, an instruction for activation by the application control code 903 or the like of the AIT contained in a broadcast signal. That is, in this case, it is requested to execute the out-of-broadcast application or general application and the broadcast managed application in parallel with each other, or to select one of them. Although it is technically possible to execute a plurality of different kinds of applications in parallel with each other, this process is sometimes not desirable in terms of control and is also sometimes inconvenient to the user.

Therefore, in order to suitably handle the request even in the above-mentioned situation, the broadcast receiver 100 of the seventh embodiment has a function of controlling overlapped or parallel activations of the applications, or controlling the activation and end of the respective applications. In a case in which the activation and execution of the second application are requested in execution of the first application, the corresponding function controls operations including the activation, end, or the like of these applications in accordance with the selection of the user. In particular, in a case in which a request for activation of a broadcast managed application is given in execution of an out-of-broadcast application or the like, the corresponding function makes it possible to control the end of the out-of-broadcast application or the like and the activation of the broadcast managed application, in accordance with the user's instruction input, setting, and the like. In the seventh embodiment, explanation is given to an example of control operation on the broadcast receiver 100 in the above-mentioned case and situation.

In the following, an example of control in accordance with the user's selection by the above-mentioned function will be described. (1) The above-mentioned function makes it possible to activate and execute the target broadcast managed application, while the out-of-broadcast application and general application that are in execution at the time of receiving the above-mentioned request are being continuously executed. (2) The above-mentioned function ends the out-of-broadcast application and general application that are in execution at the time of receiving the above-mentioned request to activate and execute the target broadcast managed application. (3) The above-mentioned function does not activate and execute the target broadcast managed application, while the out-of-broadcast application and general application that are in execution at the time of receiving the above-mentioned request are being continuously executed.

In the following, means for user's selection by the above-mentioned function will be described. (a) The above-mentioned function displays, when the request is given, pieces of information on the screen, such as information by which the user is informed of the situation in which the request for activation of another broadcast managed application different from the out-of-broadcast application or the like that is in execution is given, and information for allowing the user to select applications to be activated or ended, or the above-mentioned control operations. The corresponding function receives the operation of an instruction input of a selection by the user on the screen. In accordance with the user's selection, the corresponding function executes the contents of control selected from, for example, the above-mentioned (1) to (3). (b) The above-mentioned function preliminarily receives operations for user's settings by the user. When the above-mentioned request is given, the corresponding function executes the contents of control selected from, for example, the above-mentioned (1) to (3), in accordance with the confirmation of information about the user's setting.

Figure 26:
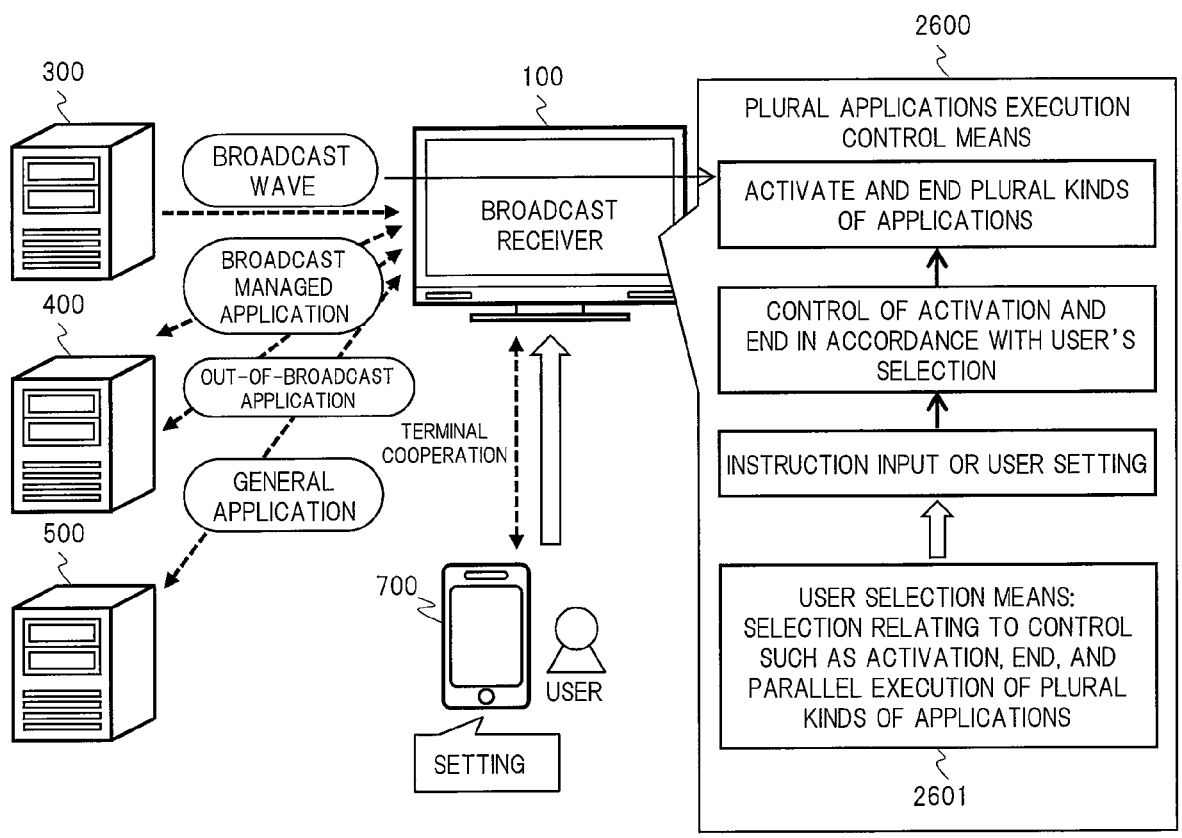
FIG. 26 is a view showing a system configuration including a broadcast receiver in accordance with a seventh embodiment and an example of utilization thereof.

FIG. 26 shows a system configuration including the broadcast receiver 100 of the seventh embodiment and an example of utilization thereof. The broadcast receiver 100 receives a broadcast wave from the broadcast station server 300 via the radio wave tower 300*t* and separates video images of a broadcast program and information such as AIT from each other. Based on the information such as the AIT, the broadcast receiver 100 appropriately acquires a broadcast managed application corresponding to the broadcast cooperation application from the service provider server 400 or the like. Moreover, the broadcast receiver 100 appropriately acquires an out-of-broadcast application and a general application from the service provider server 400, another application server 500, or the like. Furthermore, there may be a portable information terminal 700 that performs terminal cooperation with the broadcast receiver 100, and various kinds of applications may be acquired and executed in a terminal cooperative state between the broadcast receiver 100 and the portable information terminal 700.

The broadcast receiver 100 of the seventh embodiment is provided with plural applications execution control means 2600 including user selection means 2601. The user selection means 2601 is means for allowing the user to select the contents of control such as operations including activations and ends of a plurality of kinds of applications and parallel executions thereof based on the user's operation in the broadcast receiver 100 and the portable information receiver 700. The user selection means 2601 includes an instruction input unit that receives instruction inputs in the broadcast receiver 100, the portable information terminal 700, or the like relating to, for example, the above-mentioned (a), and processes those inputs. The user selection means 2601 includes a user setting unit for receiving user's setting relating to, for example, the above-mentioned item (b) and processing the setting.

For example, in a case in which an activation of a broadcast managed application is instructed by AIT of a broadcast wave in execution of an out-of-broadcast application or a general application while viewing a broadcast program, the plural applications execution control means 2600 controls the end of the out-of-broadcast application, the activation of the broadcast managed application, or the like, in accordance with the selection of the control operation suitable to the corresponding case by the user and the user selection means 2601.

[Example of Plural Kinds of Applications]

Figure 27:
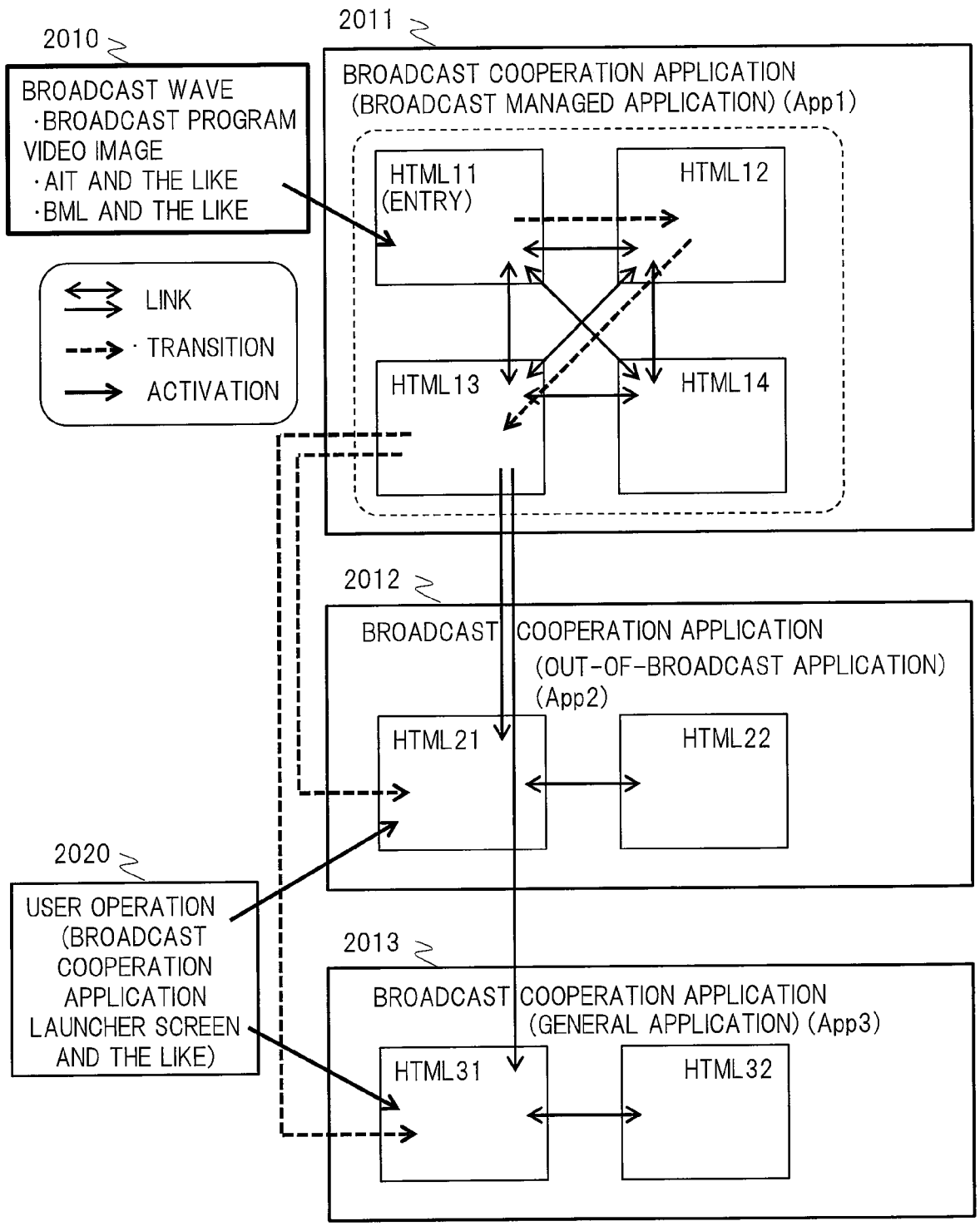
FIG. 27 is a view showing a plurality of kinds of applications, transitions among the applications, and the like in accordance with the seventh embodiment.

FIG. 27 shows an example of document configuration of a plurality of kinds of applications, activations of the respective applications, transitions among the respective applications, and the like. A broadcast wave 2010 includes video images of a broadcast program, information such as AIT, information such as BML, or the like. As described earlier, in the broadcast communication cooperation function, the AIT allows the broadcast receiver 100 to be informed of the presence of a broadcast cooperation application and instructs the control such as its activation and end. For example, by information of the AIT included in the broadcast wave 2010, a broadcast managed application 2011 is activated.

In the seventh embodiment, broadcast cooperation applications are mainly classified into (a) broadcast managed application, (b) out-of-broadcast application, and (c) general application. The broadcast managed application is operated in a broadcast receiving state based on a control signal included in the broadcast signal and permitted to access a broadcast resource. The out-of-broadcast application is operated in a state in which the activation/end or the like due to the broadcast wave signal is not controlled and is permitted to access the broadcast resource based on authentication or the like. The general application is operated independently from the broadcast signal and not permitted to access the broadcast resource.

In FIG. 27, App1 which is the broadcast managed application 2011 is constituted by four documents, that is, HTML11 to HTML14, for example. App2 which is the out-of-broadcast application 2012 is constituted by two documents, that is, HTML21 and HTML22, for example. App3 which is the general application 2013 is constituted by two documents, that is, HTML31 and HTML32, for example. Each of the HTML documents can transit by a link indicated by an arrow of a solid line. For example, a transition from HTML13 of App1 to HTML21 of App2 or HTML31 of App3 can be carried out. An arrow of a broken line shows an example of a transition between HTML documents.

In FIG. 27, for example, in accordance with the user operation 2020 on the broadcast cooperation application launcher screen described above, App2 corresponding to the out-of-broadcast 2012 and App3 corresponding to the general application 2013 can be activated. App2 is executed by reading HTML21, for example, and App3 is executed by reading HTML31, for example.

In the following, an example in a case in which each application is independently executed during reproduction of a broadcast program (for example, supposed to be broadcast program A) by the broadcast wave 2010 will be described. (a1) The activation of App1 corresponding to the broadcast managed application 2011 is instructed by AIT, so that App1 is activated and executed. App1 is permitted to access the broadcast program A. Moreover, when the end of App1 is instructed by the AIT, App1 is ended.

(a2) Based on the selection operation of the user such as an instruction input, through the broadcast cooperation application launcher screen, a link from HTML13 of App1, or the like, the activation of App2 corresponding to the out-of-broadcast application 2012 is instructed, so that App2 is activated and executed. App2 is permitted to access the broadcast program A. When the end of App2 is instructed, App2 is ended. (a3) In the same manner, based on the selection operation of the user, through the broadcast cooperation application launcher screen, a link from HTML13 of App1, or the like, the activation of App3 corresponding to the general application 2013 is instructed, so that App3 is activated and executed. App3 is not permitted to access the broadcast program A. When the end of App3 is instructed, App3 is ended.

[Operation Sequence upon Activation of Broadcast Managed Application]

Figure 28:
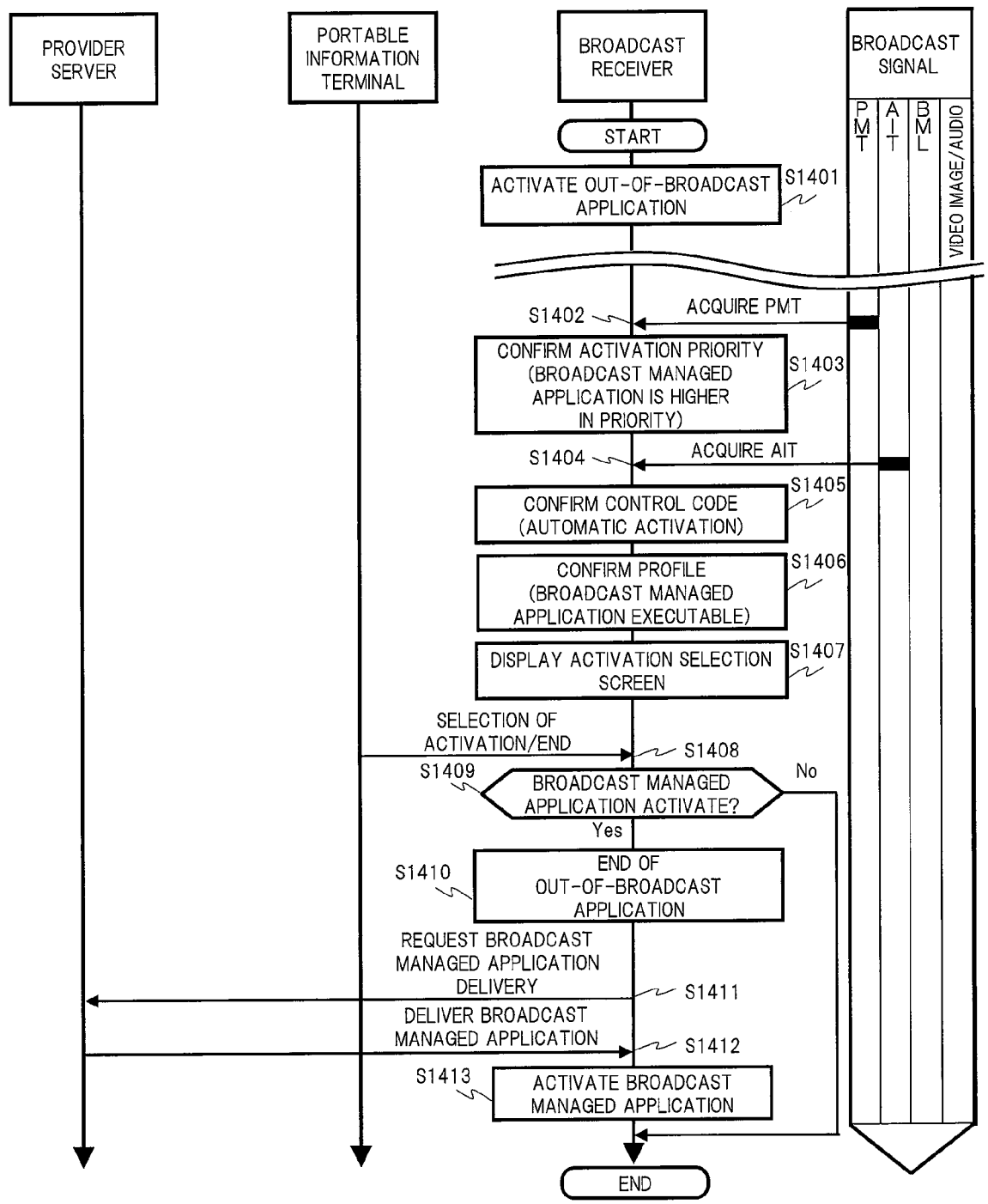
FIG. 28 is a diagram showing an operation sequence at the time of activation of a broadcast cooperation application in the broadcast receiver in accordance with the seventh embodiment.

FIG. 28 shows an operation sequence of control in the broadcast receiver 100 of the seventh embodiment in a case in which an activation of a broadcast managed application is requested by AIT or the like of a broadcast wave in execution of an out-of-broadcast application while viewing a broadcast program. Note that, in the following, an example case of the out-of-broadcast application will be described; however, the same is true for the general application. In FIG. 28, it is supposed that the activation of the broadcast managed application in priority is prescribed and instructed by information on the PMT, and information of the application control code 903, the activation priority 907, or the like of the AIT.

In the broadcast receiver 100, suppose that while the user is viewing a broadcast program, an activation of an out-of-broadcast application is instructed, for example, in accordance with an operation for selecting a desired optional out-of-broadcast application from the broadcast cooperation application launcher screen by the user. Then, the broadcast receiver 100 displays the execution screen of the out-of-broadcast application to be superimposed, for example, on the broadcast program screen (S1401). In the state of S1401, when the broadcast program is switched or the like, the contents of the information such as the PMT and the AIT in a broadcast signal are updated. Even when the corresponding update is carried out, the execution state of the out-of-broadcast program is continued since activation/end thereof or the like is not controlled by the broadcast signal.

Next, the broadcast receiver 100 acquires a PMT data row separated in the first separation unit 132 by the main control unit 101 (S1402) and confirms the activation priority described in the PMT (S1403). For example, it is confirmed that the activation priority of the broadcast managed application is high in the process of S1403. Then, the broadcast receiver 100 acquires an AIT data row separated in the first separation unit 132 by the application control unit 161 (S1404) and confirms the application control code 903 of the acquired AIT data row (S1405). In a case in which the application control code 903 is "automatic activation" in the process of S1405, the broadcast receiver 100 further confirms the application profile 904 of the AIT data row (S1406). In S1406, the broadcast receiver 100 confirms the executability of the broadcast managed application specified by the AIT.

When the application is confirmed to be executable, the broadcast receiver 100 displays an activation selection screen (FIG. or the like to be described later) on the video image display unit 173 by the application control unit 161

(S1407). The activation selection screen is a screen including operations for controlling activation/end or the like of the out-of-broadcast application currently executed and the broadcast managed application required for automatic activation, that is, information for allowing the user to select the target application to be activated or ended. In the seventh embodiment, as selections of the above-mentioned control operations, selections can be made on the activation selection screen as to whether the execution of the out-of-broadcast is continued or ended or as to whether or not the broadcast managed application is activated. In other words, selection can be made as to whether or not the parallel executions of the out-of-broadcast application and the broadcast managed application are permitted.

On the activation selection screen displayed in S1407, the user selects a control operation relating to activation and end of the plural kinds of applications by using the portable information terminal 700, a remote controller of the broadcast receiver 100, or the like that are his or her operation means (S1408). The broadcast receiver 100 receives the selection result of the user as an instruction input. In accordance with the selection result of the user in S1408, when no activation of the broadcast managed application is selected (S1409-No), the broadcast receiver 100 ends the present processes in FIG. 28. That is, the application control unit 161 does not acquire or activate the broadcast managed application specified by the AIT. The execution of the out-of-broadcast application is continued.

Meanwhile, in a case in which the activation of the broadcast managed application is selected (S1409-Yes), the process proceeds to S1410. In S1410, the broadcast receiver 100 ends the operation of the out-of-broadcast application currently executed, by the application control unit 161.

Next, the broadcast receiver 100 transmits a delivery request for a broadcast managed application to the predetermined service provider server 400 via the LAN communication unit 121 based on information described in the application acquisition source information 905 of the AIT (S1412). The service provider server 400 that has received the delivery request in S1412 carries out an authentication process on the broadcast receiver 100 based on the control of the application managing/distributing execution unit 4103, if necessary, and then delivers the predetermined broadcast managed application stored in the application storage region 4013 via the LAN communication unit 421 (S1412). Next, based on the control of the application control unit 161, the application engine 162 of the broadcast receiver 100 activates the broadcast managed application received via the LAN communication unit 121 (S1413). In the above-mentioned embodiment, in a case in which the activation of the broadcast managed application is selected in S1409, control for ending the out-of-broadcast managed application is carried out in S1410. Not limited to this, the following control can be carried out. In S1409 or in the subsequent step, the broadcast receiver 100 confirms whether or not the end of the out-of-broadcast application is selected. In accordance with the result of the user's selection in this step, the broadcast receiver 100 executes S1410 in a case in which the end of the out-of-broadcast application is selected, and in a case in which it is not selected, the broadcast receiver 100 proceeds to S1411.

Note that, as a modified example, the processes of the activation confirmation, end of the out-of-broadcast application, and the like of the above-mentioned S1407 to S1410 may be carried out after the acquisition of the broadcast managed application in –S1411 to S1412.

[Control Example]

Figure 29:
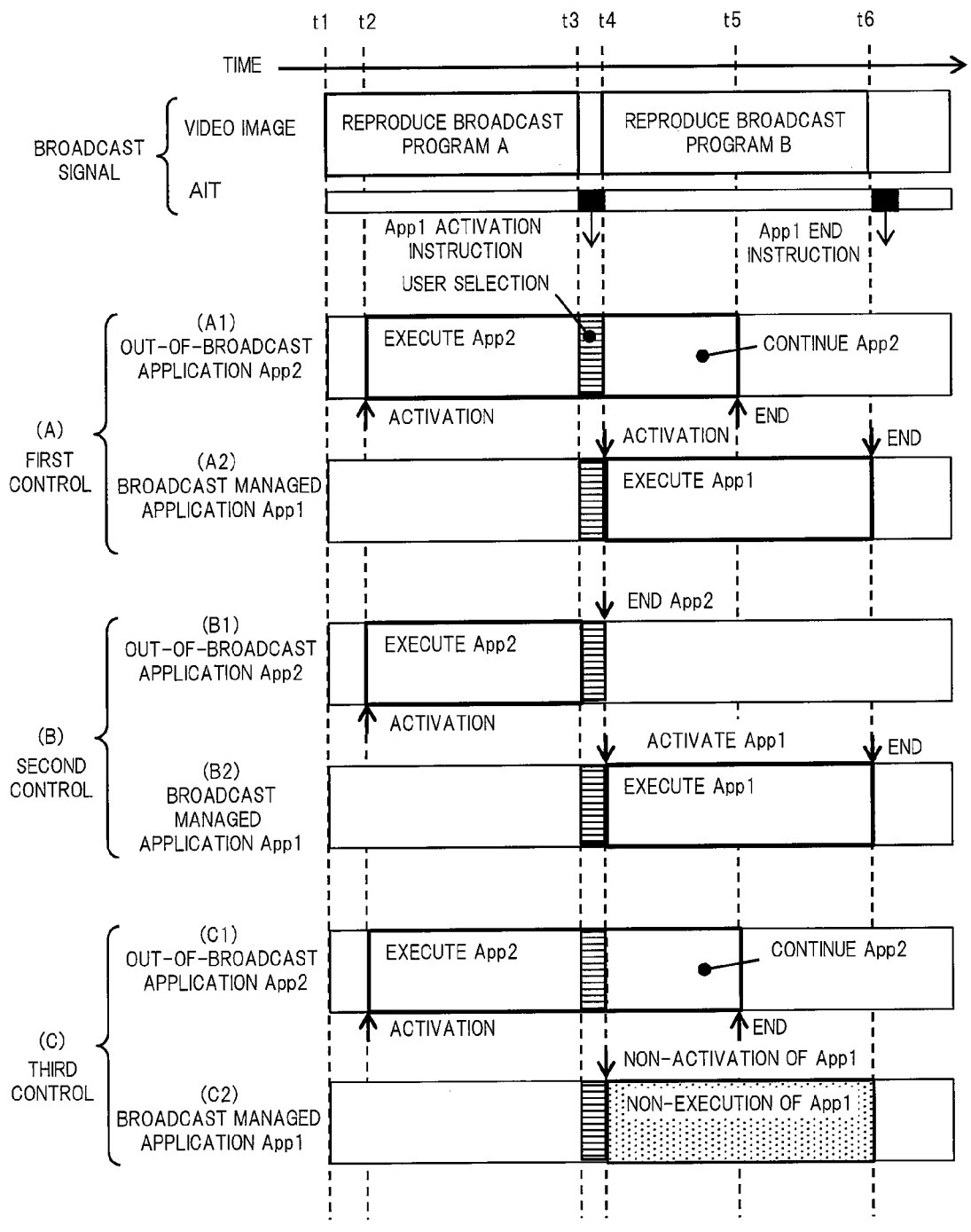
FIG. 29 is a view showing a control example of reproduction of a broadcast program and execution of an application in accordance with the seventh embodiment.

FIG. 29 is a control example of reproduction and execution of a broadcast program and a plurality of kinds of applications which correspond to processes in FIG. 28 in accordance with the seventh embodiment. The axis of abscissas indicates time. In the longitudinal direction, reproduction of video images of the broadcast program by a broadcast signal of a broadcast wave and control instructions given by the AIT, as well as (A) first control, (B) second control, and (C) third control, are shown in association with one another. (A) The first control represents (A1) the execution of App2 that is the out-of-broadcast application, and (A2) the execution of App1 that is the broadcast managed application. In the same manner, (B) The second control represents (B1) the execution of App2 and (B2) the execution of App1. (C) The third control represents (C1) the execution of App2 and (C2) the execution of App1. Note that, as described earlier, App1 corresponding to the broadcast managed application has a higher activation priority than that of App2 corresponding to the out-of-broadcast application.

First, as one example of reproduction of a broadcast program, during a period from time t1 to time t3, a broadcast program A is reproduced. At a point of time from time t3 to time t4, a switching is made to a broadcast program B, and during a period from time t4 to time t6, the broadcast program B is reproduced. In response to the switching to the broadcast program B, an instruction for activating App1 corresponding to the broadcast managed application in cooperation with the broadcast program B is given by the AIT. In the case of (A) the first control, for example, at time t2, App2 corresponding to the out-of-broadcast application is activated by a user operation or the like as shown in (A1), and it is executed at time t2. During the execution of App2, suppose that an activation instruction for App1 is given at time t3. At this time, from time t3 to time t4, the continuation of App2 and the activation of App1 are selected as the user selection by the user selection means 2601.

In accordance with the user selection, the plural applications execution means 2600 of the broadcast receiver 100 activates App1 at time t4 as shown in (A2), with App2 being continuously executed, and in accordance with this, it controls the state of the screen display. Thereafter, for example, during a period from time t4 to time t5, App1 and App2 are executed in parallel with each other, and at t5, App2 is ended by the user operation or the like. The execution of App1 is continuously carried out during a period from time t5 to time t6, and at time t6, App1 is ended in accordance with the end instruction of App1 by the AIT.

In the case of (B) the second control, App2 is executed during a period from time 2 to time t3 as shown in (B1), and in accordance with the activation instruction for App1 at time t3, the end of App2 and the activation of App1 are selected as the user selection. In accordance with the user selection, the broadcast receiver 100 ends the execution of App2 and activates App1 at time t4 as shown in (B2). Thereafter, during a period from time t4 to time t6, App1 is executed.

In the case of (C) the third control, App2 is executed during a period from time 2 to time t3 as shown in (C1), and in accordance with the activation instruction for App1 at time t3, the continuation of App2 and the non-activation of App1 are selected as the user selection. In accordance with the user selection, the broadcast receiver 100 continues the execution of App2 and does not activate App1 at time t4 so as not to be executed as shown in (C2). Thereafter, during a period from time t4 to time t5, App2 is executed.

[Activation Selection Screen]

Figure 30:
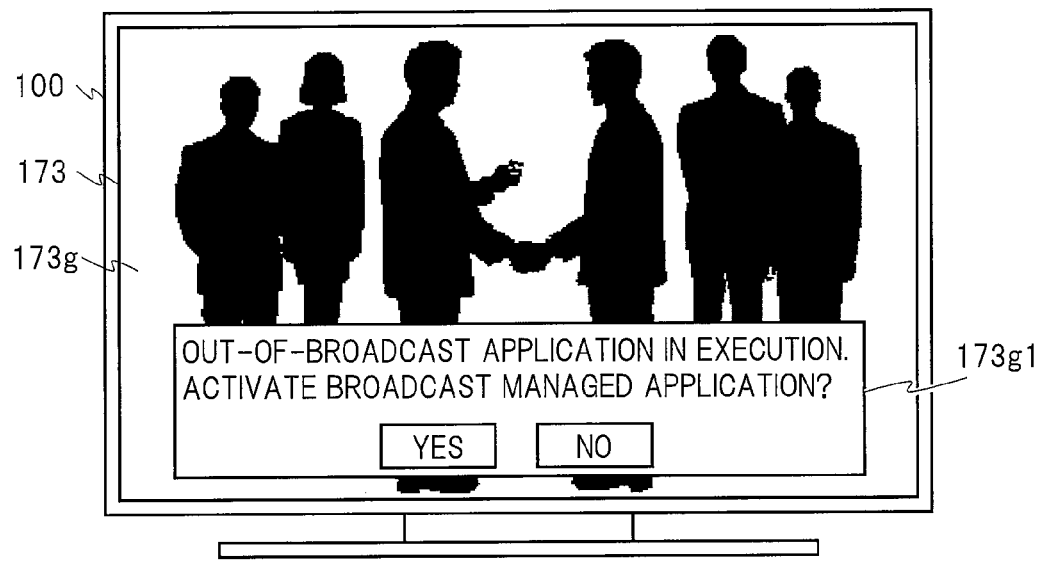
FIG. 30 is a screen display view showing an example of an activation selection screen in the broadcast receiver in accordance with the seventh embodiment.

FIG. 30 shows one example of an activation selection screen displayed in the process of S1407 in FIG. 28 in the seventh embodiment. In this screen, a message box 173g1 is displayed. The message box 173g1 includes a display of a message indicating that an out-of-broadcast application is currently being executed, a display of a message indicating that an activation of a broadcast managed application is instructed and the corresponding activation is in an operable state, and a display of a message indicating that the user is allowed to confirm and select whether or not the corresponding activation is carried out. The message box 173g1 of the present example includes "Yes" button and "No" button for allowing the user to select yes/no of the activation.

The user selects "Yes" or "No" by using, for example, the cursor key 741ac and the enter key 741ad of the basic screen 741a of the cooperation control application, with the message box 173g1 being displayed. That is, the user selects "Yes" when he/she wants to activate the broadcast managed application at that time, while the user selects "No" when he/she wants to continue the execution of the out-of-broadcast application. By using the present screen, the user can easily select whether or not a broadcast managed application is newly activated in the broadcast receiver 100 during the execution of an optional desired out-of-broadcast application, depending on his or her convenience and wish at that time. The above-mentioned control can be carried out in the same manner as the case of a general application.

Note that, in place of the above-mentioned message box 173g1, by displaying the aforementioned icon 173b0 of FIG. 12A, another mark, or the like, a predetermined user operation is promoted, so that the activation of the broadcast managed application and the end of the out-of-broadcast application may be controlled by the corresponding operation. For example, on a corner within the screen, a mark, a message, or the like indicating the presence of an activation request for a broadcast managed application may be displayed by OSD. In a case in which the predetermined user operation is not carried out after the display of the icon or the like, the corresponding display is erased.

Figure 31:
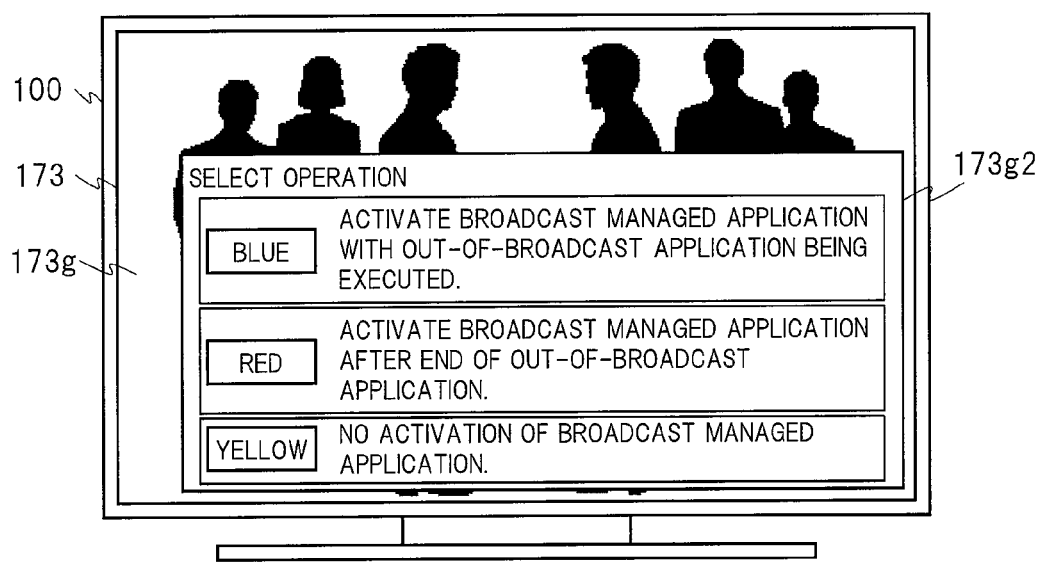
FIG. 31 is a screen display view showing an example of the activation selection screen in the broadcast receiver in accordance with the seventh embodiment.

FIG. 31 shows one example of another activation selection screen. In an activation selection screen of FIG. 31, a message box 173g2 is displayed. The message box 173g2 includes a display of a message or the like for allowing the user to select a control operation relating to the activation, end, or the like of each of plural kinds of applications including the above-mentioned out-of-broadcast application and broadcast managed application. As information giving options of specific controls, the message box 173g2 includes the following items or the like: (1) to activate a broadcast managed application, with the out-of-broadcast application being executed, (2) to activate a broadcast managed application after ending the out-of-broadcast application, and (3) not to activate a broadcast managed application.

With the message box 173g2 being displayed, the user selects among the above-mentioned options by using, for example, the color keys 741ae of the basic screen 741a of the cooperation control application. For example, the blue key corresponds to control (1), the red key corresponds to control (2), and the yellow key corresponds to control (3). Based on the above-mentioned screen also, the user can easily select the end, activation, or the like of each of the applications depending on the situations at that time.

Not limited to the mode to be displayed at the time of generation of a request, the activation selection screen can be displayed at the time of user setting. In this case, the broadcast receiver 100 displays a menu of the user setting on the screen of the video image display unit 173, for example, in the same manner as in FIG. 25, and the options of controls (1) to (3) or the like are displayed on the menu to allow the user to select the setting. The broadcast receiver 100 executes control in accordance with the user setting information at the time of generation of a request.

[Execution Screen of Plural Applications]

In the case of a control operation in which by ending the out-of-broadcast application, a broadcast managed application is activated and executed, the broadcast receiver 100 controls the display of the screen of the video image display unit 173 in the same manner as in the above-mentioned example. That is, the broadcast receiver 100 ends the execution screen of the out-of-broadcast application that is displayed in another region from the broadcast program screen or in one portion of an overlapped region within the broadcast program screen and newly displays an execution screen of the broadcast managed application on the screen of the video image display unit 173, for example.

Moreover, in the case of a control operation in which a broadcast managed application is activated, with the out-of-broadcast application being continuously executed, that is, both of the applications are executed in parallel with each other, the display of the screen of the video image display unit 173 may be controlled in the following manner. The broadcast receiver 100 appropriately adjusts the sizes and display positions of both or one of the execution screens of the applications, so that, for example, the execution screen of the out-of-broadcast application and the execution screen of the broadcast managed application are not overlapped with each other as a whole. Alternatively, the adjustments may be carried out, so that both of the execution screens are overlapped with each other in a partial region.

For example, the broadcast receiver 100 may carry out a process to reduce the size of the execution screen of the out-of-broadcast application currently executed, in such a way that the size does not become an obstacle in displaying the execution screen of a broadcast managed application to be newly activated. In contrast, the size of the execution screen of the broadcast managed application to be newly activated may be reduced, in such a way that the size does not become an obstacle in displaying the execution screen of the out-of-broadcast application currently being executed. Moreover, another arrangement may be used in which the out-of-broadcast application is temporarily formed into an icon, with only the execution screen of the broadcast managed application being displayed, so that the display of the execution screen of the out-of-broadcast application may be recovered by a selection operation of the icon of the out-of-broadcast application by the user. Alternatively, the other arrangement may be used in which both of the applications are formed into icons, so that the execution screen is displayed in accordance with a selection of the icons by the user.

The broadcast receiver 100 may display, for example, a reproduction screen of a broadcast program within the screen of the video image display unit 173 and then display the execution screen of the out-of-broadcast application to be overlapped in a partial region of the reproduction screen of the broadcast program, with the execution screen or the like of the broadcast managed application being further displayed on a partial region of the execution screen of the out-of-broadcast application in an overlapped manner. Moreover, the broadcast receiver 100 may divide the entire or a partial region of the screen of the video image display unit 173 to display the broadcast program and the execution screens of both applications in parallel with one another.

Figure 32:
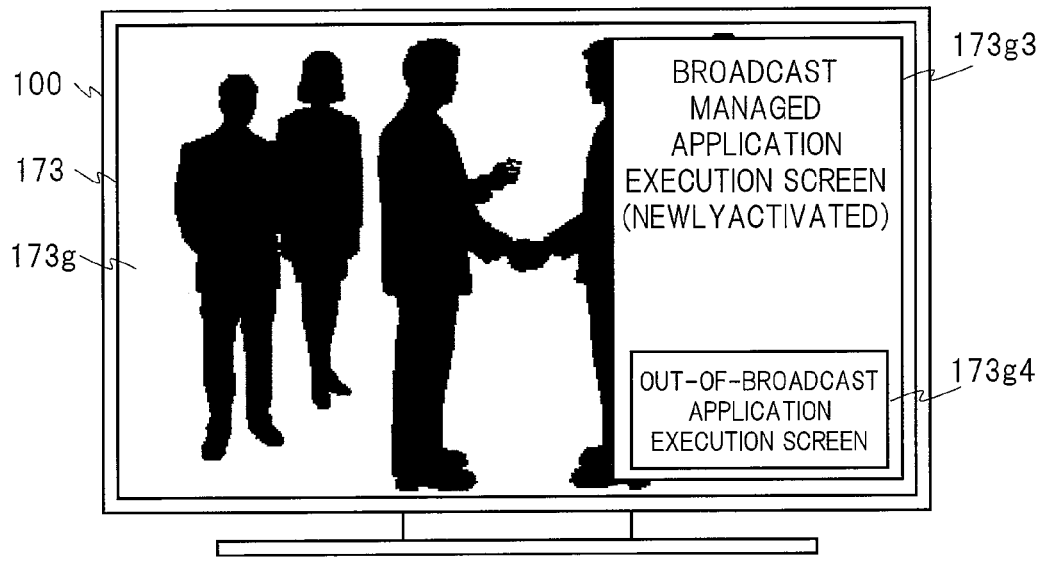
FIG. 32 is a screen display view showing an example of an execution screen of a plurality of applications in the broadcast receiver in accordance with the seventh embodiment.

FIG. 32 shows an example of a screen of the video image display unit 173 corresponding to the control example of the above-mentioned parallel executions of plural applications. In the screen of FIG. 32, in a partial region 173g3 on the screen 173g of the display of the broadcast program, an execution screen of a newly activated broadcast managed application is displayed in an overlapped manner. Together with this, in a partial region 173g4 within the region 173g3, the execution screen of the out-of-broadcast application currently executed is displayed in a reduced manner, or as an icon or the like. When the region 173g4 is selected by the user, the execution screen of the out-of-broadcast application is displayed in the region 173g3 in an enlarged manner, while in contrast, the execution screen of the broadcast managed application is displayed in the region 173g4 in a reduced manner, or as an icon or the like. In the region 173g4, a mark, a message, or the like indicating that the activation instruction of the broadcast managed application is given may be displayed.

By using the screens shown in the above-mentioned examples, the user can easily understand and recognize the execution statuses of the broadcast program and the plural kinds of applications.

Figure 33:
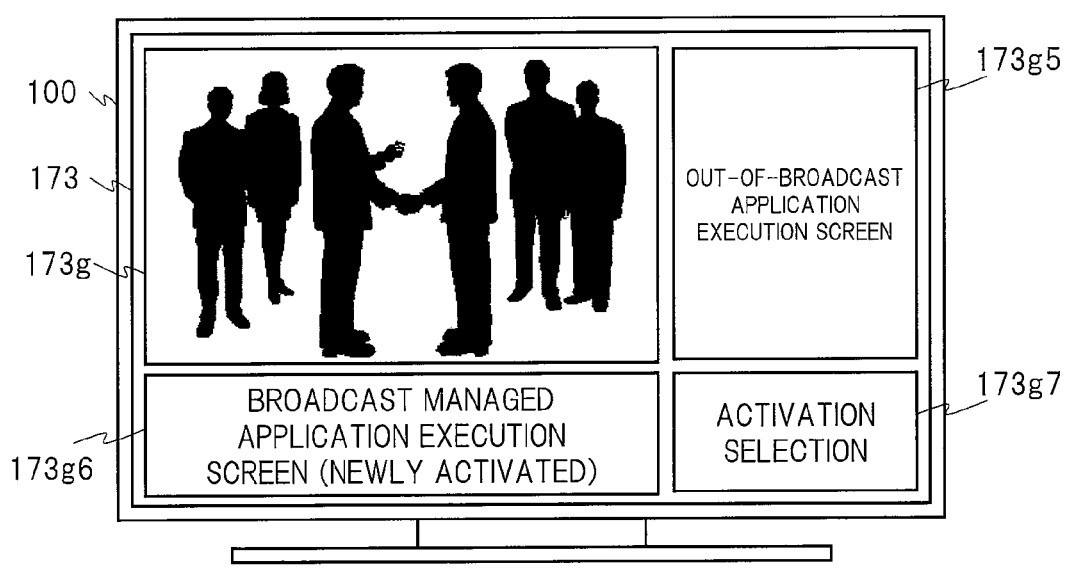
FIG. 33 is a screen display view showing another example of an execution screen of a plurality of applications in the broadcast receiver in accordance with the seventh embodiment.

FIG. 33 shows another example of a screen of the video image display unit 173 corresponding to the control example of the above-mentioned parallel executions of plural applications. In the screen of FIG. 33, the screen 173g of the broadcast program, an execution screen 173g5 of the out-of-broadcast application, an execution screen 173g6 of a broadcast managed application to be newly activated, and a region 173g7 that displays information for activation selection or the like are displayed in parallel with one another in a plurality of divided regions. In the region 173g7, a mark, a message, or the like indicating that the activation instruction of the broadcast managed application may be displayed, or information of a list of applications such as the broadcast cooperation application launcher in FIG. 12B may be displayed. Moreover, in a case in which there are two or more out-of-broadcast applications and general applications, or there are two or more broadcast managed applications in the present screen, execution screens of the respective applications may be displayed in parallel with one another.

Effects and the Like

As described above, in accordance with the broadcast receiver 100 of the seventh embodiment, even in a case in which a request for activation of a broadcast managed application is generated by the AIT or the like, in execution of the out-of-broadcast application or the general application in the broadcast receiver 100, it is possible to appropriately control the activation and end of each of various kinds of plural applications in accordance with the selection by the user. That is, in accordance with the broadcast receiver 100 of the present embodiment, it is possible to execute functions having higher added values. The user can select and utilize an out-of-broadcast application and a broadcast managed application in accordance with the situations and convenience at the time of generation of the request.

Note that, which of the respective controls and modified examples as well as control systems or the like of the display screen of the seventh embodiment may be adopted can be set by prescribing as the specification of the broadcast receiver 100 or the like, or by user's selection in the broadcast receiver 100 or the like. As modified examples of the seventh embodiment, the following configurations may be possible. As a first modified example, a configuration may be set in such a way that the end of the out-of-broadcast application and the activation of the broadcast managed application of S1410 to S1413 may be carried out automatically, without confirming the user selections in S1407 to S1408 after the processes up to S1406 in FIG. 28. In the same manner, after the processes up to S1406, control may be automatically carried out to activate the broadcast managed application while the out-of-broadcast application is continuously executed, without confirming the user selection. In the same manner, during the execution of the out-of-broadcast application or the general application, control may be automatically carried out so as not to activate the broadcast managed application, without confirming the user selection. In the case of this modified example, the user requires less time and effort in operations.

As a second modified example, not limited to the confirmation of an instruction input by the user selection of the activation confirmation screen, control for executing the plural kinds of applications may be achieved by using the user settings in the broadcast receiver 100 and the portable information terminal 700 in the same manner as in the sixth embodiment. For example, by using user setting information on the aforementioned function setting menu or the like, whether or not a broadcast managed application is activated during the execution of the out-of-broadcast application or the general application or the like can be selected and set by the user in accordance with his or her taste. The broadcast receiver 100 stores the corresponding setting values in the storage unit 110. When the request for the activation of the broadcast managed application is given during the execution of the out-of-broadcast application or the like, the broadcast receiver 100 refers to and confirms the contents of the user setting information of the broadcast receiver 100 in the case of the above-mentioned processes of S1407 to S1409, for example. In accordance with the contents, the broadcast receiver 100 judges and decides the control for the activation or the like. In the case of the modified example, the user alters the user's settings appropriately in accordance with his or her convenience or the like and utilizes the plural kinds of broadcast cooperation applications.

Also in the case of using the user setting of the portable information terminal 700, the same arrangement can be achieved. In the same manner as in the sixth embodiment, depending on the presence or absence of the portable information terminal 700 that performs cooperative operation or the user setting of each of the portable information terminals 700 that perform the cooperative operation, the activation, end, or the like of each of the plural kinds of applications can be flexibly controlled.

As another modified example, as a control example relating to (B) the second control in FIG. 29, the broadcast receiver 100 may display information indicating that the out-of-broadcast application is ended in the middle and then a broadcast managed application is activated is displayed, and after ending the broadcast managed application, the out-of-broadcast application that has been ended in the middle may be reactivated and executed automatically or by a predetermined user operation. In the case of this modified example, the user can easily return to the utilization of the out-of-broadcast application.

As still another modified example, as a control example relating to (C) the third control in FIG. 29, the broadcast receiver 100 suspends a broadcast managed application without activation in accordance with the user selection when a request for activating the broadcast managed application is given, and the out-of-broadcast application currently executed is continuously executed. Thereafter, the broadcast receiver 100 activates the suspended broadcast managed application after ending the out-of-broadcast application, for example. In this case, as an example of control of the screen display, a message, a mark, or the like indicating that a request for an activation of a broadcast managed application is given and that the activation is suspended are displayed at a corner or the like of the execution screen of the out-of-broadcast application. Thus, the end of the out-of-broadcast application and the activation of the broadcast managed application are recommended to the user. In this modified example, the user can move on to the utilization of the broadcast managed application at a convenient timing.

Eighth Embodiment

In the following, an eighth embodiment of the present invention will be described. Note that the configuration, effects, and the like of the present embodiment are the same as those of the first embodiment unless otherwise stated. Therefore, in the following, difference between the present embodiment and the first embodiment is mainly described, and with respect to common points, the description thereof will be omitted as much as possible in order to avoid overlapped descriptions.

The broadcast receiver 100 in the eighth embodiment is provided with a function of suitably controlling the reactivation in accordance with the selection of the user in reactivating the application once ended. Although the automatic reactivation of a broadcast cooperation application is technically possible, it is sometimes undesirable in terms of control or is sometimes inconvenient to the user. For this reason, the broadcast receiver 100 of the eighth embodiment is designed so that, in a state in which the reactivation of the broadcast cooperation application is made possible, the reactivation is controlled in accordance with the selection of whether or not the reactivation is permitted by the user. With this arrangement, for example, even in the case of end caused by an erroneous operation of the user, the reactivation is suitably carried out in accordance with the user's selection.

In the broadcast receiver 100 of the eighth embodiment, in a case in which an application whose priority and automatic activation is instructed by the AIT or the like is ended by the user's operation or the like and when the activation instruction by the AIT is continuously given, the following control is carried out. That is, (1) in accordance with the user's selection, that is, in accordance with an instruction input and the confirmation of the user setting, the broadcast receiver 100 controls the reactivation. (2) The broadcast receiver 100 displays information such as an icon for allowing the user to select whether or not the reactivation of the application is permitted, and the corresponding application is reactivated only when the user requests to do so by the selection of the information by the user.

Figure 34:
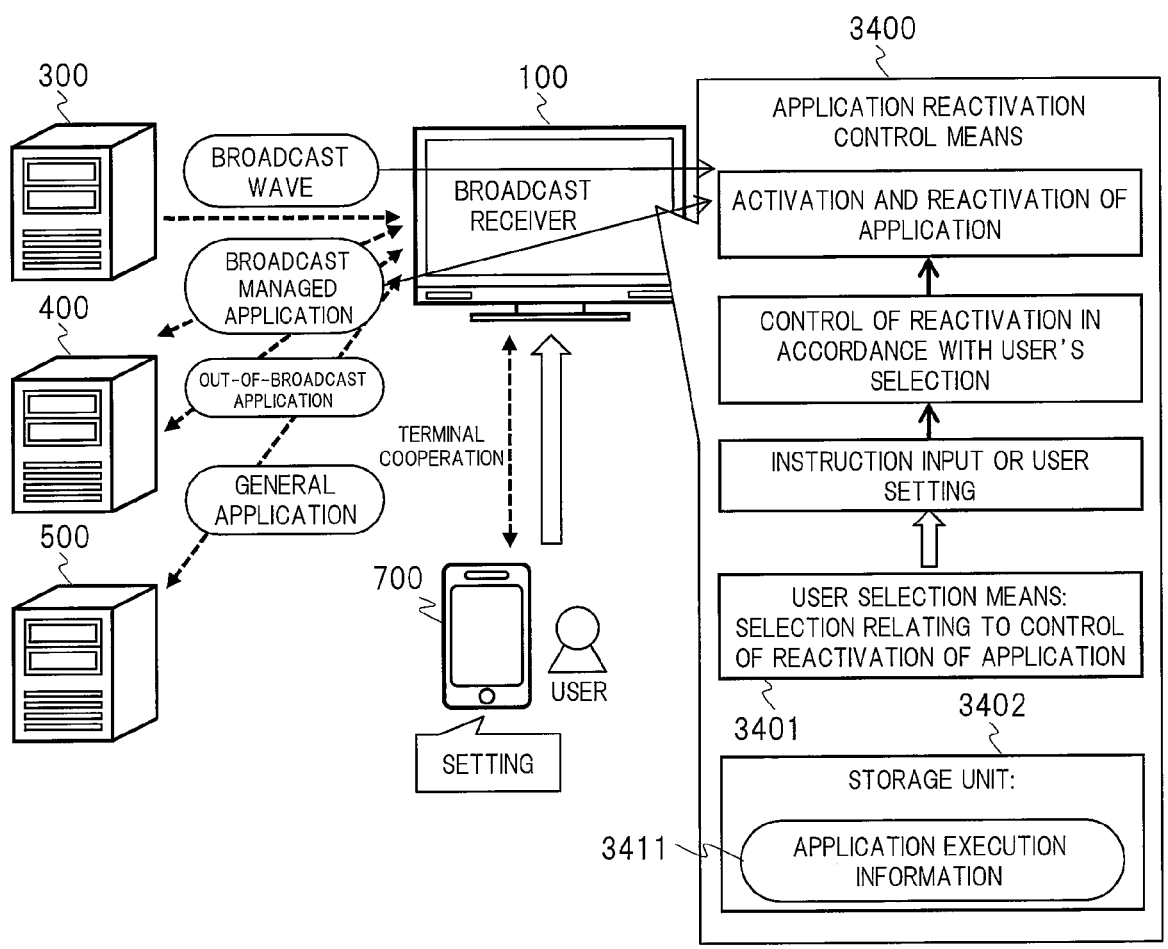
FIG. 34 is a view showing a system configuration including a broadcast receiver in accordance with an eighth embodiment and an example of utilization thereof.

FIG. 34 shows a system configuration including the broadcast receiver 100 of the eighth embodiment. The broadcast receiver 100 is provided with application reactivation control means 3400. The application reactivation control means 3400 includes user selection means 3401 and a storage unit 3402. The user selection means 3401 receives a selection operation relating to an operation of controlling the reactivation of an application based on the user's operation in the broadcast receiver 100 and the portable information terminal 700. In the same manner as in the sixth embodiment, the user selection means 3401 is achieved by instruction inputs and the user settings with respect to the screens of the broadcast receiver 100 and the portable information terminal 700.

The application reactivation control means 3400 stores information relating to the execution and statuses of an application in the storage unit 3402 as application execution information 3411. The application execution information 3411 includes cache data for holding information relating to the application that has been ended. In a case in which or when a situation relating to the reactivation of the broadcast managed application occurs, the application reactivation control means 3400 controls whether or not the corresponding application is reactivated or the like, in accordance with the user's selection by the user selection means 3401. In the case of reactivating the corresponding application, the application reactivation control means 3400 utilizes the application execution information 3411.

Figure 35:
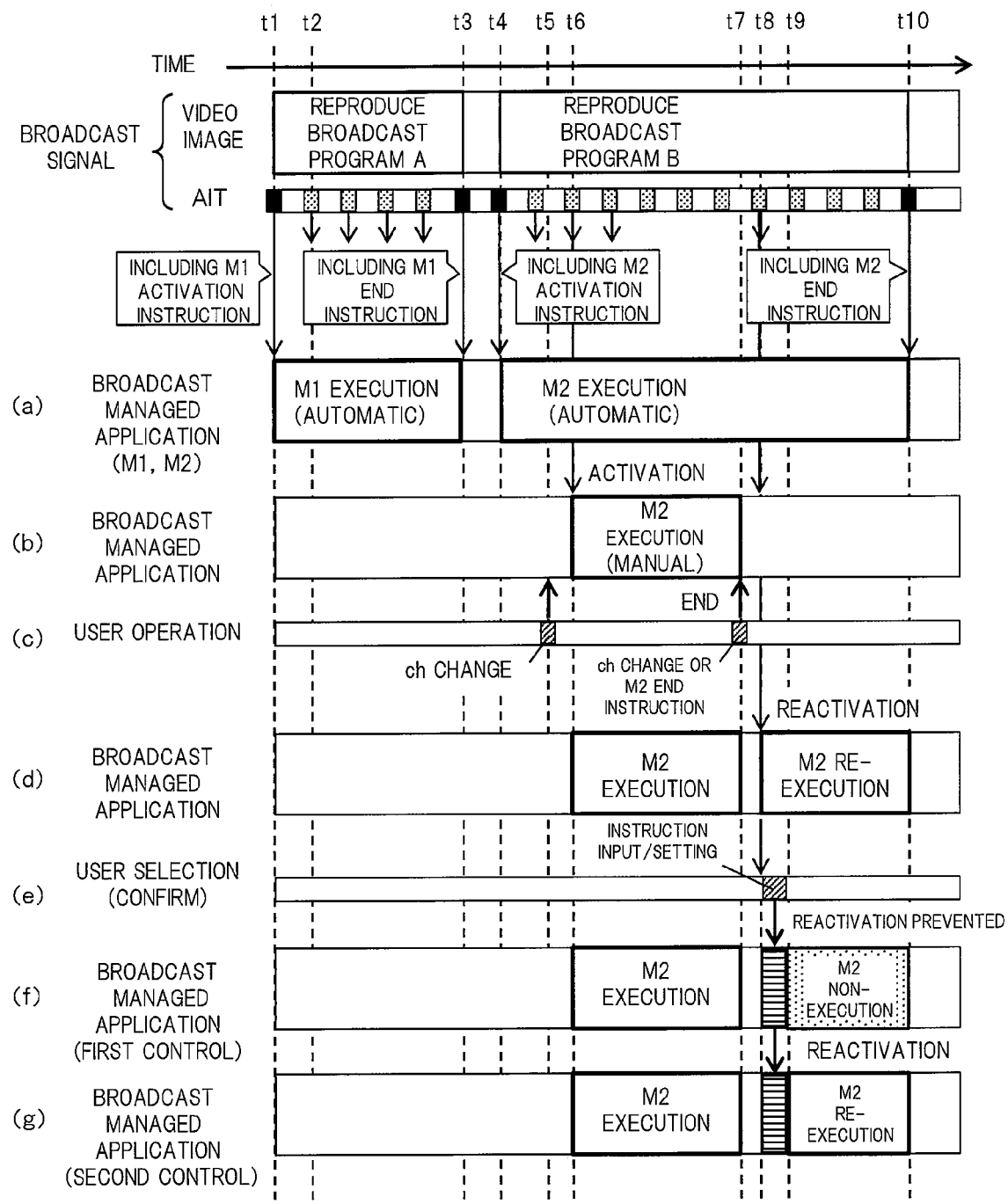
FIG. 35 is a view showing a control example of reproducing a broadcast program and executing an application in accordance with the eighth embodiment.

FIG. 35 shows examples of the reproduction of a broadcast program by a broadcast signal, the instruction by the AIT, the execution and control of a broadcast management application, as well as the user's operation and the user selection, and the like, in the eighth embodiment in association with one another by using time axes.

In the broadcast managed application which is one kind of broadcast cooperation applications to be used in the broadcast communication cooperation system of the present embodiment, operations thereof such as activation/end are controlled based on information such as an AIT application control code 903 contained in a broadcast signal. Of course, the control of the operation of the broadcast managed application may be carried out based on user's instruction operations or the like.

In a case in which the operation of activation of a broadcast managed application in cooperation with a broadcast program is controlled by the AIT or the like, the information of the application control code 903 or the like of the AIT for instructing the activation is included at least in the broadcast signal at the time of the start of the broadcast program. Moreover, the corresponding information needs to be continuously included in the broadcast signal not only at the time of the start of the broadcast program, but also during the broadcasting of the broadcast program. The reason is that the user does not always view a broadcast program from the start of the broadcast program, but starts to view the program from the middle of the broadcast program, in some cases. In a case in which the broadcast program is reproduced from the middle thereof, if the above-mentioned information is not included in the broadcast signal, the broadcast managed application cannot be activated.

Therefore, during the first to the last of the broadcast program currently on the air, the information such as the AIT is designed to be continuously transmitted. For example, the corresponding information may be transmitted regularly, for example, once in every several seconds. The broadcast receiver 100, for example, refers to and acquires the information such as the AIT included in the broadcast signal regularly, and confirms whether or not the information contents are updated. Thus, even in a case in which the user views the broadcast program from the middle, for example, the activation of the broadcast managed application can be controlled.

Meanwhile, information such as the application control code 903 for instructing the end of the execution of the broadcast managed application may be included in the broadcast signal at least at the timing at which the application is desirably ended, for example, at the time of end of the broadcast program. Moreover, in a case in which the broadcast managed application is ended, for example, at a desired timing in the middle of the broadcasting of a broadcast program, for example, at a point of time specified by the broadcast station, information including the instruction for end may be included in the broadcast signal at the corresponding timing. When the instruction for end is received, the broadcast receiver 100 ends the execution of the broadcast managed application.

Furthermore, in a case in which the broadcast managed application is ended at a desired timing in the middle of the broadcasting of a broadcast program, for example, at a point of time based on the user's operation, the following control operations are carried out. For example, based on a change in the frequency channel, that is, the selection operation of channel for the reproduction or the program to be reproduced, the operation for instructing the end of the application, or the like, by the use of the portable information terminal 700, the remote controller, or the like, by the user, the broadcast receiver 100 ends the execution of the broadcast managed application.

An example of the AIT shown in FIG. 35 shows a case in which the instruction information is continuously and regularly included during the broadcasting of a broadcast program, as described above. For example, suppose that there is a broadcast managed application M1 that is in cooperation with a broadcast program A. During a period from time t1 to time t3 in which the broadcast program A is being broadcast, the AIT is regularly delivered at timings including the first and the last points. The first AIT at t1 includes at least an instruction for automatic activation of the broadcast managed application M1. The last AIT at t3 includes at least an instruction for automatic end of the broadcast managed application M1. Thus, as shown in (a), the broadcast managed application M1 is automatically executed during the period of t1 to t3. During the period from t1 to t3, the AIT is delivered in the same manner as time t2. The same is true for a broadcast program. B and a broadcast managed application M2.

The broadcast managed application is ended by an instruction operation of the user at a timing in the middle of the broadcasting of a broadcast program, in some cases. In this case also, during the continuous broadcasting of the corresponding broadcast program, the instruction for an automatic activation for preferentially activating the corresponding application is continuously given by the PMT, the AIT, or the like included in the broadcast signal, in some cases.

In (b) of FIG. 35, an example in which the broadcast managed application M2 is activated in the middle of the broadcast program B and the broadcast managed application M2 is ended in the middle of the broadcast program B is shown. Suppose that, for example, in a user's operation (c), the broadcast program B is reproduced by a change in a frequency channel (ch) at time t5. Thereafter, for example, by an instruction for activation of the broadcast managed application M2 regularly given by the AIT at time t6, the broadcast managed application M2 is activated. Moreover, suppose that, in the user's operation of (c), an instruction for changing the frequency channel (ch) or for ending the broadcast managed application M2 is given, for example, at time t7. Thus, the broadcast managed application M2 is ended.

However, needless to say, in a case in which the broadcast managed application is ended by the instruction operation of the user, it is not desirable to have the same broadcast managed application automatically reactivated based on the description of the PMT, the AIT, or the like. In this case, for example, after an application has been once ended, the regular confirmation of the AIT is immediately carried out, and the corresponding application is automatically reactivated in accordance with the instruction for automatic reactivation of the AIT. From the user's point of view, in spite of giving the instruction operation of the end of the application, the application is reactivated immediately. Therefore, a configuration is proposed in which the automatic reactivation of the same broadcast managed application described above is made invalid.

Meanwhile, the possibility that the instruction operation for ending the broadcast managed application is erroneously made by the user, for example, should be taken into consideration. When the possibility is taken into consideration, it is also not desirable to make all of the automatic reactivation of the same broadcast managed application invalid. From the user's point of view, when the application is ended by an erroneous operation, it is inconvenient since it is not reactivated or recovered immediately.

The broadcast receiver 100 of the eighth embodiment has a function of carrying out control in which the above-mentioned reactivation of the application is taken into consideration. In the eighth embodiment, an example of control of the reactivation of the broadcast managed application in the broadcast receiver 100 will be described in a case in which the execution of a broadcast managed application is ended at a desired timing in the middle of the broadcast application by the user's instruction operation or the like and the automatic activation of the same application in priority is continuously instructed by the information such as the AIT included in the broadcast wave.

As shown in (d) of FIG. 35, there is a case in which although the broadcast managed application M2 has been ended in the middle of a broadcast program. B as shown in (b), since the instruction for activation at time t8 is continuous given by the AIT thereafter, the broadcast managed application M2 is consequently reactivated immediately.

In (e) to (g) of FIG. 35, a control example by the broadcast receiver 100 of the eighth embodiment is shown. In the eighth embodiment, with respect to the case of (d), (e) the user selection is confirmed. In response to this, (f) a first control operation prevents the broadcast managed application M2 from being reactivated and re-executed. Moreover, (g) a second control operation allows the broadcast managed application M2 to be reactivated and re-executed. Then, (e) a user's selection includes an instruction input on the screen, confirmation of user setting information, or the like.

[Operation Sequence upon Reactivation of Broadcast Managed Application]

Figure 36:
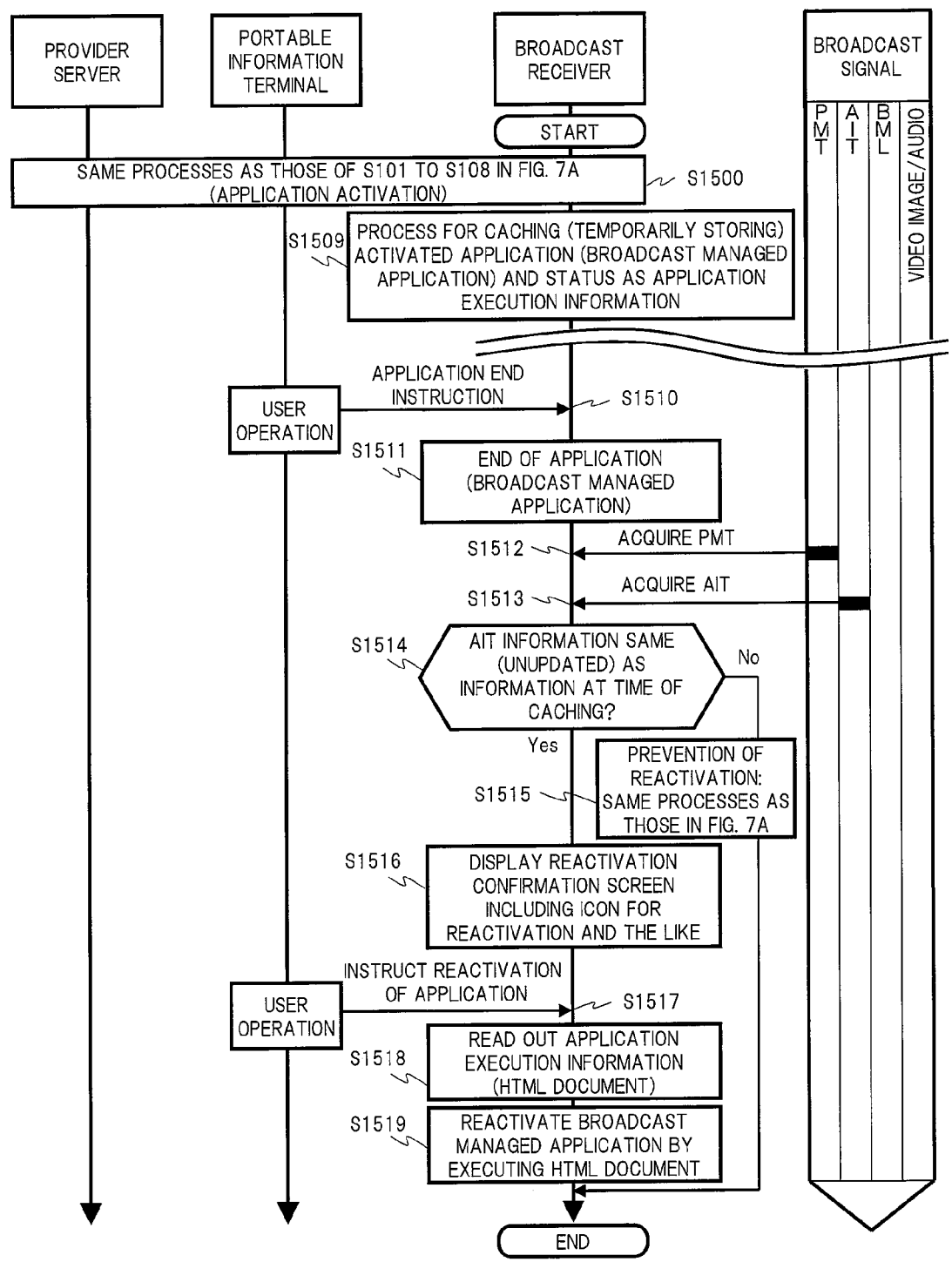
FIG. 36 is a diagram showing an operation sequence at the time of reactivation of a broadcast cooperation application in the broadcast receiver in accordance with the eighth embodiment.

FIG. 36 shows one example of an operation sequence of control processes including reactivation of a broadcast managed application in the broadcast receiver 100 of the eighth embodiment. FIG. 36 shows a series of flow of control operations carried out in a case in which the broadcast managed application is prescribed and instructed to be preferentially activated. The broadcast receiver 100 ends a broadcast managed application that has been automatically activated based on the AIT of a broadcast signal at the time of the start of viewing a broadcast program by the user depending on an instruction operation by the user. Moreover, the broadcast receiver 100 confirms the PMT and the AIT appropriately and controls whether or not the above-mentioned broadcast managed application once ended is reactivated in accordance with the user's selection.

In FIG. 36, the broadcast receiver 100 carries out a channel selection for a frequency channel desired by the user by the tuner/demodulation unit 131 and acquires a TS. Then, in S1500, the broadcast receiver 100 carries out, for example, the same processes as those of S101 to S108 in FIG. 7A described above. That is, the broadcast receiver 100 confirms the activation priority from the PMT, confirms the instruction for automatic activation or the like by the application control code of the AIT, further confirms the executable state from the application profile, and acquires a broadcast managed application corresponding to the predetermined broadcast cooperation application from the service provider server 400 appropriately. The broadcast receiver 100 activates the broadcast managed application by using the application engine 162 based on the control of the application control unit 161.

After the process of S1500, in S1509, the broadcast receiver 100 temporarily stores the information relating to the activated broadcast managed application and status thereof in the temporary storing region (storage unit 3402 of FIG. 34) of the RAM 104 as application execution information 3411 by the application control unit 161, that is, in other words, caches the information. The process of S1509 may be carried out in accordance with the aforementioned cache information 908 of the AIT.

The application execution information 3411 includes information such as the PMT and the AIT acquired at the time of the process of S1500, and information such as data of HTML documents constituting the broadcast managed application and attributes such as the broadcast program name and the service ID (frequency channel) relating to the corresponding application. Note that, for convenience of explanation, these pieces of information are referred to as the application execution information 3411; however, managements of information may be carried out individually.

In FIG. 36, suppose that the user instructs the end of the broadcast managed application at an optional desired timing in the middle of the broadcast program without waiting for the end of the broadcast program by using the portable information terminal 700, the remote controller, or the like (S1510). This corresponds to time t7 in (c) the user's operation in FIG. 35. Then, the broadcast receiver 100 ends the execution of the broadcast managed application by the application engine 162 (S1511).

After end of the broadcast managed application in S1511, the broadcast receiver 100 newly acquires a PMT data row by the main control unit 101 (S1512) and acquires an AIT data row by the application control unit 161 (S1513). The information acquisitions in S1512 and S1513 may be set as one of the processes that are continuously and regularly executed during the broadcasting of the broadcast program as shown in FIG. 35 as well or may be set as the processes of acquiring and referring the information promptly carried out by the broadcast receiver 100. Note that, in the PMT, information indicating the AIT is included, and in this case, both of the PMT and the AIT are referred to and acquired.

Next, the broadcast receiver 100 confirms in the process of S1514 as to whether or not the AIT information in S1513 indicates the activation of the same application as that temporarily stored in S1509, that is, for example, the automatic activation for preferentially activating the broadcast managed application. In other words, in S1514, the confirmation is made as to whether or not the execution of the same HTML document is instructed or as to whether or not the display contents by the broadcast managed application are updated. In a case in which in S1514, the information contents of the AIT in S1513 are the same as the information contents of the AIT of the application execution information 3411 at the time of the temporary storage process in S1509, that is, in a case in which the activation of the same application and the execution of the same document are instructed and when the display contents have not been updated yet (Yes), the process proceeds to S1516. In a case in which in S1514, the information contents of the AIT in S1513 are different from the information contents of the AIT of the application execution information 3411 at the time of the temporary storage process in S1509, that is, in a case in which the activation of a different application or the execution of a different document is instructed and the display contents are updated (No), the process proceeds to S1515.

Note that, for example, there is a possibility that the information contents of the AIT contained in a broadcast signal might be partially altered during a broadcasting process of a broadcast program. For example, this corresponds to a case in which in a plurality of HTML documents forming the same broadcast cooperation application, the description of links of the HTML documents are altered so that the HTML documents can transit to one another. Alternatively, this corresponds to another case in which the description of the links are altered to transit to an HTML document of a different application. In S1514, judgement is made in such a manner as to include the presence or absence of the alteration.

When the process proceeds to S1515, the broadcast receiver 100 prevents the broadcast managed application ended in S1511 from being reactivated. In this case, based on the information contents of the PMT and the AIT that have been acquired in S1512 and S1513 and altered, the broadcast receiver 100 may newly carry out processes of activating the predetermined broadcast managed application, updating the display contents, or the like, in the same manner as in the processes of S101 to S108 in FIG. 7A. Then, the present processes in FIG. 36 are ended.

Figure 37:
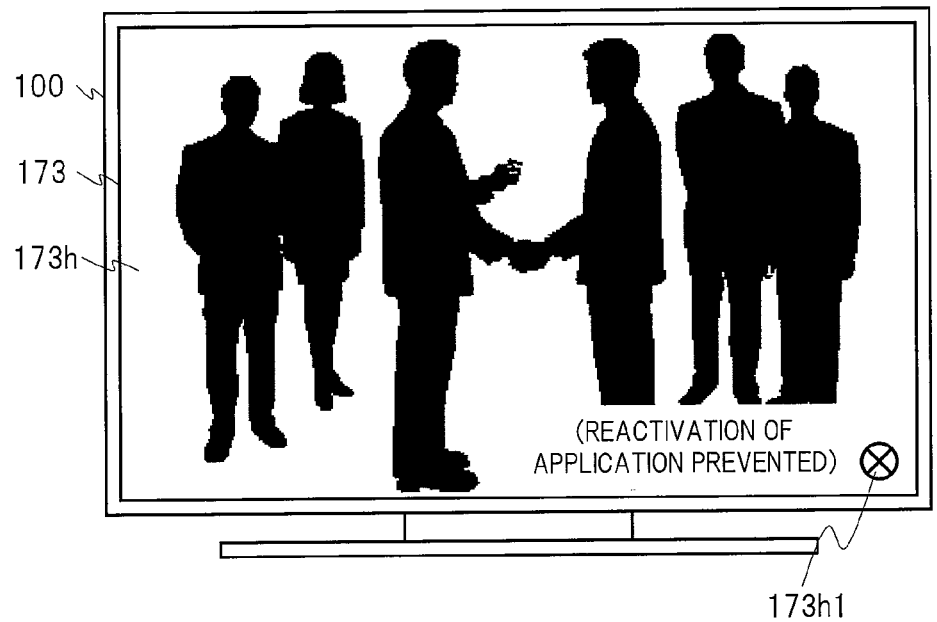
FIG. 37 is a screen display view showing an example of a reactivation preventing screen in the broadcast receiver in accordance with the eighth embodiment.

FIG. 37 shows a reactivation prevention screen that is one example of a screen displayed in S1515 described above. In S1515, the broadcast receiver 100 may display a screen and information shown in FIG. 37. In the screen of FIG. 37, on the screen 173h of the broadcast program, for example, at a corner within the screen, a predetermined mark 173h1, a message, or the like indicating that the reactivation of the broadcast managed application is prevented is displayed. Thus, the situation where the reactivation of the application is prevented can be recognized by the user.

Meanwhile, when the process proceeds to S1516, the broadcast receiver 100 carries out a control process for reactivating the broadcast managed application that has been ended in S1511. In S1516, the broadcast receiver 100 displays information for reactivating the broadcast managed application ended in S1511 by the selection operation of the user on the screen of the video image display unit 173.

Figure 38:
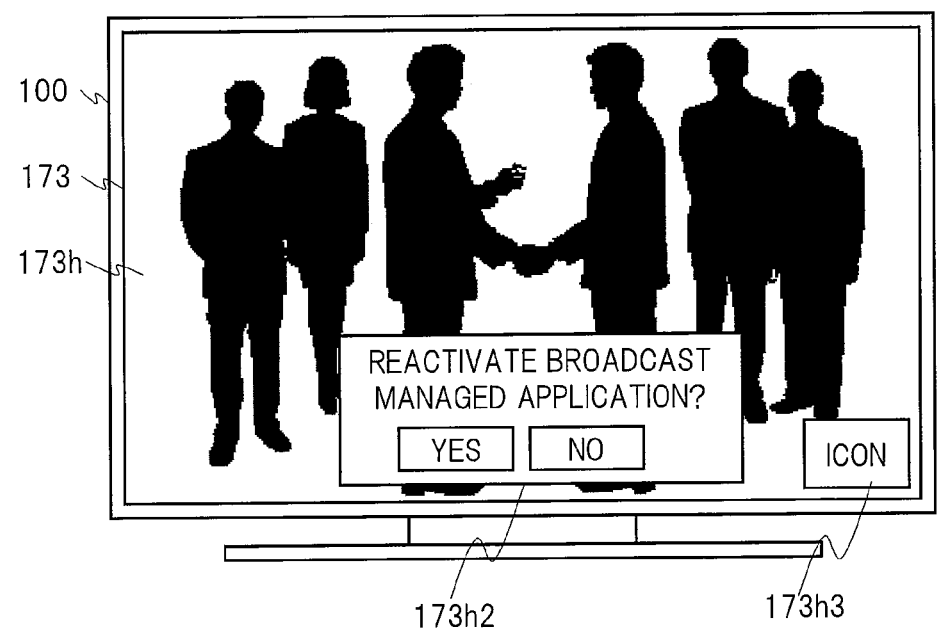
FIG. 38 is a screen display view showing an example of a reactivation confirmation screen in the broadcast receiver in accordance with the eighth embodiment.

FIG. 38 shows a reactivation confirmation screen that is one example of a screen to be displayed in S1516. In the present screen, a message box 173h2 for confirming the reactivation is displayed on the screen 173h of the broadcast program. Alternatively, in the present screen, an icon 173h3 for reactivation may be displayed at a corner or the like of the screen. The broadcast receiver 100 receives a selection operation by the user on the information of the present screen, that is, in other words, an instruction input operation for selecting whether or not the reactivation is carried out. The message box 173h2 includes the buttons of "Yes" and "No" for confirming whether or not the broadcast managed application is reactivated. In accordance with the selection operation of "Yes," the broadcast receiver 100 reactivates the corresponding application.

The icon 173h3 is an icon indicating a predetermined broadcast managed application. By the selection operation of the icon 173h3, the broadcast receiver 100 reactivates the corresponding application. The icon 173h3 may be designed in the same manner as in the icon 173b0 for allowing the user to recognize a broadcast cooperation application that can be activated as in FIG. 12A described above. Moreover, after a predetermined period of time has been elapsed from the display of the message box 173h2 and the icon 173h3, the broadcast receiver 100 automatically erases the display of the message box 173h2 and the icon 173h3 and in this case, sets so that the reactivation is not carried out. Since the display of the information for confirmation is continuously given for the predetermined time, the reactivation of the application can be carried out when the user selects the icon 173h3 remaining within the screen. By using the above-mentioned screen, the user can easily select whether or not the application is reactivated in accordance with the user's convenience or the like at that time.

On the screen in S1516 of FIG. 36, in S1517, a selection operation of the icon 173h3 for reactivation or the like which is carried out by using the portable information terminal 700, a remote controller, or the like that are operation means of the user, is received. In this case, suppose that, for example, the user selects the icon 173h3 for reactivation on the screen from the portable information terminal 700. The same process may be carried out by selecting the "Yes" button of the message box 173h2. In accordance with the selection by the user, the broadcast receiver 100 internally instructs the reactivation of the broadcast managed application ended in S1511.

When the broadcast managed application is reactivated, in S1518, the broadcast receiver 100 first reads out the HTML document data forming the corresponding application in the application execution information 3411 temporarily stored in S1509 by the application control unit 161. Moreover, in S1519, the broadcast receiver 100 executes the corresponding HTML document by using the application engine 162 based on the control of the application control unit 161. Thus, the broadcast managed application ended in S1511 is reactivated.

In a case in which the user does not want to reactivate the broadcast managed application that has been ended in S1511 by the instruction given in S1510, he or she gives an instruction input for preventing the reactivation by using the operation means in S1517 or may leave the process as it is without giving any instruction input. For example, the user may select the "No" button in the message box 173h2 or depress the aforementioned return key 741ab or the like. Thus, the broadcast receiver 100 also erases the display of the reactivation confirmation screen without internally generating the instruction for the reactivation.

As described above, in accordance with the broadcast receiver 100 of the eighth embodiment, even in a case in which a broadcast managed application is ended in the middle of the broadcast program by the user's operation or the like and the automatic activation of the same application in priority is continuously instructed by the information such as the AIT of the broadcast wave, the reactivation of the corresponding application is suitably controlled by the user's selection. The user can control whether or not the reactivation of the application is carried out by a simple operation. Even in the case of an erroneous operation, for example, since the user can reactivate the application immediately, it is possible to achieve high convenience. That is, in accordance with the broadcast receiver 100 of the present embodiment, it is possible to execute functions having higher added values.

As a modified example of the eighth embodiment, the processes of the application reactivation in S1516 to S1519 may be executed in accordance with the confirmation of the user setting information in the broadcast receiver 100 and the portable information terminal 700 in the same manner as in the sixth embodiment. For example, the broadcast receiver 100 provides a user setting screen relating to whether or not the reactivation of the application is permitted, and setting values based on the user's operations are preliminarily stored in the storage unit 110 (storage unit 710 in the case of the portable information terminal 700). In place of the reactivation confirmation screen in S1516, the broadcast receiver 100 carries out the confirmation by referring to the setting values in the broadcast receiver 100 or the portable information terminal 700. In a case in which the reactivation is permissible by the setting value, the broadcast receiver 100 reactivates the corresponding application.

As another modified example of the eighth embodiment, in place of the process for ending the broadcast managed application in S1511, the broadcast receiver 100 may carry out a process for adjusting and controlling the transmittance of the display of the broadcast managed application on the screen. The transmittance of the broadcast managed application at the time of execution is set to 0%, and the transmittance of the broadcast managed application at the time of end is set to 100%. Upon ending the application in S1511, the broadcast receiver 100 maintains the computer process without being ended, and by altering the transmittance of the display of the execution screen of the application on the screen to 100%, the application is made invisible to the user. Moreover, upon reactivating the application in S1516 to S1517, the broadcast receiver 100 recovers the transmittance of the display of the corresponding application on the screen to 0%, which is the original state, so that the application is made visible to the user. In this modified example, upon carrying out the processes of S1518 and S1519, it is not necessary to read out the HTML document in the application execution information 3411 in the temporary storage region and to execute the document, and accordingly, the load of the processes is lowered. The above-mentioned transmittances may be set to other values than 0% and 100%.

Ninth Embodiment

In the following, a ninth embodiment of the present invention will be described. Note that the configuration, effects, and the like of the present embodiment are the same as those of the eighth embodiment unless otherwise stated. Therefore, in the following, difference between the present embodiment and the eighth embodiment is mainly described, and with respect to common points, the description thereof will be omitted as much as possible in order to avoid overlapped descriptions.

A broadcast managed application to be used in a broadcast communication cooperation system of the ninth embodiment is designed such that its operations of activation/end and the like are controlled not only based on information such as the AIT included in a broadcast signal, but also based on an event operation such as a page update by an event message included in the broadcast signal appropriately. In the present embodiment, the page update refers to a process in which one portion or the entire portion of information such as characters and images constituting the screen is altered or a process in which the HTML document corresponding to the screen is made to transit to an HTML document corresponding to another application screen linked thereto, or the like. The corresponding page update is also exemplified in FIG. 27 described above as the transition between applications as well as between HTML documents. The HTML documents correspond to the pages. The update corresponds to an alteration of the HTML document constituting the application.

In a case in which the instruction for preferentially automatically activating the broadcast managed application is continuously given by the AIT or the like included in the broadcast wave, an event message for event operation control of the application is also continuously included in the broadcast wave, if necessary. Even when the user ends a broadcast managed application based on his or her own determination, the page update or the like is carried out based on the event message or the like of the broadcast wave, in some cases. In this case, before and after the end, the contents of the application execution and display are altered by the page update.

In this case, the possibility that the user may want to reactivate the broadcast managed application that has been once ended should be taken into consideration. In other words, there is a possibility that the user wants to view information of a page newly supplied by the page update. The broadcast receiver 100 of the ninth embodiment has a function of suitably controlling the reactivation of the application by taking into consideration the case and status of the above-mentioned page update or the like.

[Operation Sequence upon Reactivation of Broadcast Managed Application]

Figure 39:
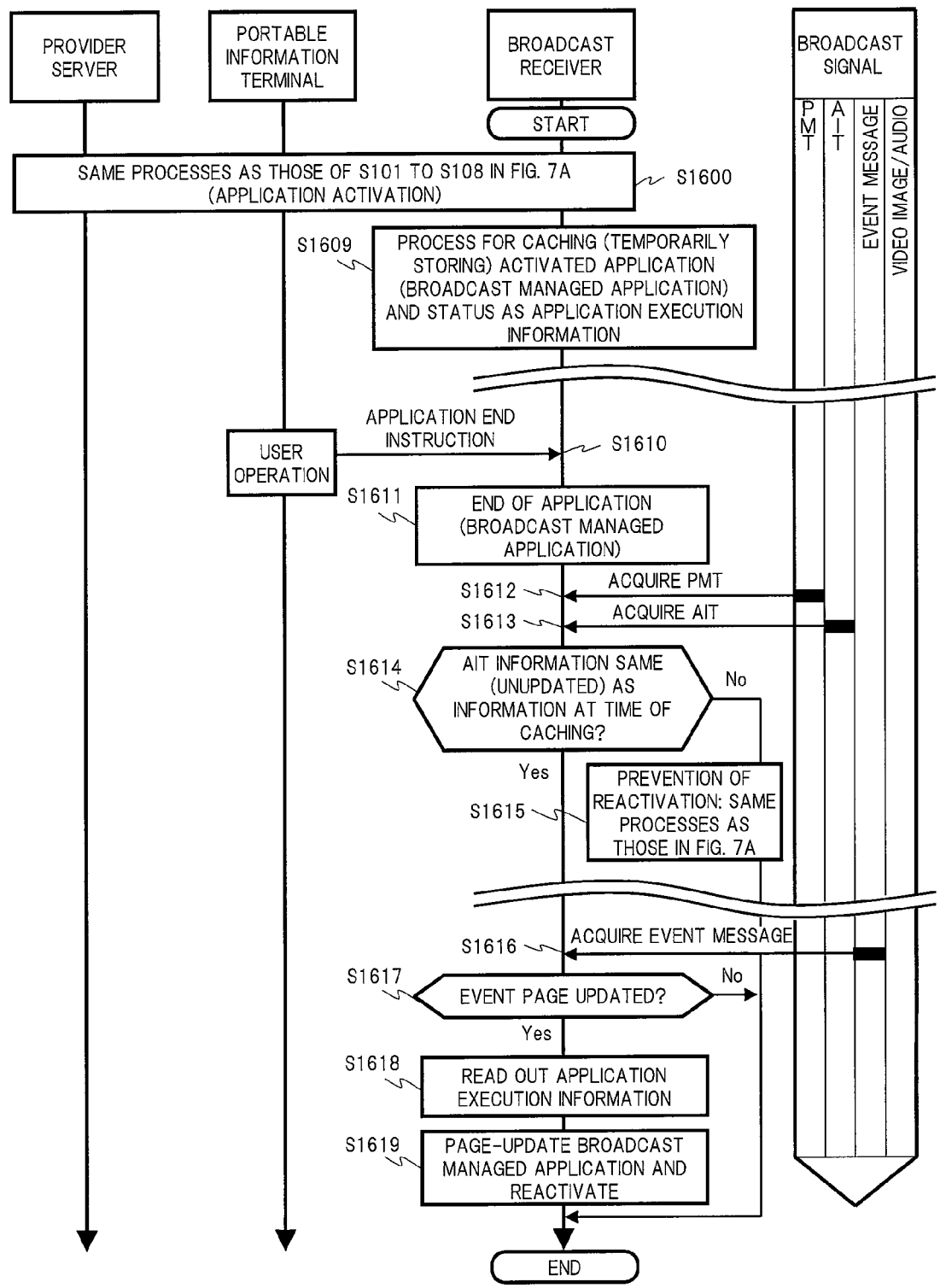
FIG. 39 is a diagram showing an operation sequence at the time of reactivation of a broadcast cooperation application in a broadcast receiver in accordance with a ninth embodiment.

FIG. 39 shows one example of an operation sequence of control processes of reactivation of a broadcast managed application in a case in which the instruction for preferentially activating the broadcast managed application is given, in the broadcast receiver 100 of the ninth embodiment. In FIG. 39, the broadcast receiver 100 ends the broadcast managed application that is automatically activated at the time of start of viewing a broadcast program, by the user's instruction operation. Moreover, in a case in which the AIT or the like is appropriately confirmed and then the information contents are not updated, the broadcast receiver 100 controls whether or not the above-mentioned ended broadcast managed application is reactivated in accordance with a newly acquired event message from the broadcast wave and in response to the selection of the user.

In FIG. 39, processes of S1600 to S1615 are the same as those processes of S1500 to S1515 in FIG. 36. An event message is included in the broadcast wave, appropriately. In S1600, the broadcast receiver 100 carries out the same processes as those of S101 to S108 in FIG. 7A, so that a predetermined broadcast managed application is activated. After S1600, in S1609, the broadcast receiver 100 stores information relating to the activated broadcast managed application in the temporary storage region as the application execution information 3411.

By way of example, suppose that up to S1609, portions from the first page (for example, HTML11 of App1 in FIG. 27) to the third page (for example, HTML13) in a given broadcast managed application are executed through transition between pages and viewed by the user. In S1609, the contents of these execution and viewing process are cached as the application execution information 3411.

In S1610, the end of the broadcast managed application is instructed at a timing in the middle of the broadcast program by the user's operation. In S1611, the broadcast receiver 100 ends the execution of the broadcast managed application. In S1612, the broadcast receiver 100 newly acquires a PMT data row and acquires an AIT data row in S1613.

Next, in S1614, in a case in which the AIT information acquired in S1613 does not have the same contents as the AIT information contents of the application execution information 3411 temporarily stored in S1609 (No), the process proceeds to S1615. In this case, the broadcast managed application ended in S1611 is not reactivated. In S1615, by using the updated PMT and AIT acquired in S1612 and S1613, processes for activating a predetermined broadcast managed application are newly carried out.

In contrast, in a case in which the AIT information acquired in S1613 has the same contents as the AIT information contents of the application execution information 3411 temporarily stored in S1609 (Yes), the process proceeds to S1616, and control for reactivating the broadcast managed application ended in S1611 is carried out. In S1616 and the subsequent steps, the broadcast receiver 100 of the ninth embodiment carries out monitoring and acquiring processes on an event message included in the broadcast wave until the frequency channel is altered or the information such as the PMT and the AIT included in the broadcast wave is updated. Note that, in a case in which the frequency channel is altered or the information such as the PMT and the AIT included in the broadcast wave is updated, the broadcast receiver 100 transfers the process to S1615, and the same processes are carried out. The event message may be regularly delivered, for example, in the same manner as the AIT or the like. For example, the broadcast receiver 100 may regularly acquire the event message.

By way of example, in S1616, suppose that as a page update by an event, an instruction for transition and display of portions corresponding to the fourth page (HTML14 of App1 in FIG. 27) and the subsequent pages of the broadcast managed application is given. The user has not viewed the portion corresponding to the fourth page and the subsequent pages.

In S1616, the broadcast receiver 100 acquires an event message separated in the first separation unit 132 by the application control unit 161. Next, the broadcast receiver 100 analyzes the acquired event message and judges the analysis results. In S1617, the broadcast receiver 100 confirms whether or not the event message acquired in S1616 instructs to carry out a page update or the like on the broadcast managed application ended in S1611. In S1617, in a case in which the event is not an instruction for updating a page or the like (No), the present processes in FIG. 39 are ended. That is, the broadcast managed application ended in S1611 is not reactivated.

In contrast, in S1617, in a case in which the event corresponds to an instruction for updating a page or the like (Yes), the process proceeds to S1618, and control for reactivating the broadcast managed application ended in S1611 is carried out. In S1618, the broadcast receiver 100 reads out the HTML document of the application execution information 3411 temporarily stored in S1609. The corresponding document is formed before page updating. Moreover, in S1619, the broadcast receiver 100 transmits the event message acquired in S1616 to the application engine 162 and executes the HTML document read out in S1618 based on control of the application control unit 161 by the application engine 162. At the time of the process of S1619, by applying the instruction contents of the event message in S1616 to the HTML document, the broadcast receiver 100 reflects the page update thereto. Thus, the broadcast managed application ended in S1611 is reactivated. The display contents of the application screen by the corresponding reactivation are in a state after the page update.

By way of example, the display contents on the screen of the broadcast managed application after the reactivation include a display of the portions of the fourth page and the subsequent pages. The user can view the portions of the fourth page and the subsequent pages that have not been viewed before the end.

At the time of the above-mentioned reactivation, the broadcast receiver 100 may control in such a way that transition is automatically made to a new page (for example, fourth page) after the above-mentioned page update to be displayed. Moreover, at this time, the broadcast receiver 100 may display a message or the like indicating the generation of a page update and transition to a new page on the screen. In this case, the user has less laborious operations such as transition between pages.

Moreover, at the time of the reactivation, the broadcast receiver 100 may control a display in such a way that a page (for example, the third page) before the page update is recovered and may control in such a way that a confirmation message or the like for the page update on the screen is displayed and transition to a new page (for example, the fourth page) after the page update is made in accordance with the user's operation. In this case, the user can easily recognize the state of the page update.

Figure 40:
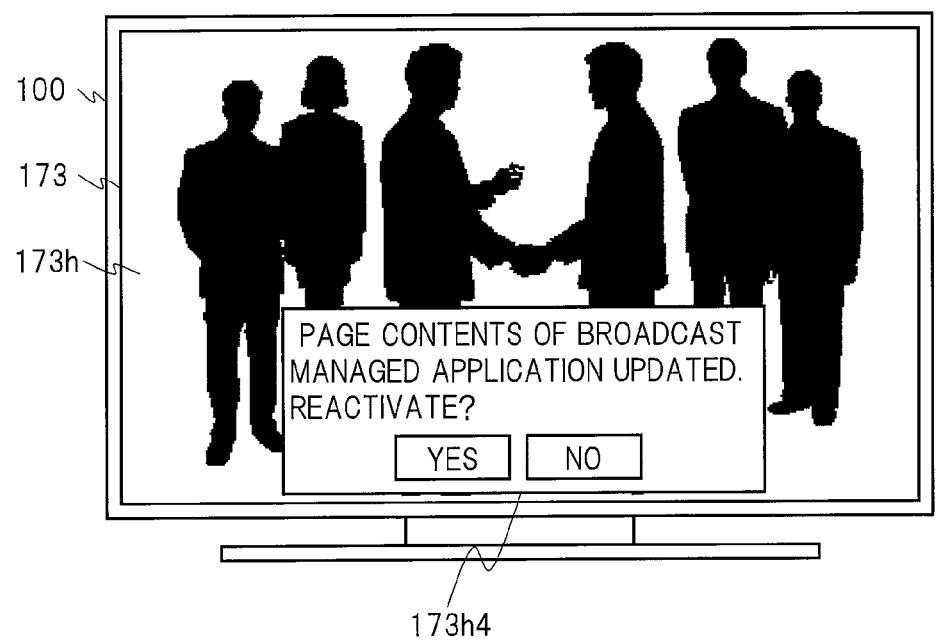
FIG. 40 is a screen display view of an example of an update confirmation screen in the broadcast receiver in accordance with the ninth embodiment.

FIG. 40 shows an update confirmation screen that is an example of a screen in a case in which a confirmation of the reactivation at the time of the page update is given to the user and the reactivation is carried out in accordance with the user's selection. In a case in which, for example, in S1617, the event corresponds to a page update, the broadcast receiver 100 displays a screen shown in FIG. 40. The present screen displays a message box 173h4. The message box 173h4 includes a message indicating that the page contents of the broadcast managed application are updated and buttons for allowing the user to select whether or not the reactivation is carried out. When the reactivation is selected on the present screen, the broadcast receiver 100 reactivates the application. By using the present screen, the user can easily recognize the situation, so that the user reactivates the application depending on the situation at that time and can view the updated page contents.

As described above, in accordance with the broadcast receiver 100 of the ninth embodiment, with respect to the broadcast managed application once ended, the reactivation of the broadcast managed application can be suitably controlled in accordance with the page update or the like by the event message acquired in the broadcast wave, as well as in response to the user's selection. That is, in accordance with the broadcast receiver 100 of the present embodiment, it becomes possible to execute functions having higher added values.

As a modified example of the ninth embodiment, with respect to the processes of S1616 to S1619, that is, the processes of the reactivation of the application to which the page update by the event message is reflected, the broadcast receiver 100 may execute those processes in accordance with the confirmation of the user setting information in the broadcast receiver 100 and the portable information terminal 700 in the same manner as in the sixth embodiment. For example, the broadcast receiver 100 provides a user setting screen relating to whether or not the reactivation of the application is permitted and the reactivation in the case of the page update by an event and stores the setting values based on the user's operation. Upon acquiring the event message in S1616, the broadcast receiver 100 confirms the setting values and determines whether or not the reactivation is carried out.

As described above, the modes for carrying out the present invention have been described with reference to the first to ninth embodiments; however, not limited to the above-mentioned embodiments, various modified examples are possible for the configuration which realizes the technique of the present invention. For example, one portion of the configuration of an embodiment may be replaced by a configuration of another embodiment, or a configuration of another embodiment may also be added to a configuration of an embodiment. All these modifications belong to the scope of the present invention. Moreover, numerical values, messages, or the like used in the specification and drawings is merely an example, and even when different one is used, the effects of the present invention are not impaired. With respect to the above-mentioned functions and the like of the present invention, one portion or the entire portions thereof may be achieved by hardware by designing integrated circuits, for example, may be achieved by software by interpreting and executing operation programs that allow the microprocessor units and the like to achieve respective functions and the like, or may be achieved by using hardware and software in combination. Moreover, with respect to control lines and information lines shown in the drawings, only those considered to be necessary for explanation are indicated, and all of those control lines and information lines on the product are not necessarily indicated; actually, almost all configurations may be considered to be mutually connected with one another.

Note that the above-mentioned software for controlling the broadcast receiver 100 may be preliminarily prepared in stored states in the ROM 103, the storage unit 110, and the like of the broadcast receiver 100 at the time of the shipment of the product. The software may be acquired from other application servers 500 or the like on the Internet 200 after the shipment of the product via the LAN communication unit 121. Furthermore, software stored in a memory card, an optical disc, or the like may be acquired through the extension interface unit 124 or the like. In the same manner, software for controlling the portable information terminal 700 may be preliminarily prepared in stored states in the ROM 703, the storage unit 710, and the like of the portable information terminal 700 at the time of the shipment of the product. The software may be acquired from other application servers 500 or the like on the Internet 200 after the shipment of the product via the LAN communication unit 721, the mobile telephone network communication unit 722 or the like. Furthermore, software stored in a memory card, an optical disc, or the like may be acquired via the extension interface unit 724 or the like.

EXPLANATION OF REFERENCE CHARACTERS

100: broadcast receiver, 132: first separation unit, 133: first video image decoding unit, 134: first audio decoding unit, 135: first subtitle decoding unit, 141: data broadcast receiving and processing unit, 142: data broadcast engine, 151: streaming receiving and processing unit, 152: second separation unit, 153: second video image decoding unit, 154: second audio decoding unit, 155: second subtitle decoding unit, 161: application control unit, 162: application engine, 171: video image superimposing unit, 172: audio selection unit, 173: video image display unit, 174: speaker, 175: video image output unit, 176: audio output unit, 181: presentation synchronization control unit, 191: terminal cooperation control unit, 300: broadcast station server, 400: service provider server, 500: other application servers, 600: mobile telephone communication server, 600*b*: base station, 700: portable information terminal, 3400: application reactivation control means, 3401: user selection means, 3402: storage unit, 3411: application execution information.

The invention claimed is:

1. An application activating method of activating an application to be executed in a broadcast receiver, the application being in cooperation with a broadcast program, the application activating method comprising:
   an automatic activation setting step of setting whether or not to permit automatic activation of an application based on setting by a user operation;
   a receiving step of receiving a broadcast signal;
   a first application activating step of activating an application when 1) application control information contained in the received broadcast signal indicates the automatic activation of the application and 2) the automatic activation of the application is set to be permitted in the automatic activation setting step;
   a launcher screen displaying step of displaying an application launcher screen on a display, the application launcher screen showing applications that can be executed in the broadcast receiver;
   a second application activating step of activating an application on a basis of a user operation through the displayed application launcher screen;
   a communicating step of communicating with an external portable terminal; and
   a third application activating step of activating an application on a basis of an activation request by a user operation through the external portable terminal, which is received in the communicating step.

2. A broadcast receiver comprising:
   a tuner configured to receive a broadcast signal;
   a display configured to display an image; and
   a processor configured to execute:
      an automatic activation setting process of whether or not to permit automatic activation of an application based on a user operation;
      a first application activation process of activating an application when application control information contained in the broadcast signal received by the tuner indicates the automatic activation of the application and when the automatic activation of the application is set to be permitted in the automatic activation setting process;
      a launcher screen display process of displaying an application launcher screen on the display, the application launcher screen showing applications that can be executed in the broadcast receiver;
      a second application activation process of activating an application on a basis of a user operation through the displayed application launcher screen;
      communication with an external portable terminal; and
      a third application activation process of activating an application by a signal in response to an operation to the external portable terminal, the signal being received through the communication.

3. The broadcast receiver according to claim 2, wherein the application is a broadcast cooperation application, in cooperation with a broadcast program, for providing a user with at least one of content or data regarding a broadcast program other than that transmitted by broadcast.

4. The broadcast receiver according to claim 3,
   wherein the broadcast cooperation application includes a broadcast managed application to be activated by application control information contained in a broadcast signal and in which access to broadcast resource is permitted, and an out-of-broadcast managed application to be activated by information other than the application control information contained in the broadcast signal and in which access to broadcast resource is permitted, and
   wherein the processor is configured to activate the broadcast managed application by the first application activation process, and activate the out-of-broadcast managed application by the second application activation process or the third application activation process.

5. The broadcast receiver according to claim 2, wherein, when the automatic activation of the application is set to not be activated in the automatic activation setting process, the processor is configured to perform a process to not activate the application even if the application control information includes information indicating the automatic activation of the application.

* * * * *